US006933916B2

(12) United States Patent
Nakao et al.

(10) Patent No.: US 6,933,916 B2
(45) Date of Patent: Aug. 23, 2005

(54) LIQUID CRYSTAL DISPLAY AND ITS DRIVING METHOD

(75) Inventors: Kenji Nakao, Osaka (JP); Daiichi Suzuki, Osaka (JP); Yoshinori Kobayashi, Hyogo (JP); Katsuyuki Arimoto, Okayama (JP); Katsuhiko Kumagawa, Osaka (JP); Ichiro Sato, Kanagawa (JP); Keisuke Tsuda, Ishikawa (JP); Hirofumi Wakemoto, Ishikawa (JP); Hiroyuki Yamakita, Osaka (JP); Masanori Kimura, Osaka (JP); Yoshinori Tanaka, Osaka (JP); Akinori Shiota, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 299 days.

(21) Appl. No.: 10/130,832

(22) PCT Filed: Dec. 18, 2001

(86) PCT No.: PCT/JP01/11077

§ 371 (c)(1),
(2), (4) Date: Oct. 9, 2002

(87) PCT Pub. No.: WO02/50603

PCT Pub. Date: Jun. 27, 2002

(65) Prior Publication Data

US 2003/0122767 A1 Jul. 3, 2003

(30) Foreign Application Priority Data

Dec. 19, 2000 (JP) ........................................ 2000-384843
Jan. 9, 2001 (JP) ........................................ 2001-1077
Jan. 11, 2001 (JP) ........................................ 2001-3307
Mar. 31, 2001 (JP) ........................................ 2001-98661

(51) Int. Cl.$^7$ ............................................. G09G 3/36
(52) U.S. Cl. ........................... 345/98; 345/100; 345/96; 349/37
(58) Field of Search ..................... 345/87, 88, 89, 345/90, 94, 95, 96, 97, 98, 99, 100; 349/33, 34, 35, 37, 129, 73

(56) References Cited

U.S. PATENT DOCUMENTS

| 5,093,655 A | * | 3/1992 | Tanioka et al. ............ 345/96 |
| 5,365,284 A | * | 11/1994 | Matsumoto et al. ........ 348/793 |
| 5,648,793 A | * | 7/1997 | Chen ........................... 345/96 |
| 6,437,844 B1 | * | 8/2002 | Hattori et al. ............ 349/129 |
| 6,603,525 B2 | * | 8/2003 | Yamakita et al. .......... 349/139 |
| 2002/0067451 A1 | * | 6/2002 | Hattori et al. ............ 349/129 |
| 2002/0080295 A1 | * | 6/2002 | Someya et al. ............ 349/43 |
| 2003/0001809 A1 | * | 1/2003 | Hattori et al. ............ 345/87 |

FOREIGN PATENT DOCUMENTS

| EP | 1091236 A2 | 4/2001 |
| JP | 8-328045 | 12/1996 |
| JP | 9-90432 | 4/1997 |
| JP | 9-90433 | 4/1997 |
| JP | 9-185037 | 7/1997 |
| JP | 10-206822 | 8/1998 |
| JP | 11-582008 | 10/1999 |
| JP | 11-338435 | 12/1999 |
| JP | 2000-180858 | 6/2000 |
| JP | 2001-83552 | 3/2001 |
| WO | WO 00/14597 | 3/2000 |

\* cited by examiner

*Primary Examiner*—Xiao Wu
(74) *Attorney, Agent, or Firm*—McDermott Will & Emery LLP

(57) ABSTRACT

A liquid crystal display of the present invention is adapted to perform initialization by inputting voltages with different polarities to two pixel electrodes (23á, 23â) adjacent in front and back direction. It is preferable that in the two pixel electrodes (23á, 23â) adjacent in front and back direction, the pixel electrode (23á) located on back side is provided with a first protrusion (232á) at a front side and back direction, the pixel electrode (231â) adjacent in front and back is provided with a second protrusion (23â) located on front side is provided with a second a second protrusion (234â) on a back side edge (233â)thereof.

24 Claims, 46 Drawing Sheets

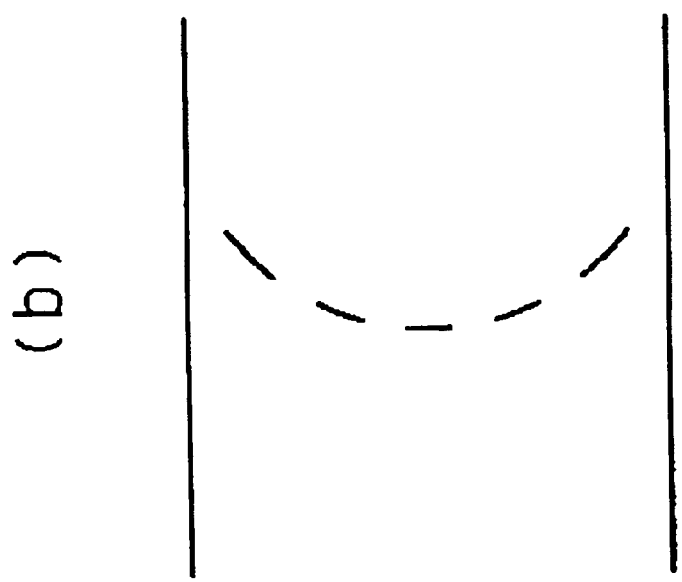
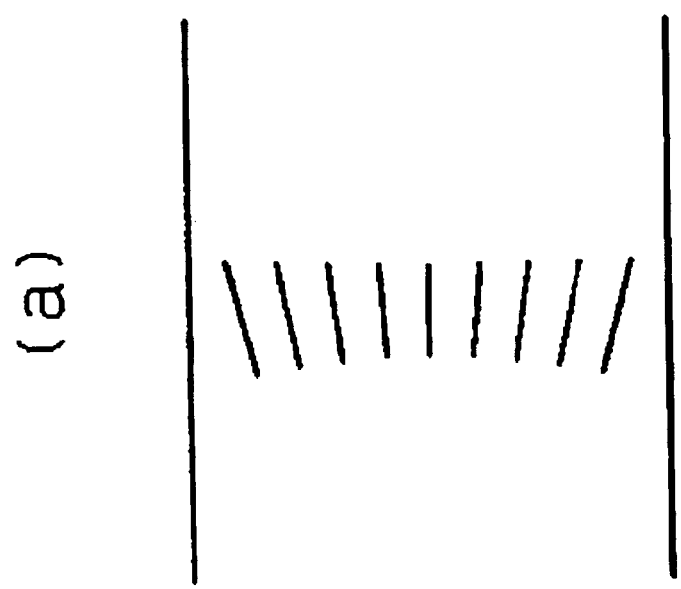
FIG.23

LIQUID CRYSTAL DISPLAY AND ITS DRIVING METHOD

TECHNICAL FIELD

The present invention relates to a liquid crystal display. More particularly, the present invention relates to a liquid crystal display having different alignment states in a display state and in a non-display state and requiring initialization from the alignment state in the non-display state to the alignment state in the display state before an image is displayed, which is capable of more effectively performing the initialization, and a method for driving the same.

BACKGROUND ART

There is known an OCB-type liquid crystal display having OCB-mode liquid crystal as a liquid crystal display that presents both fast response and high viewing angle.

FIG. 18(a) shows a general structure of the OCB-type liquid crystal display. An OCB-type liquid crystal display 1 comprises an array substrate 2, an opposing substrate 3 opposite to the array substrate 2, and OCB-mode liquid crystal (hereinafter simply referred to as "liquid crystal") interposed between the array substrate 2 and the opposing substrate 3.

FIG. 19 shows a general cross-sectional structure of the OCB-type liquid crystal display. As shown in FIG. 19, a retardation film 91d and a polarizer 92d are disposed in this order under the array substrate 2. Pixel electrodes 23 and an alignment layer 6d for aligning the liquid crystal in predetermined direction, which are mentioned later, are disposed on the array substrate 2. In the same manner, a retardation film 91u and a polarizer 92u are disposed on the opposing substrate 3. A counter electrode 31 and an alignment layer 6u for aligning the liquid crystal 5 in predetermined direction, which are mentioned later, are disposed under the opposing substrate 3. A polarization axis of the polarizer 92d and a polarization axis of the polarizer 92u are orthogonal to each other. In FIG. 18, for easier understanding, the alignment layers 6, the retardation films 91, and the polarizers 92 are omitted.

As shown in FIG. 18(a), the array substrate 2 has a transparent array substrate body 20, a plurality of source lines 21 provided on the array substrate body 20 and in parallel with longitudinal direction and a plurality of gate lines 22 orthogonal to these source lines 21. There are provided a plurality of transparent pixel electrodes 23 on the array substrate body 20 such that the pixel electrodes 23 are each surrounded by adjacent two sources lines 21 and adjacent two gate liens 22. On the other hand, the opposing substrate 3 has a transparent opposing substrate body 30 and a transparent counter electrode 31 provided over substantially the entire surface of the opposing substrate body 30. In FIG. 18(a), a color filter 32 is interposed between the transparent opposing substrate body 30 and the counter electrode 31, but the color filter 32 may be provided on the side of the array substrate 2.

FIG. 18(b) is an enlarged view of the pixel electrode 23. Each pixel electrode 23 is provided with a switching device 4 comprised of a thin film transistor generally expressed as "TFT". To be more specific, the switching device 4 comprised of the thin film transistor has a gate electrode 41 connected to the gate line 22, source electrode 42 connected to the source line 21, and a drain electrode 43 connected to the pixel electrode 23. The source electrode 42 and the drain electrode 43 are connected by means of a semiconductor thin film which is not shown. The gate electrode 41 overlaps with the semiconductor thin film with a gate insulating layer (not shown) interposed between them and a drive voltage applied to the gate electrode 41 causes the source electrode 42 and the drain electrode 43 to be switched on through the semiconductor thin film.

An operation of the switching device 4 comprised of the thin film transistor will be described in conjunction with image display. In a normal state, −10V voltages are being applied to the gate lines 22 and the gate electrodes 41 connected to the same. In this state, the switching devices 4 are in OFF state. Subsequently, +10V drive voltage is applied to a gate line 22A in first stage shown in FIG. 18(a), to cause the respective switching devices 4A in first stage to be turned "ON". This allows the source electrodes 42 and the drain electrodes 43 to be electrically connected. As soon as the switching devices 4 are turned ON all at once, voltages corresponding to an image to be displayed are applied to the respective source lines 21. The voltages applied to the source line 21 are applied to the respective pixel electrodes 23 through the source electrodes 42 and the drain electrodes 43. This generates potential difference between the respective pixel electrodes 23a in first stage and the counter electrode 31.

Subsequently, −10V voltage is applied to the gate line 22A in first stage again to cause the switching devices 4A in first stage to be turned OFF. Simultaneously, +10V voltage is applied to a gate line 22B in second stage to cause switching devices 4B in second stage to be turned ON all at once. In the aforementioned manner, as soon as the switching devices 4B are turned ON, voltages corresponding to an image to be displayed are applied to the respective source lines 21. This generates potential difference between the respective pixel electrodes 23B in second stage and the counter electrode 31.

This operation is repeated for gate lines 22C . . . in third and the following stages, thereby generating potential difference corresponding to an image to be displayed between the respective pixel electrodes 23 and the counter electrode 31. This potential difference causes the liquid crystal 5 to be modulated according to the image to be displayed. Here, a general image display method in the OCB-type liquid crystal display will be described. A lower surface or a side surface of the OCB-type liquid crystal display is irradiated with light from a backlight that is not shown. As shown in FIG. 20, in this light, only light having a polarization plane identical to a polarization axis 921d of the polarizer 92d, passes through the polarizer 92d. Then, this light (polarized light) passes through the retardation film 91d so as to be given retardation (approximately −35 nm) of the retardation film 91d.

The light, which has passed through the retardation film 91d, is transmitted through the liquid crystal 5 with retardation regulated according to the image to be displayed. This further gives the light retardation. Then, this light reaches the retardation film 91u. The retardation film 91u has the retardation (approximately −35 nm in the above example) equal to that of the retardation film 91d, and still further gives the light retardation.

Here, "retardation" will be explained in detail. As shown in FIG. 20, a polarized light L composed of sine wave, which has passed though the polarizer 92d having a predetermined polarization axis 921d, is considered to be decomposed into two orthogonal sine wave components Lx, Ly. As shown in FIG. 20(a), when longitudinal axis LQLS of the liquid crystal 5 (liquid crystal molecule 51 to be precise) is parallel to axis y along which the polarized light L travels, distance D1 (indicated by bold line in FIG. 20) which the component Lx travels through the inside of the liquid crystal 5 is equal to distance D2 (indicated by bold line in FIG. 20) which Ly travels through the inside of the liquid crystal 5. Since the component Lx and the component Ly exit from the liquid crystal 5 simultaneously, no retardation is generated.

On the other hand, when the longitudinal axis LQLS of the liquid crystal (liquid crystal molecule to be precise) 5 is vertical to the axis y along which the polarized light L travels (in FIG. 20(b), the component Lx is parallel to the longitudinal axis LQLS), the distance D1 which the component Lx travels through the inside of the liquid crystal 5 is longer than the distance D2 which the component Ly travels through the inside of the liquid crystal 5. Therefore, the component Lx exit from the liquid crystal 5 later than the component Ly. Therefore, the sine wave component Lx is behind(on the left side in FIG. 12(b)) the sine wave component Ly. This difference is "retardation".

As mentioned previously, the liquid crystal has given retardation as the result of modulation according to the image to be displayed. By way of example, in white display, the liquid crystal 5 has retardation of 345 nm, while in black display, the liquid crystal 5 has retardation of 70 nm.

In case of black display, retardation given by the retardation films 91 and the liquid crystal 5 is equal to 0 (=−35 +70 −35), i.e., no retardation is generated. On the other hand, in case of white display, the retardation given by the retardation films 91 and the liquid crystal 5 is 245 nm (=−35 +345 −35) in the above example. Since the polarization axis of the polarizer 92d and the polarization axis of the polarizer 92u are orthogonal to each other, the light which has passed through the retardation film 91u and reached the polarizer 92u, cannot pass through the retardation film 92u because of absence of the retardation, thereby resulting in "black display". To be a greater detail, as shown in FIG. 20(a), when the retardation between the sine wave components Lx, Ly is 0, polarization plane of the polarized light L resulting from composition of the sine wave components Lx, Ly is parallel to the polarization axis 921d of the polarizer 92d and orthogonal to the polarization axis 921u of the polarizer 92u. Therefore, this light cannot pass through the polarizer 92u, thereby resulting in "black display".

On the other hand, in case of white display, retardation given by the retardation films 91 and the liquid crystal 5 is 245 nm (=−35 +345 −35) in the above example. When the retardation between the sine wave components Lx, Ly is 245 nm, the polarization plane of the polarized light L resulting from composition of the sine wave components Lx, Ly is parallel to the polarization axis 921u of the polarized light 92u. Therefore; this light passes through the polarizer 92u, thereby resulting in "white display". While the retardation is set to 245 nm in the above description, the retardation necessary for white display is suitably selected by those skilled in the art.

FIG. 21 is a graph showing luminance—voltage characteristic of the general OCB-mode liquid crystal 5. Under the voltage being increased, the retardation which the liquid crystal 5 gives to polarized light reduces and luminance reduces, which finally results in "black display". Under the voltage being reduced, the retardation which the liquid crystal 5 gives to polarized light increases and luminance increases, which finally results in "white display". In this manner, luminance corresponding to an image to be displayed is regulated for each pixel electrode 23.

The light with regulated luminance, is finally transmitted through the color filter 32. As shown in FIG. 22, in a general liquid crystal display, each of laterally arranged color filters of three colors of red(R), green(G), and blue(B) overlaps with one pixel electrode 23 with a correspondence, thereby forming one pixel. One dot is composed of three pixels of three primary colors, i.e., a pixel corresponding to the red color filter, a pixel corresponding to the green color filter, and a pixel corresponding to the blue color filter. Dots composed of the pixels of RGB are provided in a predetermined number, and in front and back direction and right and left direction. For example, when a liquid crystal display has 768 dots in front and back direction and 1076 dots in right and left direction, it has 1076×768×3 (about 250 million) pixel electrodes 23. As a matter of course, in some liquid crystal displays, one dot is composed of three pixels of RGB arranged in longitudinal direction.

As shown in FIG. 23(a), in a non-display state, the OCB-mode liquid crystal 5 has a splay alignment state. The splay alignment state is not suitable for image display. So, before the image is displayed, it is necessary to "initialize" the OCB-mode liquid crystal 5 by application of high voltage to the liquid crystal 5 through the pixel electrodes 23 provided on the array substrate 2 and the counter electrode 31 provided on the opposing substrate 3. This initialization allows the OCB-mode liquid crystal 5 to transition to a bend alignment state as shown in FIG. 23(b). Then, in this bend alignment state, the potential difference generated between the respective pixel electrodes 23 and the counter electrode 31 generates retardation, thereby displaying an image.

One method of initialization is described in Publication of Unexamined Patent Application No. Hei. 10-206822. As shown in FIG. 24, this Publication discloses that voltage Vs of the respective pixel electrodes 23 is held constant, while varying voltage Vcom of the counter electrode 31 like rectangular pulse wave, thereby performing initialization.

In the initialization described in the above-identified Publication, the potential difference by the rectangular pulse wave is generated over the entire liquid crystal 5 disposed between the array substrate 2 and the opposing substrate 3. This is because the voltage Vs of the respective pixel electrodes 23 is constant and the counter electrode 31 is provided over nearly the entire surface of the opposing substrate body. So, in accordance with the initialization disclosed in this Publication, as shown in FIG. 25, the potential difference is generated only in thickness direction of the liquid crystal 5. The potential difference is not generated in right and left direction and front and back direction of the liquid crystal 5. That is, this Publication does not disclose the potential difference in right and left direction and in front and back direction in the initialization of the OCB-type liquid crystal display. The same is the case with PCT/WO00/14597 Publication and Publication of Unexamined Patent Application No. 2001-83552.

DISCLOSURE OF THE INVENTION

The inventors or the like found a problem that transition is unsatisfactorily performed by only generation of potential difference to the liquid crystal 5 in thickness direction thereof.

To solve the above problem, there is provided a liquid crystal display according to the present invention of a first group comprising: an array substrate including a plurality of pixel electrodes arranged in front and back direction and in right and left direction and disposed in matrix; a plurality of source lines and a plurality of gate lines arranged so as to cross each other; and switching devices provided as corresponding to the respective pixel electrodes and having gate electrodes connected to the gate lines, source electrodes connected to the source lines, and drain electrodes connected to the pixel electrodes, for switching between the source electrodes and the drain electrodes in accordance with a drive signal input to the gate electrodes through the gate lines; an opposing substrate provided with a counter electrode opposite to the array substrate; liquid crystal filled between the array substrate and the opposing substrate and having different alignment states in a display state and in a non-display state, the liquid crystal being subjected to initialization from the alignment state in the non-display state to the alignment state in the display state before an image is displayed; and drive means for performing the initialization by inputting voltages with different polarities to two pixel electrodes adjacent in front and back direction, respectively.

It is preferable that the drive means is adapted to apply voltages with different polarities to two pixel electrodes adjacent in right and left direction, respectively, but may be adapted to apply voltages with the same polarity to the two pixel electrodes adjacent in right and left direction, respectively.

It is preferable that drive means is adapted to apply a constant voltage to the counter voltage while applying the voltages to the pixel electrodes. The drive means may be adapted to start applying the constant voltage to the counter voltage after start of application of the voltages to the pixel electrodes. In this case, specifically, it is preferable that the drive means is adapted to start applying the constant voltage to the counter voltage before an elapse of 50 milliseconds after start of application of the voltages to the pixel electrodes.

It is preferable that, in the two pixel electrodes adjacent in front and back direction, a pixel electrode located on back side is provided with a first protrusion at a front side edge thereof and a pixel electrode located on front side is provided with a second protrusion at a back side edge thereof.

It is preferable that a tip end of the first protrusion is located closer to front than a tip end of the second protrusion.

It is preferable that two first protrusions are provided and the second protrusion is located between the two first protrusions. It is preferable that a plurality of first protrusions and a plurality of second protrusions are provided and one of the second protrusions is interposed between adjacent two first protrusions.

To solve the above problem, there is provided another liquid crystal display according to the present invention of the first group comprising: an array substrate including a plurality of pixel electrodes arranged in front and back direction and in right and left direction and disposed in matrix; a plurality of source lines and a plurality of gate lines arranged so as to cross each other; and switching devices provided as corresponding to the respective pixel electrodes and having gate electrodes connected to the gate lines, source electrodes connected to the source lines, and drain electrodes connected to the pixel electrodes, for switching between the source electrodes and the drain electrodes in accordance with a drive signal input to the gate electrodes through the gate lines; an opposing substrate provided with a counter electrode opposite to the array substrate; liquid crystal filled between the array substrate and the opposing substrate and having different alignment states in a display state and in a non-display state, the liquid crystal being subjected to initialization from the alignment state in the non-display state to the alignment state in the display state before an image is displayed; and drive means for performing the initialization by inputting voltages with different polarities to two pixel electrodes adjacent in right and left direction, respectively.

It is preferable that the drive means is adapted to apply voltages with different polarities to the two pixel electrodes adjacent in front and back direction, respectively, but the drive means may be adapted to apply voltages with the same polarity to the two pixel electrodes adjacent in front and back direction, respectively.

It is preferable that the drive means is adapted to apply a constant voltage to the counter voltage while applying the voltages to the pixel electrodes. The drive means may be adapted to start applying the constant voltage to the counter voltage after start of application of the voltages to the pixel electrodes. In this case, specifically, it is preferable that the drive means is adapted to start applying the constant voltage to the counter voltage before an elapse of 50 milliseconds after start of application of the voltages to the pixel electrodes.

It is preferable that in the two pixel electrodes adjacent in right and left direction, a pixel electrode located on left side is provided with a third protrusion at a right side edge thereof and a pixel electrode located on right side is provided with a fourth protrusion at a left side edge thereof.

It is preferable that a tip end of the third protrusion is located closer to right side than a tip end of the fourth protrusion.

It is preferable that two third protrusions are provided and the fourth protrusion is located between the two third protrusions.

It is preferable that a plurality of third protrusions and a plurality of fourth protrusions are provided and one of the fourth protrusions is interposed between adjacent two third protrusions.

As liquid crystal in such a liquid crystal display, OCB-mode liquid crystal may be used.

To solve the above problem, there is provided a liquid crystal display according to the present invention of a second group comprising: an array substrate including a plurality of pixel electrodes arranged in front and back direction and in right and left direction and disposed in matrix; a plurality of source lines and a plurality of gate lines arranged so as to cross each other; and switching devices provided as corresponding to the respective pixel electrodes and having gate electrodes connected to the gate lines, source electrodes connected to the source lines, and drain electrodes connected to the pixel electrodes, for switching between the source electrodes and the drain electrodes in accordance with a drive signal input to the gate electrodes through the gate lines; a common electrode line overlapping with the pixel electrode in a plan view; a protruded electrode which is protruded from the common electrode line in a plan view, at least part of the protruded electrode not being overlapping with the pixel electrode; an opposing substrate provided with a counter electrode opposite to the array substrate; and liquid crystal filled between the array substrate and the opposing substrate and having different alignment states in a display state and in a non-display state, the liquid crystal being subjected to initialization from the alignment state in the non-display state to the alignment state in the display state before an image is displayed.

It is preferable that the liquid crystal display according to the invention of the second group comprises drive means for first generating potential difference between the source line and the common electrode line, and then generating potential difference between the pixel electrode and the counter electrode.

When generating the potential difference between the source line and the common electrode line, it is also preferable that potential difference is generated between the common electrode line and the counter electrode.

It is preferable that the protruded electrode has a concave portion and the source line has a convex portion engaging with the concave portion in a plan view.

It is preferable that the protruded electrode has a concave portion and the pixel electrode has a convex portion engaging with the concave portion in a plan view.

It is preferable that the protruded electrode has a convex portion and the source line has a concave portion engaging with the convex portion in a plan view.

It is preferable that the protruded electrode has a convex portion and the pixel electrode has a concave portion engaging with the convex portion in a plan view.

It is preferable that the counter electrode is located so as not to overlap with the protruded electrode in a plan view.

This object, as well as other objects, features and advantages of the invention will become more apparent to those skilled in the art from the following description taken with reference to the accompanying drawings.

BRIEF DESCRIPTION OF THE DRAWINGS

FIG. 13 is a view showing a constitution of a liquid crystal display according to an embodiment 1-4 of the present invention. in which FIG. 13(a) is a plan view and FIG. 13(b) is an partially enlarged view of FIG. 13(a);

FIG. 18 is a view showing the OCB-type liquid crystal display, in which FIG. 18(a) is a view showing a general structure of the liquid crystal display and FIG. 18(b) is an enlarged view of FIG. 18(a);

FIG. 23 is a view showing alignment states of liquid crystal. in which FIG. 23(a) is a conceptual view showing a splay alignment state and FIG. 23(b) is a conceptual view showing a bend alignment state;

BEST MODE FOR CARRYING POT THE INVENTION

Figure 25:
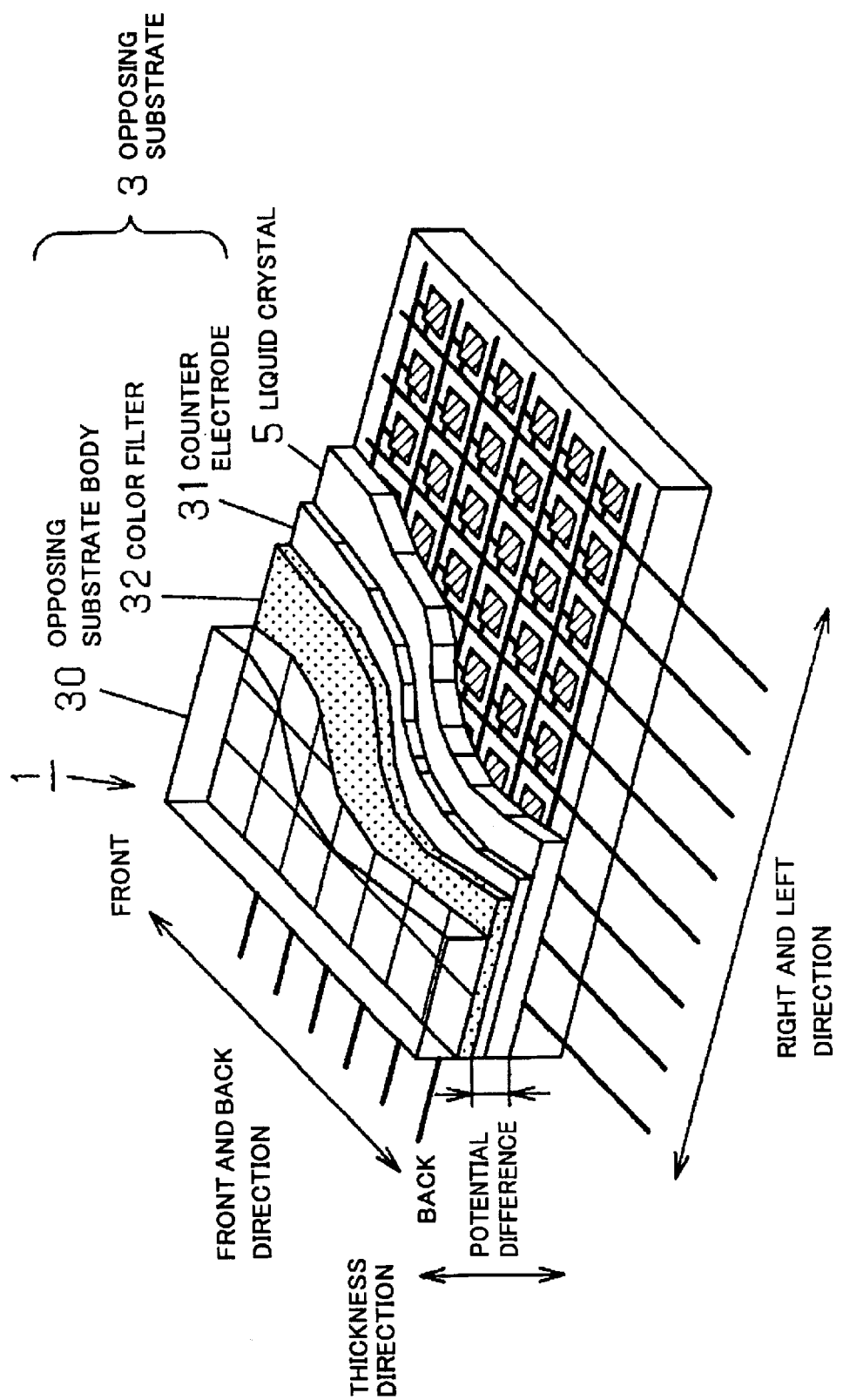
FIG. 25 is a view showing a liquid crystal display used for defining terms "thickness direction", "front and back direction" and "right and left direction"

Hereinafter, preferred embodiments of the present invention will be described with reference to drawings. The general OCB-type liquid crystal display has been already described. Hereinbelow, in each of the embodiments, the constitution different from that of the aforementioned OCB-type liquid crystal display will be mainly described. In this description, terms "thickness direction","front and back direction", and "right and left direction" are used, and their meanings are shown in FIG. 25. It should be noted that taking arrangement of the gate lines 22A, 22B, 22C into account, in FIG. 25, the front and back are reversed. First of all, preferred embodiments of liquid crystal displays according to the present invention of a first group will be described in the embodiment 1 described below.

(Embodiment 1)
(Embodiment 1-1)

In this embodiment, AC rectangular wave voltages are applied to pixel electrodes 23 through source electrodes 21 to generate a transverse electric field in front and back direction between the pixel electrodes 23, thereby facilitating initialization.

Figure 1:
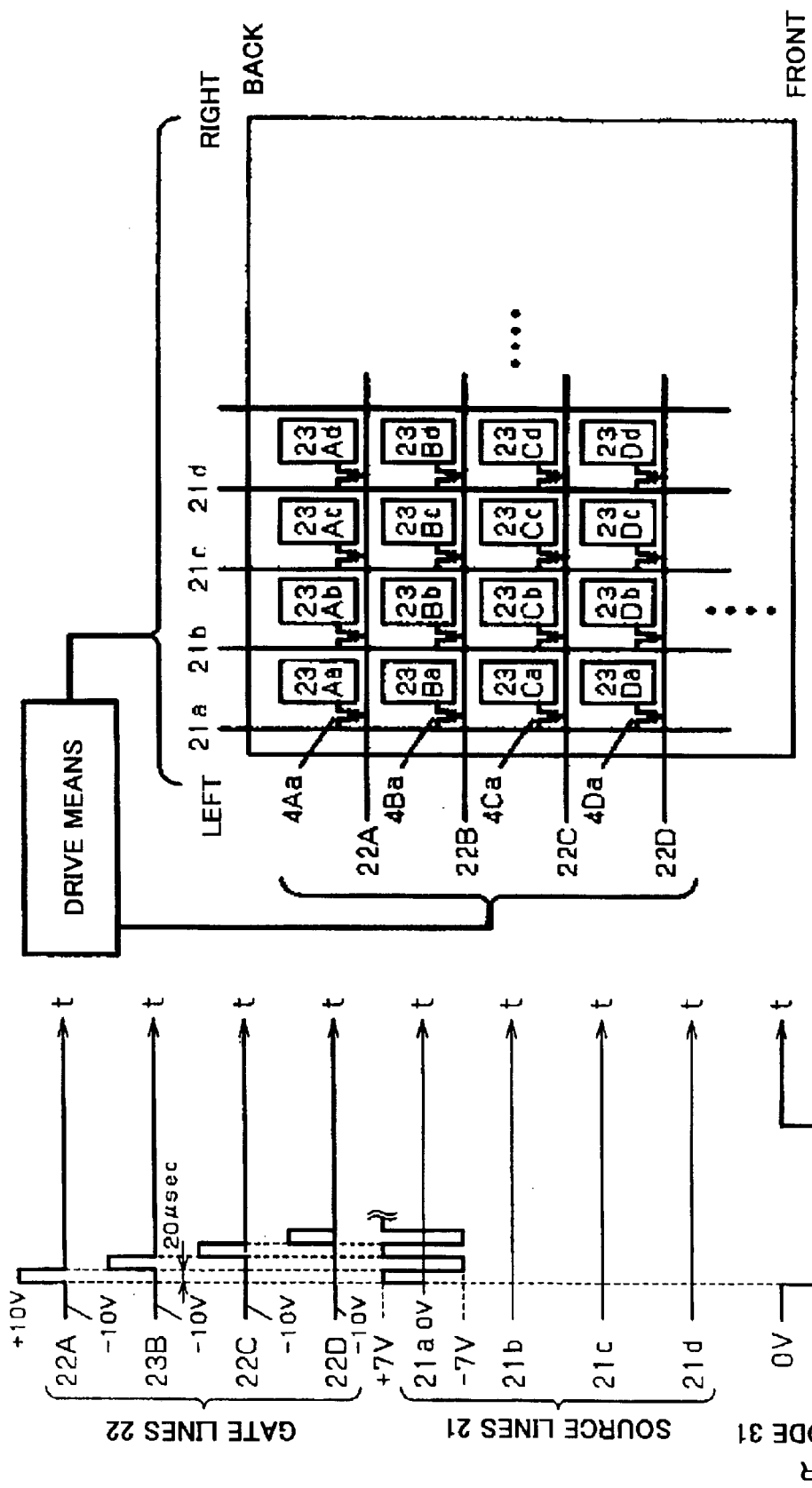
FIG. 1 is a view showing drive waveforms in initializing an OCB-type liquid crystal display, with voltages applied to source lines, gate lines, and a counter electrode being on longitudinal axis and time being on lateral axis, in a liquid crystal display according to an embodiment 1-1 of the present invention.

FIG. 1 is a view showing drive waveforms in initializing an OCB-type liquid crystal display with being voltages applied to source lines 21, gate lines 22, and a counter electrode 31 being on longitudinal axis and time being on lateral axis in an embodiment 1-1 of the present invention. FIG. 1 also illustrates schematic constitution of the source lines 21, the gate lines 22, the pixel electrodes 23, and drive means (drive circuit). For easier understanding of explanation, the drive means (drive circuit) is omitted in the other views.

First, +10V voltage is applied to a gate line 22A in first stage as a drive signal, thereby turning "ON" a switching device 4Aa of a pixel electrode 23Aa. This allows the source electrode 42 and the drain electrode 43 to be electrically connected. The AC rectangular wave voltage is being applied to the source line 21a, but as soon as the switching device 4Aa is ON, +7V voltage is applied to the source line 21a as shown in FIG. 1. Therefore, +7V voltage is applied to from the source line 21a to the pixel electrode 23Aa through the source electrode 42 and the drain electrode 43.

Subsequently, −10V voltage is applied to the gate line 22A in first stage again, thereby turning OFF the switching device 4Aa of the pixel electrode 23Aa. The time during which the switching device 4 is ON is approximately 20ì seconds. Simultaneously, +10V voltage is applied to a gate line 22B in second stage, thereby turning "ON" a switching device 4Ba of a pixel electrode 23Ba. The AC rectangular wave voltage is being applied to the source line 21a, but as soon as the switching device 4Ba is ON, −7V voltage is applied to the source line 21a as shown in FIG. 1. Therefore, −7V voltage is applied from the source line 21a to the pixel electrode 23Ba through the source electrode 42 and the drain electrode 43. This is repeated for the gate lines 22C . . . in third and the following stages.

Figure 2:
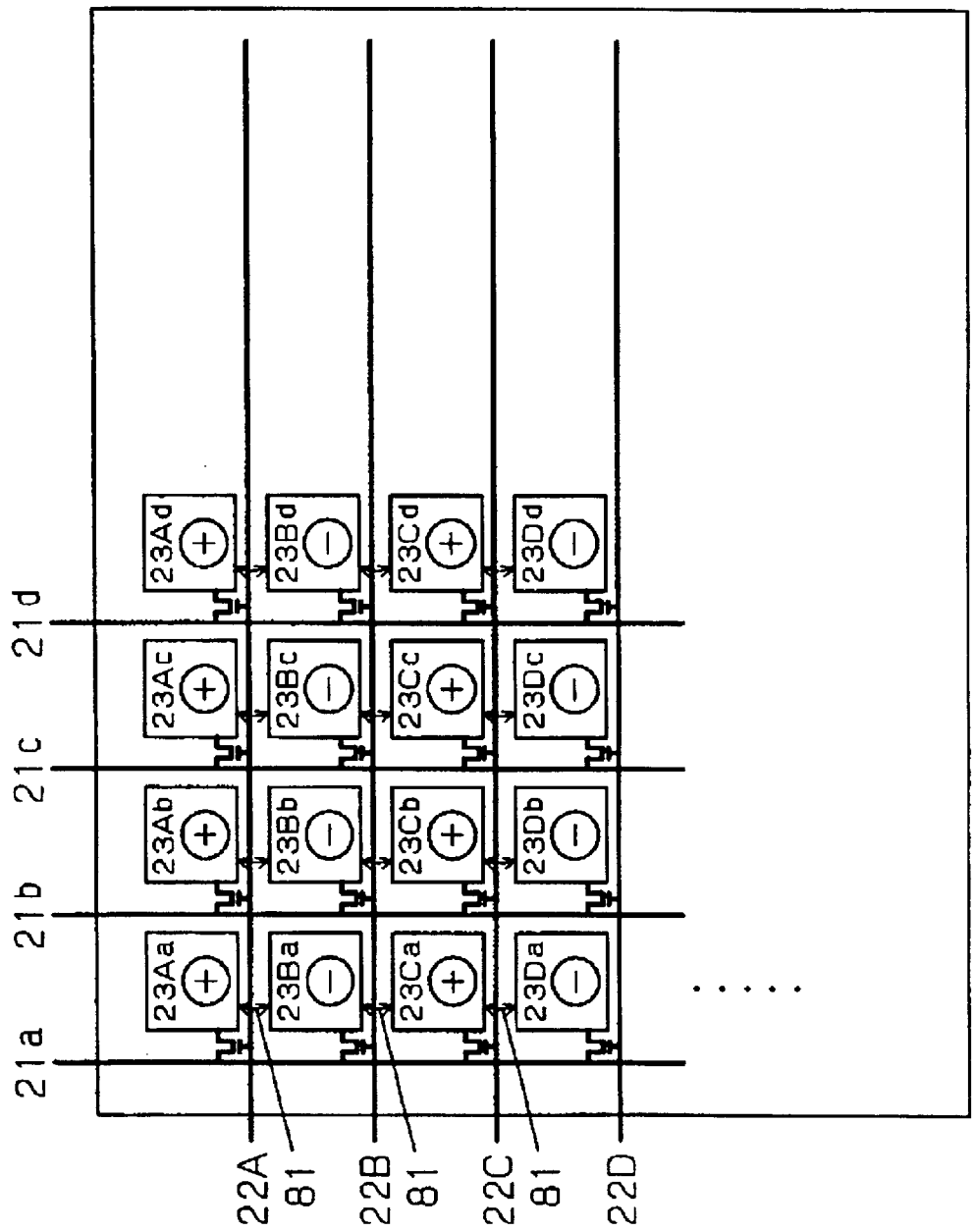
FIG. 2 is a view showing polarities of voltages applied to pixel electrodes disposed in matrix in the liquid crystal display according to the embodiment 1-1 of the present invention.

When the AC rectangular wave voltages are applied to pixel electrodes 23a on one column through the source line 21a as described above by sequentially applying +10V voltages to all the gate lines 22, as shown in FIG. 2, plus voltages are applied to pixel electrodes 23Aa, Ca . . . on odd rows, while minus voltages are applied to pixel electrodes 23Ba, Da . . . on even rows.

As a result, as shown in FIG. 2, electric field is generated between each of the pixel electrodes 23Aa, Ca . . . on odd rows and each of the pixel electrodes 23Ba, Da . . . on even rows. Since this electric field is oriented along transverse direction (strictly speaking, front and back direction) of the liquid crystal display, hereinbelow, it is named "transverse electric field" (reference numeral 81). To distinguish this electric field from another electric fields mentioned later, this electric field is also named "transverse electric field in front and back direction", strictly speaking.

Figure 3:
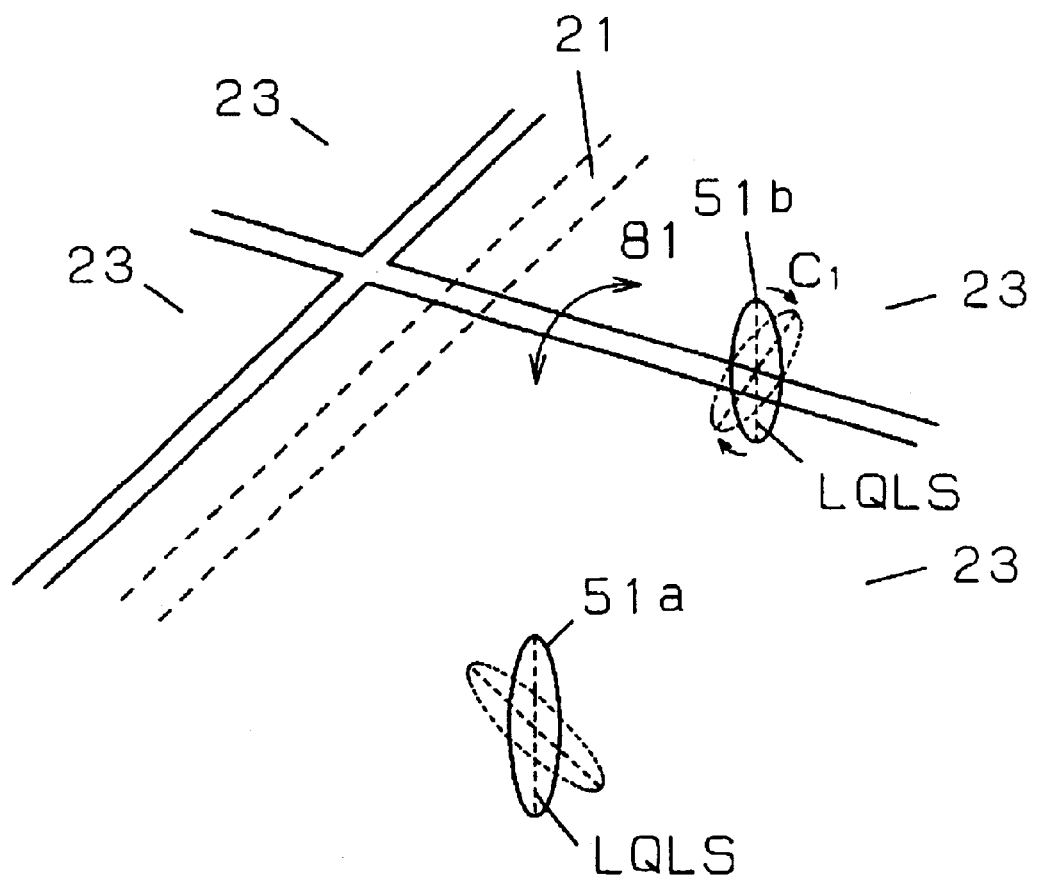
FIG. 3 is view showing that liquid crystal molecules whose longitudinal axes are going to be oriented in different directions in liquid crystal and unstable "disturbance" state occurs there in the embodiment 1-1 of the present invention.

Thus generated transverse electric field 81 facilitates transition from splay alignment to bend alignment. The reason for this has not be come clear. As shown in FIG. 3, a liquid crystal molecule 51a located on the pixel electrode 23 tends to rise up such that its longitudinal axis direction LQLS is substantially parallel to the thickness direction of the liquid crystal display as indicated by a dotted line when potential difference is generated between the pixel electrodes 23 and the counter electrode 32 (not shown in FIG. 3). On the other hand, a liquid crystal molecule 51b interposed between pixel electrodes 23 adjacent in the longitudinal direction tends to be oriented along the direction parallel to the source line 21 with its longitudinal axis direction LQLS being twisted according to an arrow C1 as indicated by a dotted line, because the molecule 51b is subjected to the transverse electric field, in addition to the potential difference between the pixel electrodes 23 and the counter electrode 31. With the generation of the liquid crystal molecules 51 whose longitudinal axes LQLS going to be thus oriented in different directions in the liquid crystal 5, unstable disturbance'state occurs there. It is recognized that such unstable "disturbance" facilitates transition from splay alignment to bend alignment. As long as the potential difference is being generated between the pixel electrodes 23 and the counter electrode 31, upon transition from splay alignment to bend alignment taking place anywhere in the liquid crystal 5, the transition from splay alignment to bend alignment spreads from this spot to the entire liquid crystal 5. After the entire liquid crystal 5 has had bend alignment, voltages corresponding to an image to be displayed are applied to the respective pixel electrodes 23, thereby conducting display.

Figure 4:
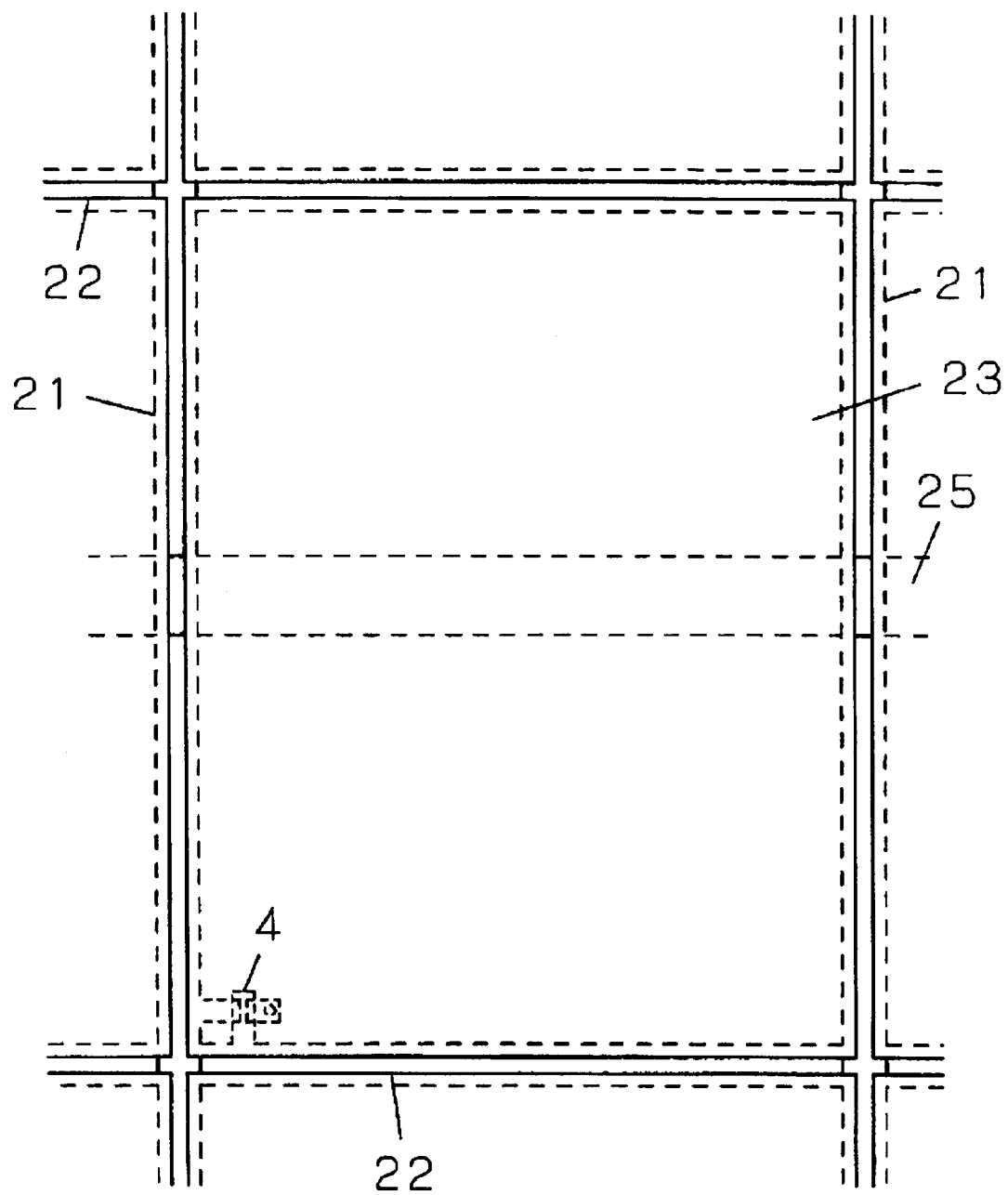
FIG. 4 is a plan view showing a liquid crystal display according to an embodiment 1 of the present invention.

In the embodiment 1-1, the pixel electrodes 23 are preferably provided in a layer different from that of the gate lines 22. This is because, in this embodiment, the transverse electric field 81 is generated between adjacent two pixel electrodes 23 in front and back direction as described above. While when the pixel electrodes 23 and the gate lines 22 are located in the same layer, the transverse electric field 81 generated between the two pixel electrodes 23 adjacent in front and back direction is affected by the voltages being applied to the gate lines 22 for turning ON/OFF the switching devices 4. Accordingly, in order to minimize the influence of the voltages being applied to the gate lines 22, it is desirable to interpose an insulating layer (not shown) between the gate lines 22 and the pixel electrodes 23. The insulating layer is generally called "flattening film" and is preferably made of 2 ìm to 3 ìm resin. Also, the pixel electrodes 23 are preferably provided in a layer different from that of the source lines 21, although the reason for this will be described in detail in an embodiment 1-2. When the insulating layer (not shown) is interposed between the gate lines 22 and the pixel electrodes 23, as shown in FIG. 4 as a plan view of the liquid crystal display according to the embodiment 1 of the present invention, front side edge and back side edge of the pixel electrode 23 overlap with the gate lines 22 or a common capacitance line 25 (overlaps with the gate lines 22 in the Figure) seen in a plan view. Also, as shown in FIG. 4, when the pixel electrodes 23 are provided in the layer different from those of the gate lines 22 and the source lines 21, left-and-right side edges of the pixel electrode 23 overlap with the source lines 21 seen in a plan view.

As shown in FIG. 1, when the AC rectangular wave voltages are being applied to the pixel electrodes 23 through such source lines 21, it is desirable to increase the potential difference between the pixel electrodes 23 and the counter electrode 31 by applying the voltage to the counter electrode 31 as well. The preferable potential difference is between 8V and 30V. Since the potential difference in the thickness direction is increased as the result of generation of the potential difference between the pixel electrodes 23 and the counter electrode 31, the transition from splay alignment to bend alignment is facilitated.

When the potential difference between the pixel electrode 23 and the counter electrode 31 is less than 8V, the transition from splay alignment to bend alignment is sometimes difficult to facilitate. Conversely, it is often difficult to set the potential difference to 30V or greater in view of design of the liquid crystal display. The more preferable potential difference is between 20 V and 25V. It is preferable that the voltage being applied to the counter electrode 31 is held constant.

Figure 5:
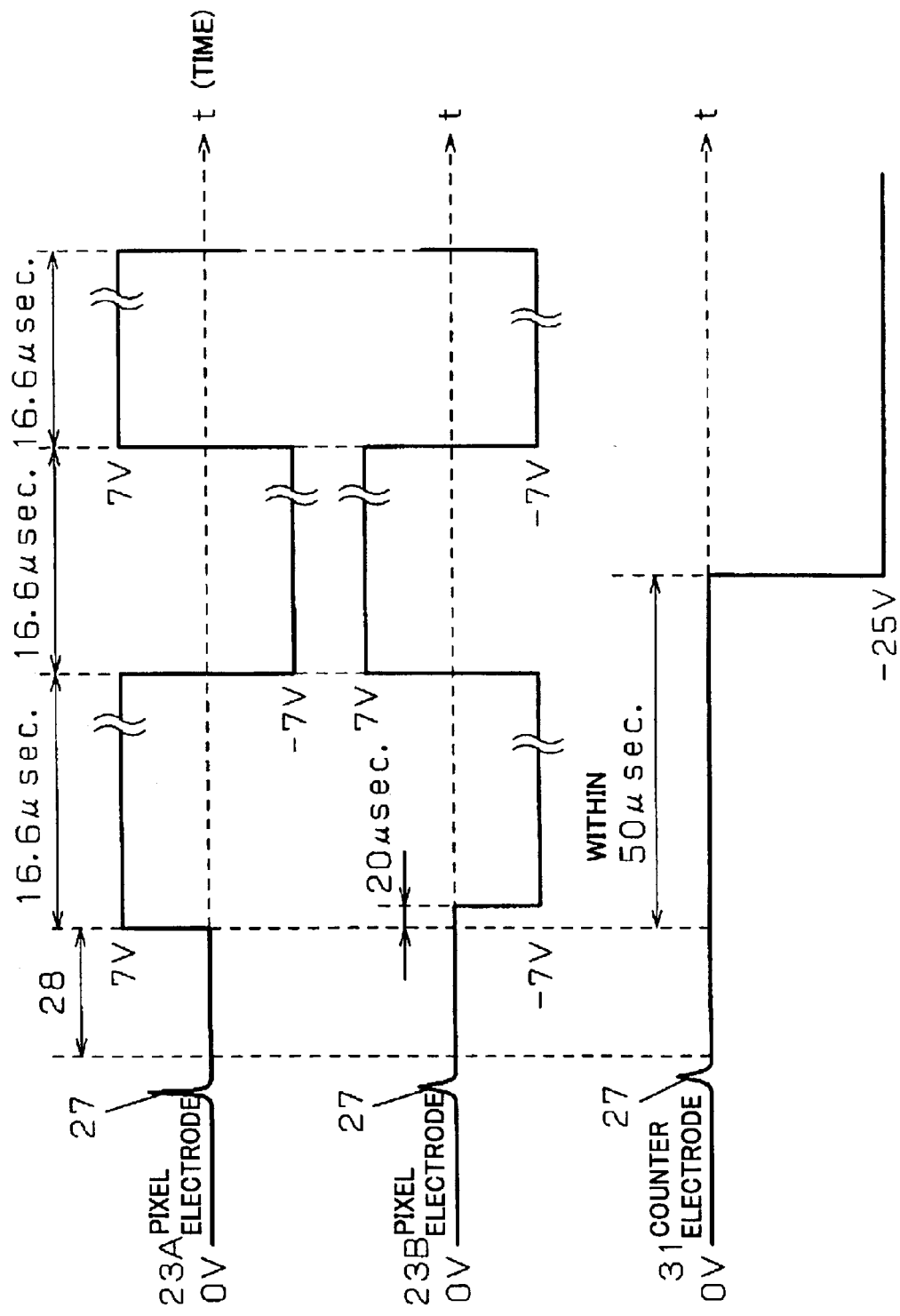
FIG. 5 is a view showing drive waveforms in initializing the OCB-type liquid crystal display with voltages applied to the pixel electrodes and the counter electrode being on longitudinal axis and time being on lateral axis in the liquid crystal display according to the embodiment 1-1 of the present invention, on the basis of timing at which voltage is applied to the counter electrode 31.

Inventors found that constant voltage preferably starts to be applied to the counter electrode 32 before an elapse of 50 milliseconds after the start of application of the voltages to the pixel electrodes 23, as shown in FIG. 5. In other words, inventors found that the liquid crystal molecule 51 is less likely to transition from splay alignment to bend alignment when the constant voltage starts to be applied after the elapse of 50 milliseconds after the start of application of voltages to the pixel electrodes 23. More preferably, the voltages are applied to the pixel electrode 23 and the counter electrode 31 simultaneously. The reason for this will be described in detail.

Because voltage noise 27 might be generated in FIG. 5, the instant the power is applied to the liquid crystal display, the voltages of all the pixel electrodes 23 are generally set to 0V during a certain period before the start of application of voltages to the pixel electrodes 23. This period is called "reset period" (reference numeral 28).

After an elapse of the reset period 28, in a period during which the gate lines 22 are ON, voltages are applied to the respective pixel electrodes 23 through the source lines 21, and after the gate lines 22 are in OFF state, the voltages are held between the pixel electrodes 23 and the counter electrode 31. After the drive voltages are sequentially applied to all the gate lines 22 and the voltages are applied to all the pixel electrodes 23, the drive voltage is applied to the gate line 22A in first stage again, thereby turning ON the switching devices 4A in first stage. Thereby,the voltages are applied again through the source lines 21. Approximately 16.6 milliseconds is required for sequentially applying the drive voltages to all the gate lines 22 and applying the voltages to the pixel electrodes 23. Thereafter, in the same manner as described above, the switching devices 4A in first stage are turned OFF and the switching devices 4A in first stage are turned ON. This is repeated.

If the liquid crystal molecules 51 remain oriented in the same direction and immobilized for a long time period as the result of application of the voltages with the same polarity to the pixel electrodes 23 for a long time period, the liquid crystal molecules 51 do not respond to fluctuation of the voltages. This sometimes results in "image persistence". So, as shown in FIG. 5, when plus potential is applied to the pixel electrode 23 and held therein and then the switching devices 4A in first stage are turned ON again to allow the voltages to be applied through the source lines 21, minus potential is generally applied to the pixel electrodes 23. Of course, the same applies the pixel electrodes 23B of FIG. 5 with the polarity reversed from plus to minus. In other words, the polarity is reversed between plus and minus for every 16.6 milliseconds in each of the pixel electrodes 23.

16.6 milliseconds×3=approximately 50 milliseconds, and therefore, when the constant voltage starts to be applied to the counter electrode 32 after an elapse of 50 milliseconds after the start of application of the voltage to the pixel electrodes 23, plus, minus, and plus (or minus, plus, and minus) voltages are sequentially applied to the respective pixel electrodes 23. If the voltage of the counter electrode 31 is 0V in this 50 millisecond period, then ±7V is applied to the liquid crystal molecules 51. If so, it makes no sense to provide the reset period. It is recognized that under the condition, the liquid crystal molecules 51 are less likely to transition from splay alignment to bend alignment.

Figure 6:
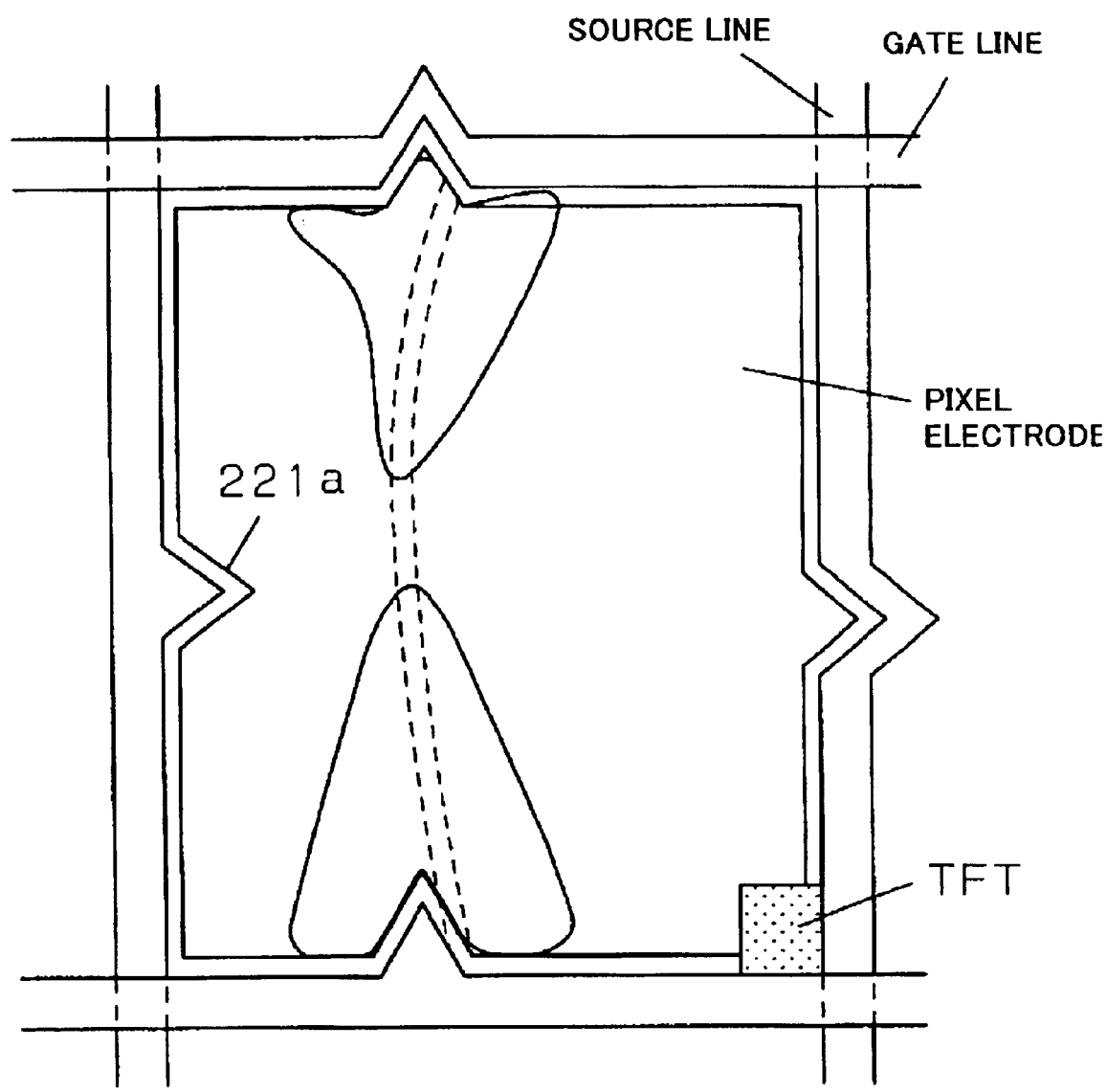
FIG. 6 is a view showing a known art generating a transverse electric field by providing a protrusion with pointed tip end at an end portion of the pixel electrode.

In the embodiment 1-1, the shape of the pixel electrode 23 is rectangle. It is known that the transverse electric field is generated by providing a pointed protrusion at an end portion of the pixel electrode as shown in FIG. 6. In contrast with the case where such protrusion is provided, it is easier to create the rectangular pixel electrode of this embodiment. In the embodiment 1-1, the AC rectangular wave voltages applied to the source lines 21 are set to ±7V, the voltages applied to the gate lines 22 are set to −10V (in OFF state) and +10V (in ON state), but these are only illustrative.

Alternatively, minus voltages may be applied to the gate lines 22 in ON state and plus voltages may be applied to the gate liens 22 in OFF state.

(Embodiment 1-2)

In an embodiment 1-2, initialization is facilitated by generating a transverse electric field 82 in right and left direction as well as the transverse electric field 81 in front and back direction.

When the alignment direction of the liquid crystal molecule 51 defined by the alignment layer 6 is parallel to the source line 21, that is, the longitudinal axis LQLS of the liquid crystal molecule 51 is parallel to the source line 21, the generation of only the transverse electric field 81 is not so effective. This is due to the fact that the "twist (arrow C1)" is not generated because the longitudinal axis LQLS of the liquid crystal molecule 51b located between the pixel electrodes 23 adjacent in the longitudinal direction is originally parallel to the source line 21, and the liquid crystal molecules 51a, 51b are going to be oriented in the same direction (i.e., thickness direction).

Figure 7:
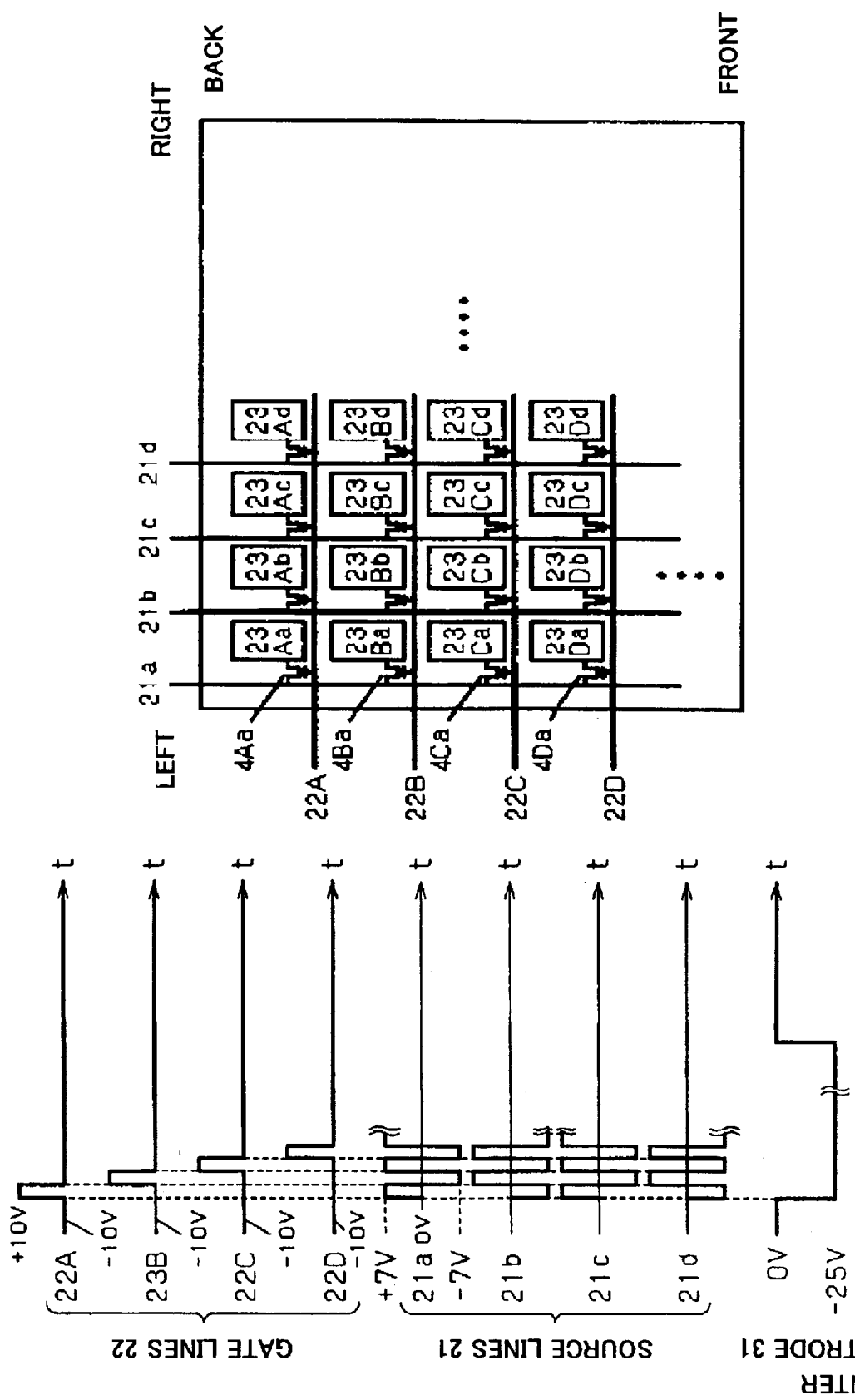
FIG. 7 is a view showing drive waveforms in initializing the OCB-type liquid crystal display with voltages applied to source lines, gate lines, and a counter electrode being on longitudinal axis and time being on lateral axis in a liquid crystal display according to an embodiment 1-2 of the present invention.

Accordingly, as shown in FIG. 7, it is preferable that the AC rectangular wave voltages input to the respective pixel electrodes 23a, c through the source lines 21a, c . . . on odd columns and the AC rectangular wave voltages input to the respective pixel electrodes 23a, c . . . through the source lines 21b, d . . . on even columns are made different in polarity.

In this case, first, +10V voltage is applied to the gate line 22A in first stage as a drive signal, thereby turning "ON" the switching devices 4Aa, Ab, Ac . . . of the pixel electrodes 23Aa, Ab, Ac . . . in first stage. When these switching devices 4Aa, Ab, Ac . . . are ON, +7V voltages are being applied to the sources lines 21a, 21c . . . , as shown in FIG. 7. Therefore, +7V voltages are applied from the source lines 21a, 21c . . . to the pixel electrodes 23Aa, Ac . . . through the source electrodes 42 and the drain electrodes 43. On the other hand, when the switching devices 44Aa. Ab, Ac . . . are ON, −7V voltages are being applied to the sources lines 21b, 21d . . . , as shown in FIG. 7. Therefore, −7V voltages are applied from the source lines 21b, 21d . . . to the pixel electrodes 23Ab, Ad . . . through the source electrodes 42 and the drain electrodes 43.

Subsequently, −10V voltage is applied to the gate line 22A in first stage again, thereby turning OFF the switching devices 4A, Ab, Ac . . . of the pixel electrodes 23A in first stage. Simultaneously, +10V voltage is applied to the gate line 22B in second stage, thereby turning "ON" the switching devices 4Ba, Bb, Bc . . . of the pixel electrodes 23Ba, Bb, Bc . . . in second stage. When the switching devices 4Ba, Bb, B.BC .are ON. −7V voltages are being applied to the sources lines 21a, 21c,as shown in FIG. 7. Therefore, −7V voltages are applied from the source lines 21a, 21c . . . to the pixel electrodes 23Ba, Bc . . . through the source electrodes 42 and the drain electrodes 43. On the other hand, when the switching devices 4Ba, Bb, Bc . . . are ON, +7V voltages are being applied to the sources lines 21b, 21d . . . , as shown in FIG. 7. Therefore, +7V voltages are applied from the source lines 21b, 21d . . . to the pixel electrodes 23Bb, Bd . . . through the source electrodes 42 and the drain electrodes 43.

Figure 8:
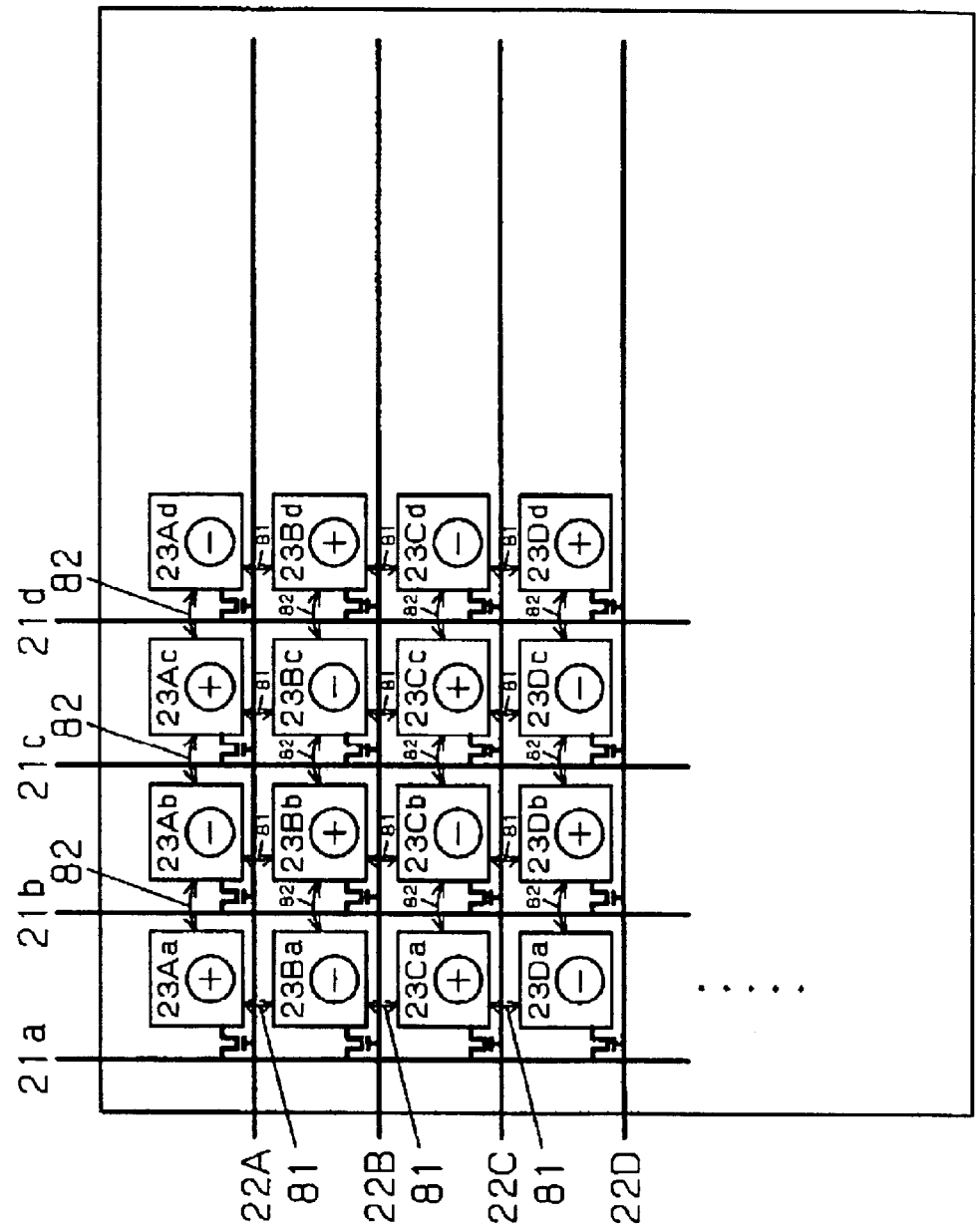
FIG. 8 is a view showing polarities of voltages applied to pixel electrodes disposed in matrix in the liquid crystal display according to the embodiment 1-2 of the present invention.

By applying the AC rectangular wave voltage from the source lines 21 to the respective pixel electrodes 23 as described above by sequentially applying +10V voltages to all the gate lines 22, as shown in FIG. 8, plus voltages are applied to the pixel electrodes 23Aa, Ca, Ac, Cc . . . on odd rows and odd columns and the pixel electrodes 23Bb, Db, Db, Dd . . . on even rows and even columns, while minus voltages are applied to the pixel electrodes 23Ba, Da, Bc, Dc . . . on even rows and odd columns and the pixel electrodes 23Ab, Cb, Ad, Cd . . . on odd rows and even columns.

As a result, as shown in FIG. 8, the electric field 82 is generated between each of the pixel electrodes 23Aa, Ba, Ca, Da . . . on odd column and each of the pixel electrodes 23Ab, Bb, Cb, Db . . . on even column, as well as between each of the pixel electrodes 23Aa, Ca, Ea . . . on odd rows and each of the pixel electrodes 23Ba, Da, Fa . . . on even rows. This electric field 82 is oriented in the transverse direction (right and left direction to be precise) of the liquid crystal display, and hence, hereinafter referred to as "transverse electric field 82". To distinguish this electric field from the aforementioned "transverse electric field 81 in front and back direction", "the transverse electric field 82 in right and left direction" is sometimes used to be precise.

Figure 12:
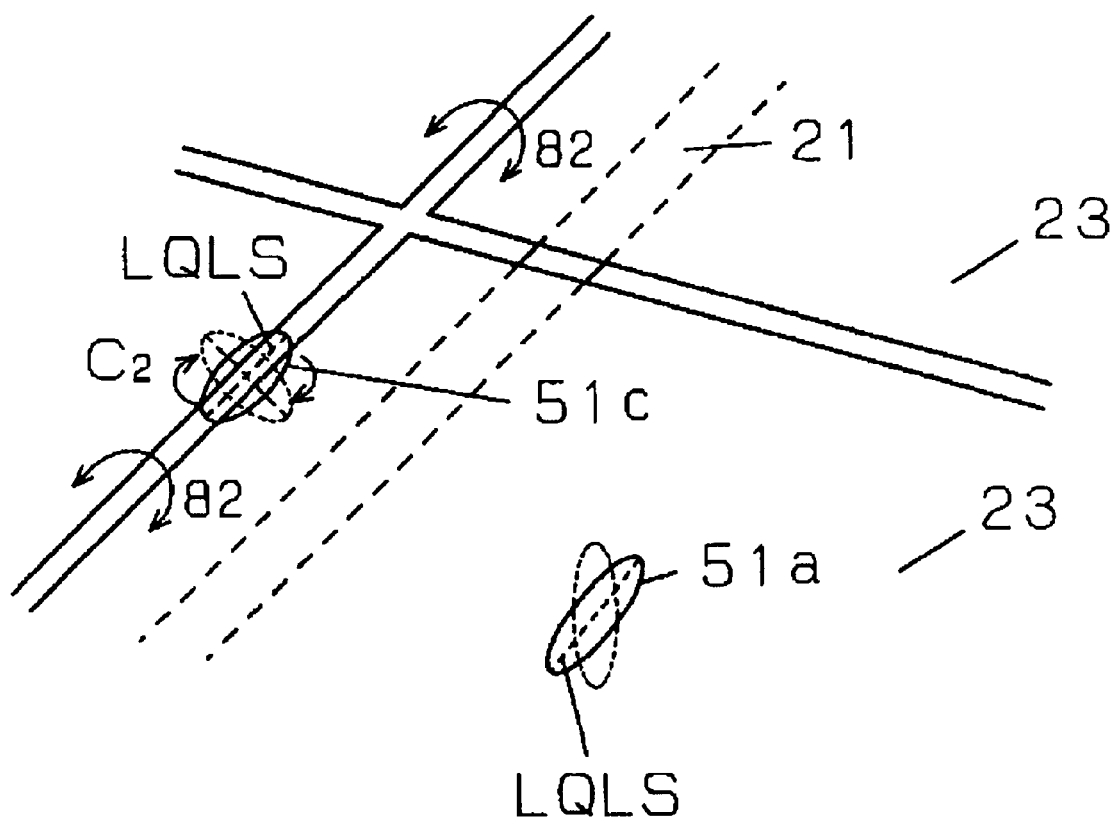
FIG. 12 is view showing that liquid crystal molecules whose longitudinal axes are going to be oriented in different directions in liquid crystal 5 and unstable "disturbance" state occurs there in the embodiment 1-3 of the present invention.

In this constitution, even when the alignment direction of the liquid crystal molecule 51 defined by the alignment layer 6 is parallel to the source line 21 and the liquid crystal molecule 51b located on the gate line 22 is not affected by the transverse electric field 81 in front and back direction, the transverse electric field 82 in right and left direction orthogonal to the longitudinal axis LQLS of the liquid crystal molecule 51 causes the liquid crystal molecule 51c located on the source line 21 to be twisted as indicated by the arrow C, as shown in FIG. 12. So, there are inevitably generated liquid crystal molecules 51 whose longitudinal axes LQLS are going to be oriented in different directions (the liquid crystal molecule 51a located on the pixel electrode 23 and the liquid crystal molecule 51c located on the source line and twisted in the direction according to the arrow C2 by the transverse electric field 82) in the liquid crystal 5, which facilitates transition from splay alignment to bend alignment.

In the embodiment 1-2, it is preferable that the pixel electrodes 23 are provided in the layer different from that of the source lines 21. This is because, in this embodiment, the transverse electric field 82 is generated between the two pixel electrodes 23 adjacent in right and left direction. However, if the pixel electrodes 23 and the source lines 21 are located in the same layer, then the transverse electric field 82 generated between the two pixel electrodes 23 adjacent in right and left direction is under the influence of the voltages being applied to the source lines 21. Accordingly, in order to minimize the influence of the voltages being applied to the source lines 21, it is desirable to interpose an insulating layer (not shown) between the source lines 21 and the pixel electrodes 23. The other respects are similar to those of the embodiment 1-1.

Figure 9:
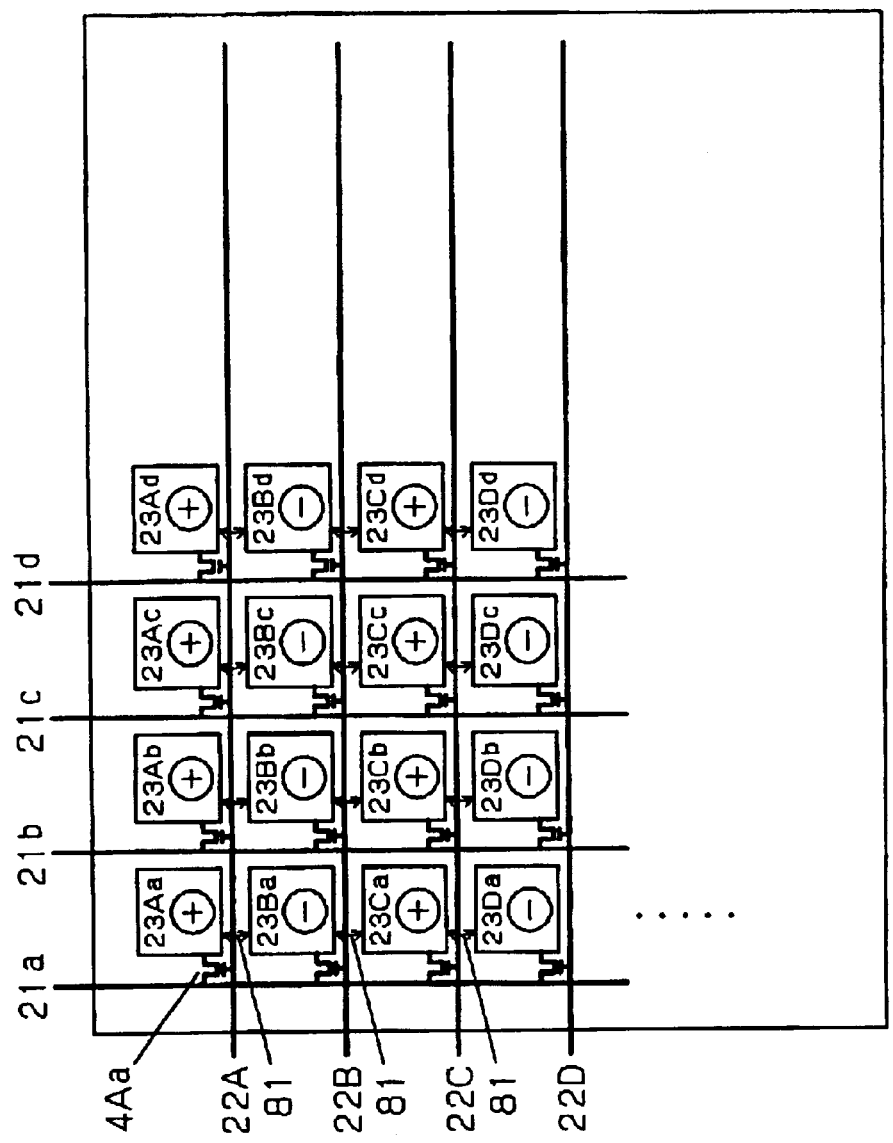
FIG. 9 is a view showing polarities of voltages applied to pixel electrodes disposed in matrix in another liquid crystal display according to the embodiment 1-2 of the present invention.

When the alignment direction of the liquid crystal molecule 51 defined by the alignment layer 6 is not parallel to the source line 21, there are generated liquid crystal molecules 51 whose longitudinal axes LQLS are going to be oriented in different directions in the liquid crystal 5 only by the transverse electric field 81 in front and back direction. So, in that case, as shown in FIG. 9, the voltages may be applied to the pixel electrodes 23 so that voltages with the same polarity are applied to the pixel electrodes 23a, 23b, 23c . . . adjacent in right and left direction.

(Embodiment 1-3)

In an embodiment 1-3, the transverse electric field 82 in right and left direction is generated between the pixel electrodes 23, thereby facilitating initialization.

In some cases, the transverse electric field in front and back direction is unnecessary as in the case where the alignment direction of the liquid crystal molecule 51 defined by the alignment layer 6 is parallel to the source line 21. In this case, only the transverse electric field 82 in right and left direction is generated in the following manner.

Figure 10:
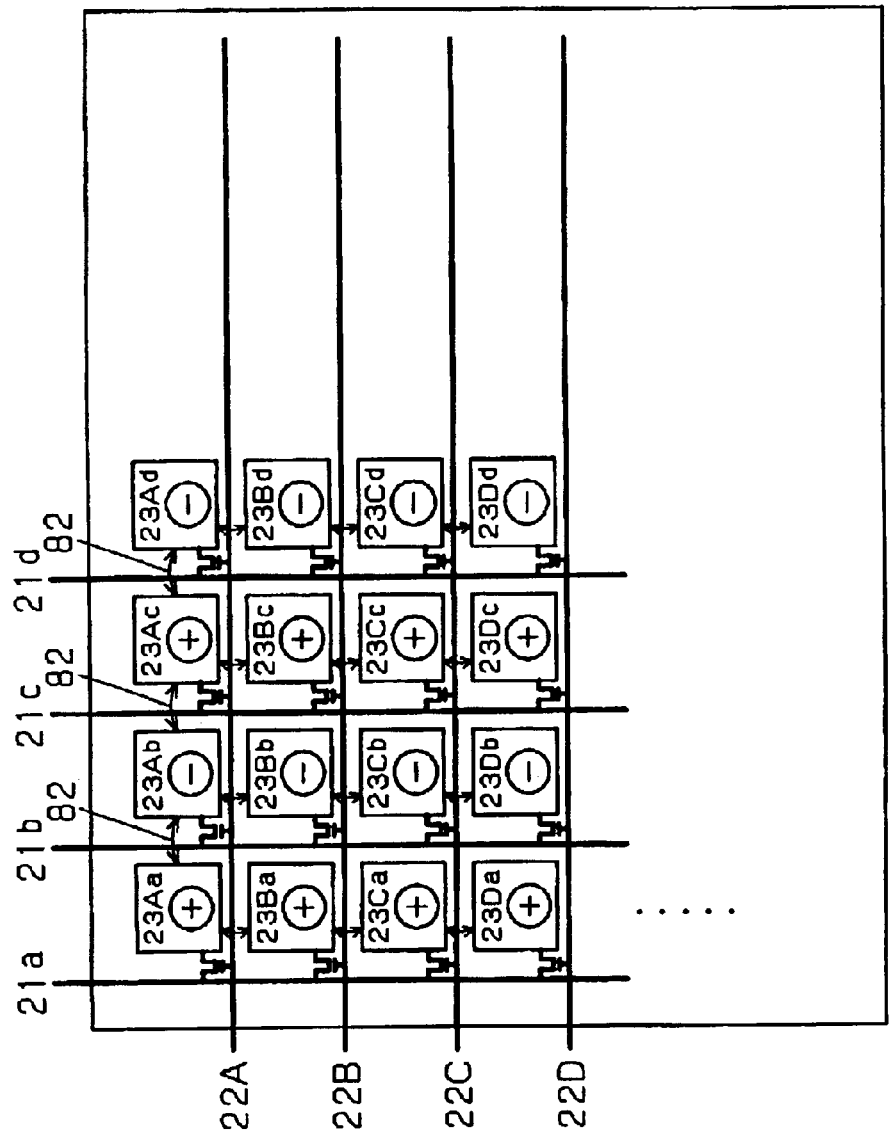
FIG. 10 is a view showing drive waveforms in initializing the OCB-type liquid crystal display with voltages applied to source lines, gate lines, and a counter electrode being on longitudinal axis and time being on lateral axis in a liquid crystal display according to an embodiment 1-3 of the present invention.

As shown in FIG. 10, in the embodiment 1-3, the AC rectangular wave voltage with the same polarity is input to each of the pixel electrodes 23a, 23b . . . through each of the source lines 21a, 21b

Figure 11:
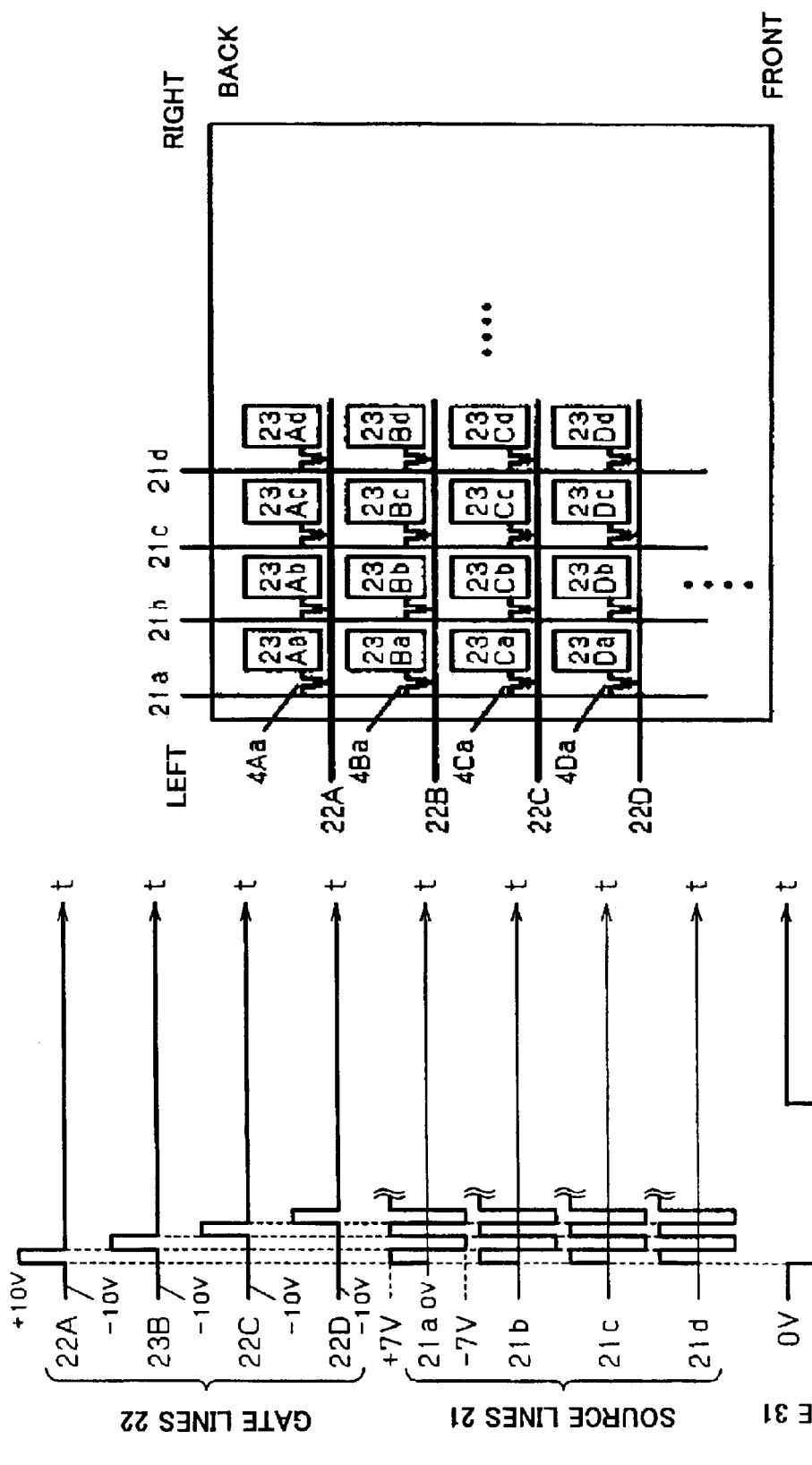
FIG. 11 is a view showing polarities of voltages applied to pixel electrodes disposed in matrix in a liquid crystal display according to the embodiment 1-3 of the present invention.

Similarly to the embodiments 1-1, 1-2, the gate lines 22 and the switching devices 4 are operated. Thereby, as shown in FIG. 11, the transverse electric field 82 in right and left direction is generated between each of the pixel electrodes 23Aa, Ab, Ac, Ad . . . in odd stages and each of the pixel electrodes 23Ba, Bb, Bc, Bb . . . in even stages. It should be noted that the transverse electric field 81 in front and back direction described in the embodiment 1-1 is not generated. As described in the embodiment 1-2, the transverse electric field 82 in right and left direction orthogonal to the longitudinal axis LQLS of the liquid crystal molecule 51 causes the liquid crystal molecule 51c located on the source line 21 to be twisted as indicated by the arrow C2 as shown in FIG. 12. So, there are inevitably generated liquid crystal molecules 51 whose longitudinal axes LQLS are going to be oriented in different directions (the liquid crystal molecule 51a located on the pixel electrode 23 and the liquid crystal-molecule 51c located on the source line and twisted in the direction according to the arrow C2 by the transverse electric field 82) in the liquid crystal 5, which facilitates transition from splay alignment to bend alignment. The embodiment 1-2 is particularly preferable for the case where the alignment direction of the liquid crystal molecule 51 defined by the alignment layer 6 is parallel to the source line 21. The other respects are similar to those of the embodiment 1-1.

(Embodiment 1-4)

In an embodiment 1-4, the transverse electric field 81 in front and back direction and the transverse electric field 82 in right and left direction are generated between two pixel electrodes 23 adjacent in front and back direction, thereby facilitating initialization.

As described in the embodiment 1-1 in detail, when the alignment direction of the liquid crystal molecule 51 defined by the alignment layer 6 is parallel to the source line 21, that is, the longitudinal axis LQLS of the liquid crystal molecule 51 is parallel to the source line 21, the generation of only the transverse electric field 81 in front and back direction is not so effective. Accordingly, in the embodiment 1-2, the transverse electric field 82 in right and left direction is generated between two pixel electrodes 23 adjacent in right and left direction. In the embodiment 1-4, the pixel electrode 23 is made to have a predetermined shape, thereby generating the transverse electric field 82 in right and left direction between two pixel electrodes 23 adjacent in front and back direction. Here in below, this will be described in detail.

Figure 13:
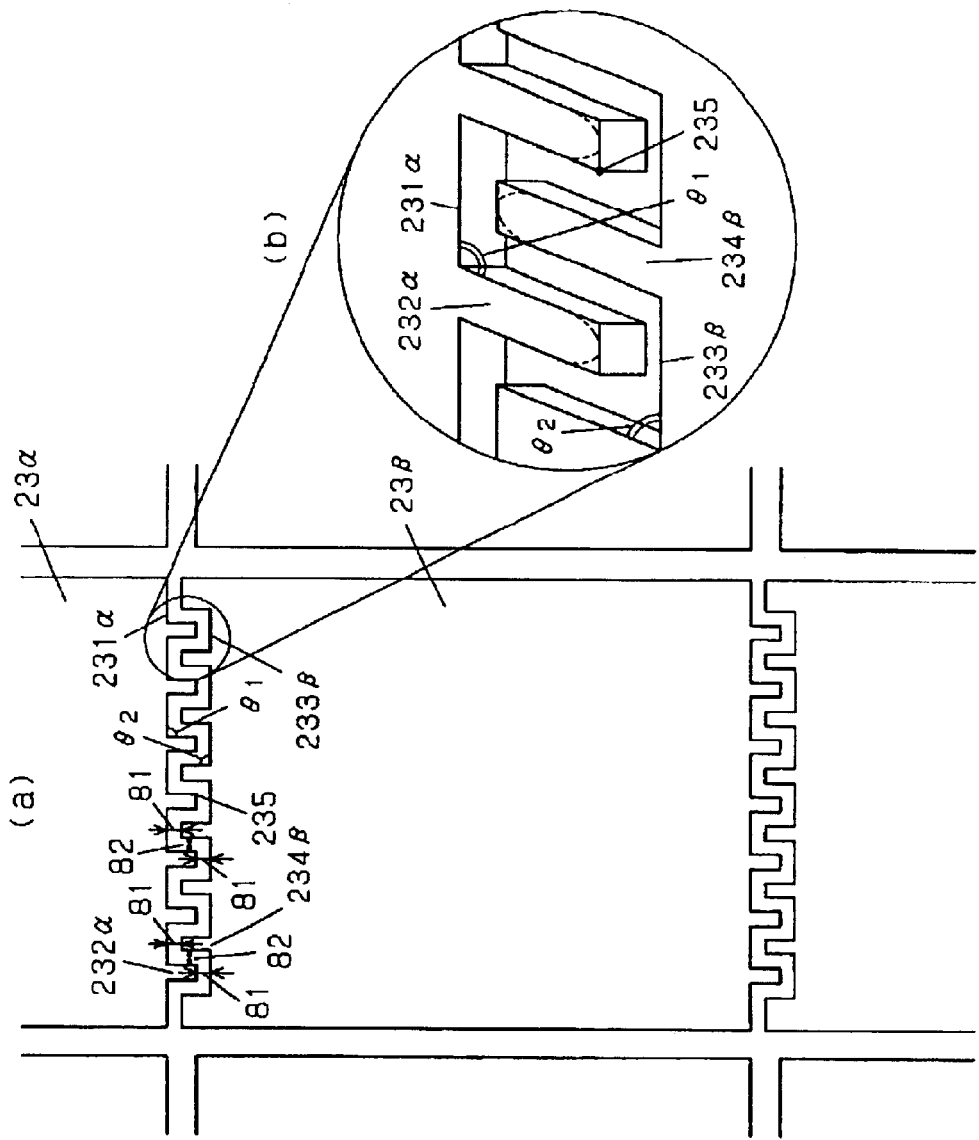

As shown in FIG. 13, in the embodiment 1-4, two pixel electrodes 23á, 23â are adjacent in front and back direction. Here, it is assumed that the pixel electrodes 23á is located on back side and the pixel electrode 23â is located on front side.

A first protrusion 232á extends from a front-side edge 231á of the pixel electrode 23á. On the other hand, a second protrusion 234â extends from a back-side edge 233â of the pixel electrode 23â. In a plan view, the first protrusion 232á and the second protrusion 234â overlap with the gate line 22. Voltages with different polarities are applied to the pixel electrodes 23 adjacent in front and back direction as shown in FIG. 2, in the state in which the first protrusion 232á and the second protrusion 234â are thus engaged with each other, as shown in FIG. 13, the transverse electric field 81 in front and back direction is generated between the first protrusion 232á and the pixel electrode 23â, and between the second protrusion 234â and the pixel electrode 23á, and the transverse electric field 82 in right and left direction is generated between the first protrusion 232á and the second protrusion 234â.

Under the condition, as shown in FIGS. 3, 12, two types of liquid crystal molecules 51 whose longitudinal axes LQLS going to be oriented in different directions are generated in the liquid crystal 5, irrespective of the alignment direction of the liquid crystal molecule 51 defined by the alignment layer 6. Therefore, as mentioned previously, the generation of this two types of liquid crystal molecules 51 brings about "disturbance" state, thereby facilitating transition from splay alignment to bend alignment. In particular, when the alignment direction of the liquid crystal molecule 51 defined by the alignment layer 6 is parallel to the source line 21 and the pixel electrode 23 is perfectly rectangular, "disturbance" does not sometimes occur as already described in the embodiment 1-2. So, when the alignment direction of the liquid crystal molecule 51 defined by the alignment layer 6 is parallel to the source line 21, it is preferable that the pixel electrodes 23á, 23â are respectively provided with the first protrusion 232á and the second protrusion 234 a as in the case of the embodiment 1-4.

If the first protrusion 232á and the second protrusion 234â are extremely small, then the transverse electric field 82 in right and left direction is difficult to generate between the first protrusion 232á and the second protrusion 234â. For this reason, as shown in FIG. 13, it is preferable that the tip end of the first protrusion 232á is located closer to front side than the tip end of the second protrusion 234â (in other words, the tip end of the second protrusion 234â is located closer to back side than the tip end of the first protrusion 232á).

The first protrusion 232á and the second protrusion 234â are not limited in size but the width of these protrusions is approximately 1 ìm to 10 ìm (preferably approximately 5 ìm), and the distance between these protrusions is also approximately 1 ìm to 10 ìm (preferably approximately 5 ìm).

The first protrusion 232á and the second protrusion 234â are respectively provided in the pixel electrodes 23á, 23â in one-to-one correspondence. Nevertheless, the occurrence of the "disturbance" state in more spots can surely facilitate transition from splay to bend alignment. So, it is preferable that the pixel electrodes 23á, 23â are respectively provided with two first protrusion 232á and one second protrusion 234â and the one second protrusion 234â is located between the two first protrusions 232á. It is more preferable that the pixel electrodes 23á, 23â are respectively provided with a plurality of first protrusions 232á and a plurality of second protrusions 234â, and these plurality of first protrusions 232á and second protrusions 234â are engaged with each other like a comb. That is, it is more preferable that one second protrusions 234â is located between adjacent two first protrusions 232á and one first protrusion 232á is located between adjacent two second protrusions 234â.

In FIG. 13, an angle 61 made between the edge 231á and the first protrusion 232á of the pixel electrode 23á is 90°, but an angle causing "disturbance" state as the result of the generation of the two types of liquid crystal molecules 51 whose longitudinal axes LQLS are going to be oriented in different directions in the liquid crystal 5 is satisfactory. So, the angle ê1 not limited to 90° but may be between 10° and 170°. When less than 10°, the angle made between the two types of liquid crystal molecules 51 is too small to cause the disturbance state. Conversely, when greater than 170°, the same problem arises. Angle á2 made between an edge 232á and a second protrusion 234â of the pixel electrode 23â is likewise 90° in FIGS. 13, 11, but is not limited to 90°. The angle á2 may also be between 10° and 170°. Considering ease of design, it is preferable that the angle á1 and the angle á2 are both 90°.

Figure 14:
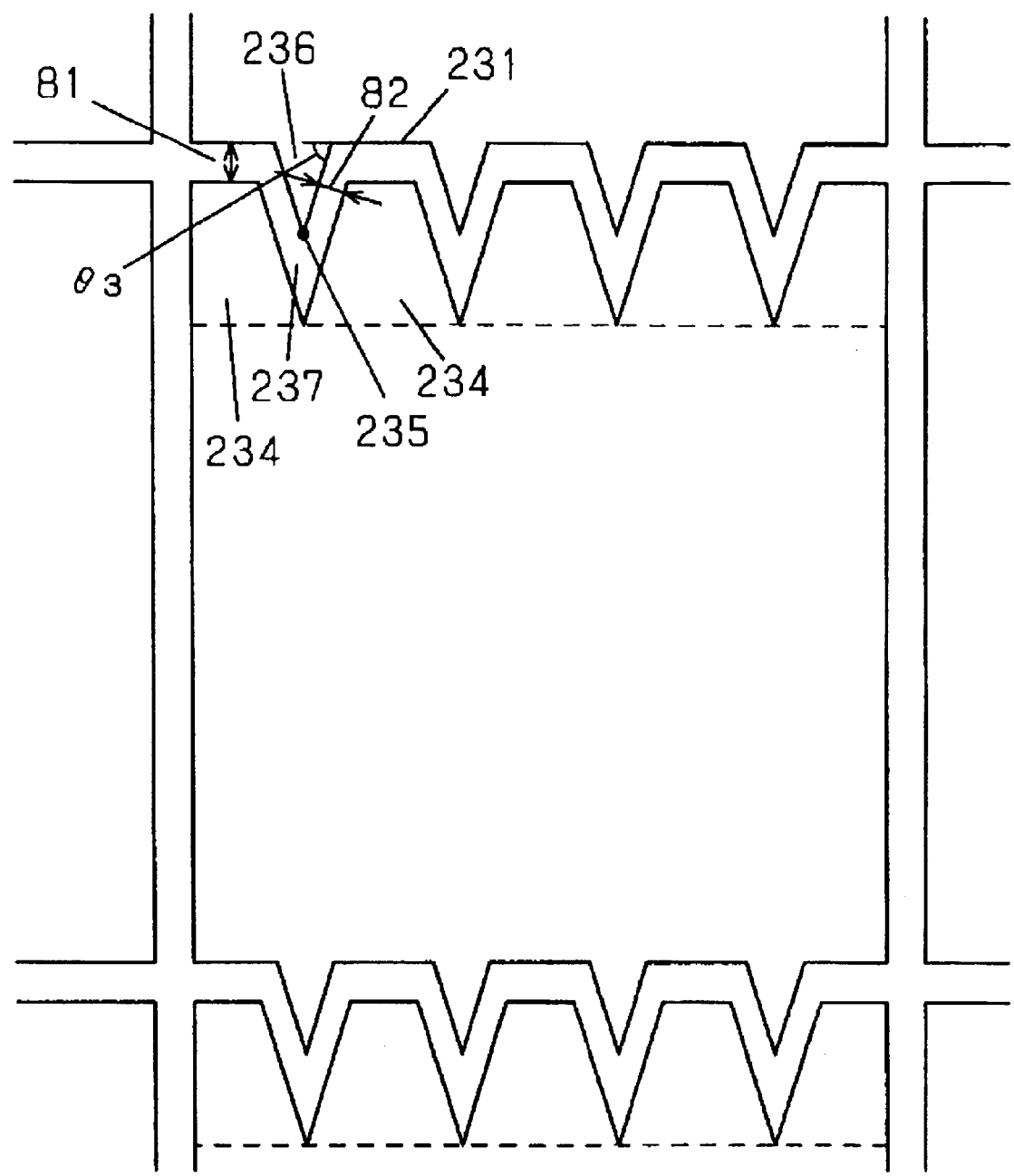
FIG. 14 is a plan view showing a modification of the liquid crystal display according to the embodiment 1-4 of the present invention.

FIG. 14 shows another example of the first protrusion 232á and the second protrusion 234â. In this case, when an angle between the edge 231 and the convex portion 236 of the pixel electrode 23 is represented by á3, the transverse electric field 82 in right and left direction deviates by an angle (90°−á3) from right and left direction. In this structure, the first protrusion 232á is located between adjacent two second protrusions 234â. In other words, the pixel electrode 23á is provided with the convex portion 236á at a front side edge and the pixel electrode 23â is provided with a concave portion 237â at a back side edge, and the convex portion 236á and the concave portion 237â are engaged with each other. Such a structure always brings about "disturbance state" due to the generation of the two types of liquid crystal molecules 51 whose longitudinal axes LQLS are going to be oriented in different directions in the liquid crystal 5 in the same manner described above. As a result, transition from splay alignment to bend alignment is facilitated. As shown in FIG. 14, it is preferable that the tip end of the convex portion 236 has an apex 235.

Figure 15:
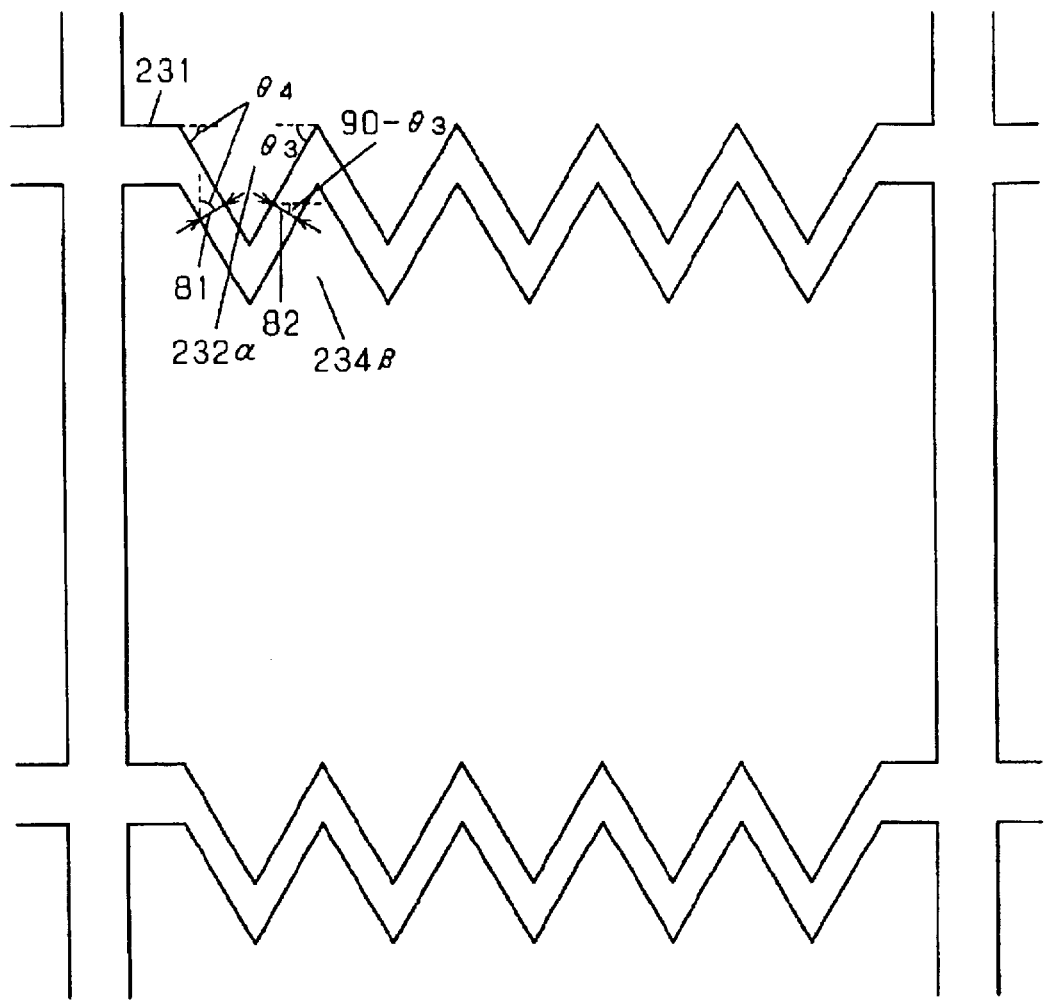
FIG. 15 is a plan view showing another modification of the liquid crystal display according to the embodiment 1-4 of the present invention.

FIG. 15 shows still another example of the first protrusion 232á and the second protrusion 234â. Also in this case, the transverse electric field 81 in front and back direction also deviates from front and back direction. In FIG. 15, when an angle between the edge 231 and the convex portion 236 of the pixel electrode 23 is represented by á4, the transverse electric field 81 in front and back direction, as shown in FIG. 14, deviates by â4 from front and back direction. Such a structure always brings about "disturbance" state as the result of the generation of the two types of liquid crystal molecules 51 whose longitudinal axes LQLS are going to be oriented in different directions in the liquid crystal 5 in the same manner described above. As a result, transition from splay alignment to bend alignment is facilitated.

In the embodiment 1-4, in order to sufficiently generate the transverse electric field 81 in front and back direction and the transverse electric field 82 in right and left direction between the first protrusion 232á and the second protrusion 234â, the pixel electrodes 23 are provided in a layer different from that of the gate lines 22 with an insulating layer (not shown) interposed between them. Similarly to the embodiment 1-2, it is preferable that the pixel electrodes 23 are provided in a layer different from that of the source lines 21 with the insulating layer (not shown) interposed between them.

It is preferable that the first protrusion 232á and the second protrusion 234â respectively have apexes 235 as shown in FIG. 13. As indicated by a dotted line in FIG. 13, when edges of the apex 235 of the first protrusion 232á are cut off to be of a large R (specifically, R having a radius exceeding 1 ìm), the change in the orientation direction of the liquid crystal molecules 51 whose longitudinal axes LQLS are going to be oriented in different directions in the liquid crystal 5, becomes small. This might result in insufficient "disturbance" for facilitating transition from splay alignment to bend alignment. To obtain great change in the orientation direction of the liquid crystal molecules 51 whose longitudinal axes LQLS are going to be oriented in different directions in the liquid crystal 5, it is preferable that the first protrusion 232á and the second protrusion 234â respectively have apexes 235.

In the embodiment 1-4, voltages with different polarities are applied to two pixel electrodes 23á, 23â adjacent in front and back direction. Therefore, the polarities of the two pixel electrodes 23 adjacent in right and left direction may be the same or differ from each other. It should be appreciated that, with the different polarities of the pixel electrodes 23 adjacent in right and left direction, the transverse electric fields 82 in right and left direction is generated between adjacent two pixel electrodes 23 in right and left direction, thereby facilitating transition from splay alignment to bend alignment as described in the embodiment 1-2. So, it is preferable that the polarities of the two pixel electrodes 23 adjacent in right and left direction are different.

Although the first protrusion 232á and the second protrusion 234â may be formed independently, the first protrusion 232á is preferably formed integrally with the transparent pixel electrode 23á, in the light of ease of creation. A material of the transparent pixel electrode 23 could be tin and indium oxide (ITO). The same is the case with the second protrusion 234â and the pixel electrode 23â.

(Embodiment 1-5)

In an embodiment 1-5, the transverse electric field 81 in front and back direction and the transverse electric field 82 in right and left direction are generated between two pixel electrodes 23 adjacent in right and left direction, thereby facilitating initialization.

Figure 16:
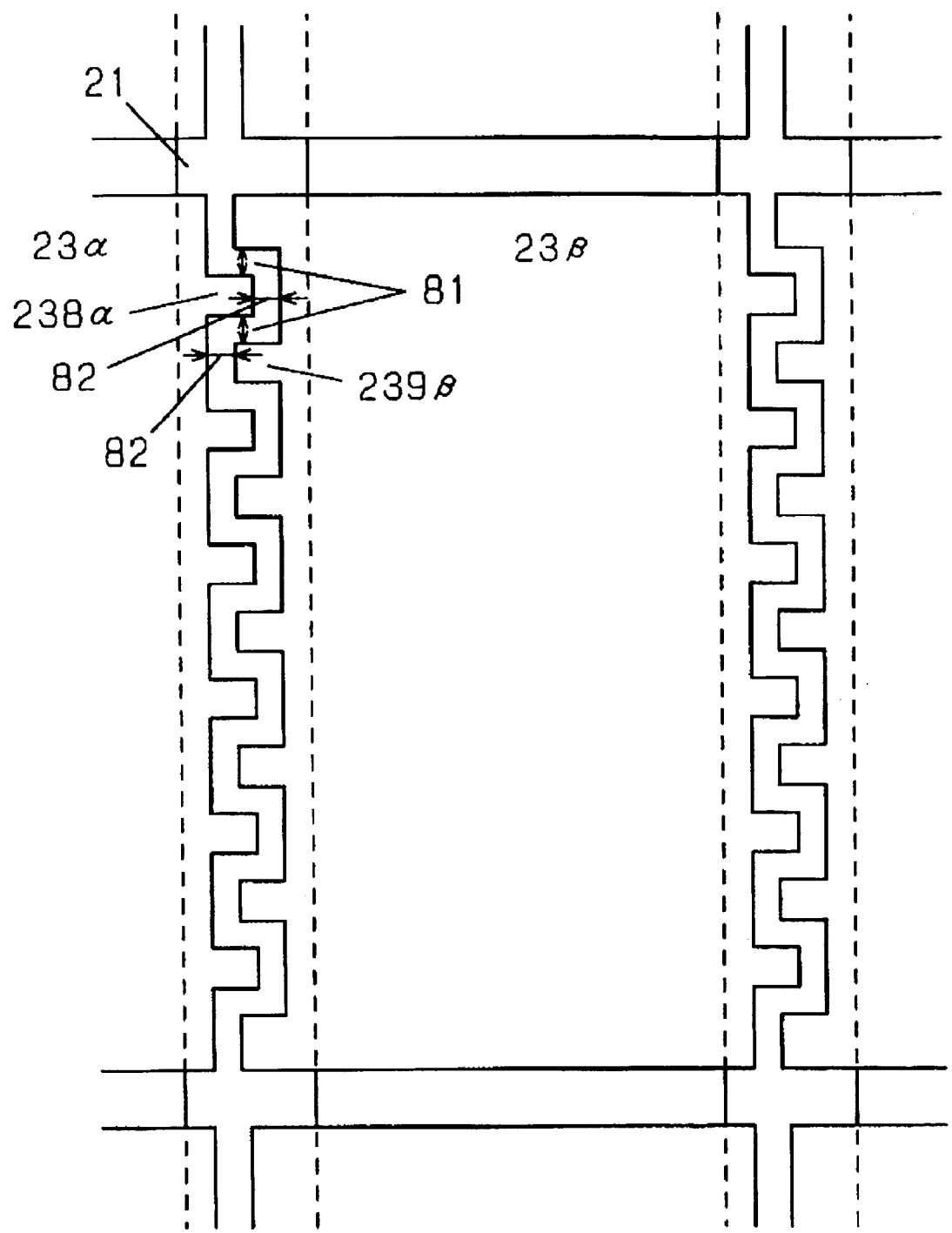
FIG. 16 is a plan view showing a liquid crystal display according to an embodiment 1-5 of the present invention.

Similarly to the embodiment 1-4, as shown in FIG. 16, the two pixel electrodes 23á, 23â adjacent in right and left direction are respectively provided with a third protrusion 238á and a fourth protrusion 239â. The third protrusion 238á and the fourth protrusion 239â overlap with the source line 21 seen in a plan view. For easier understanding of explanation, here it is assumed that the pixel electrode 23á is located on the left side and the pixel electrode 23â is located on the right side.

By applying voltages with different polarities to the two pixel electrodes 23á, 23â adjacent in right and left direction, respectively, the transverse electric field 82 in right and left direction is generated between the third protrusion 238á and the pixel electrode 23â on the right side and between the fourth protrusion 239â and the pixel electrode 23á on the left side, as in the case of the embodiment 1-4. In addition, the transverse electric field 81 in front and back direction is generated between the third protrusion 238á and the fourth protrusion 239â. This causes the "disturbance" state, thereby facilitating transition from splay alignment to bend alignment.

In the embodiment 1-5, voltages with different polarities are applied to two pixel electrodes 23á, 23â adjacent in right and left direction, respectively. Therefore, the polarities of the two pixel electrodes 23 adjacent in front and back direction may be the same or differ from each other. It should be appreciated that, with the different polarities of the pixel electrodes 23 adjacent in front and back direction, the transverse electric field 81 in front and back direction is generated between two pixel electrodes 23 adjacent in front and back direction, thereby facilitating transition from splay alignment to bend alignment as described in the embodiment 1-1. So, it is preferable that the polarities of the two pixel electrodes 23 adjacent in front and back direction are different. Further, the first protrusion 232 and the second protrusion 234 of FIG. 14 and FIG. 15 may be converted into a third protrusion 238 and a fourth protrusion 239 of FIG. 16.

(Embodiment 1-6)

Figure 17:
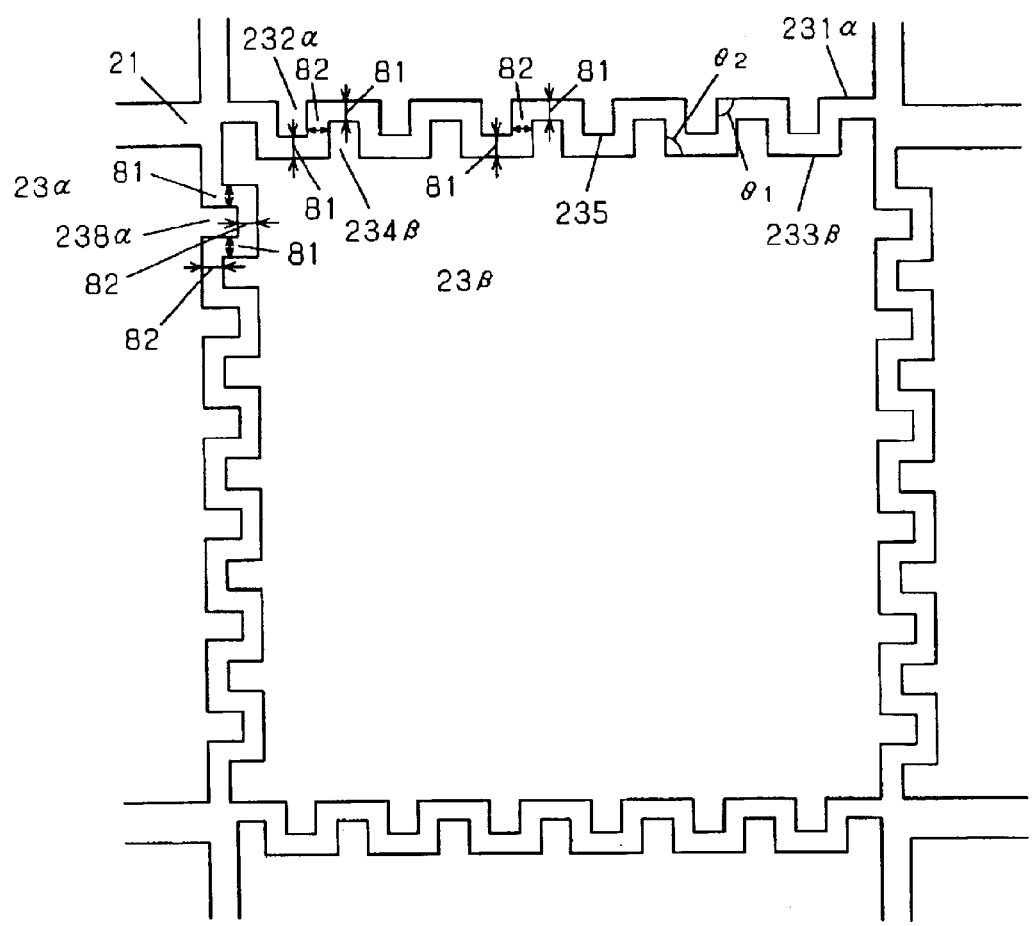
FIG. 17 is a plan view showing a liquid crystal display according to an embodiment 1-6 of the present invention.
Figure 18:
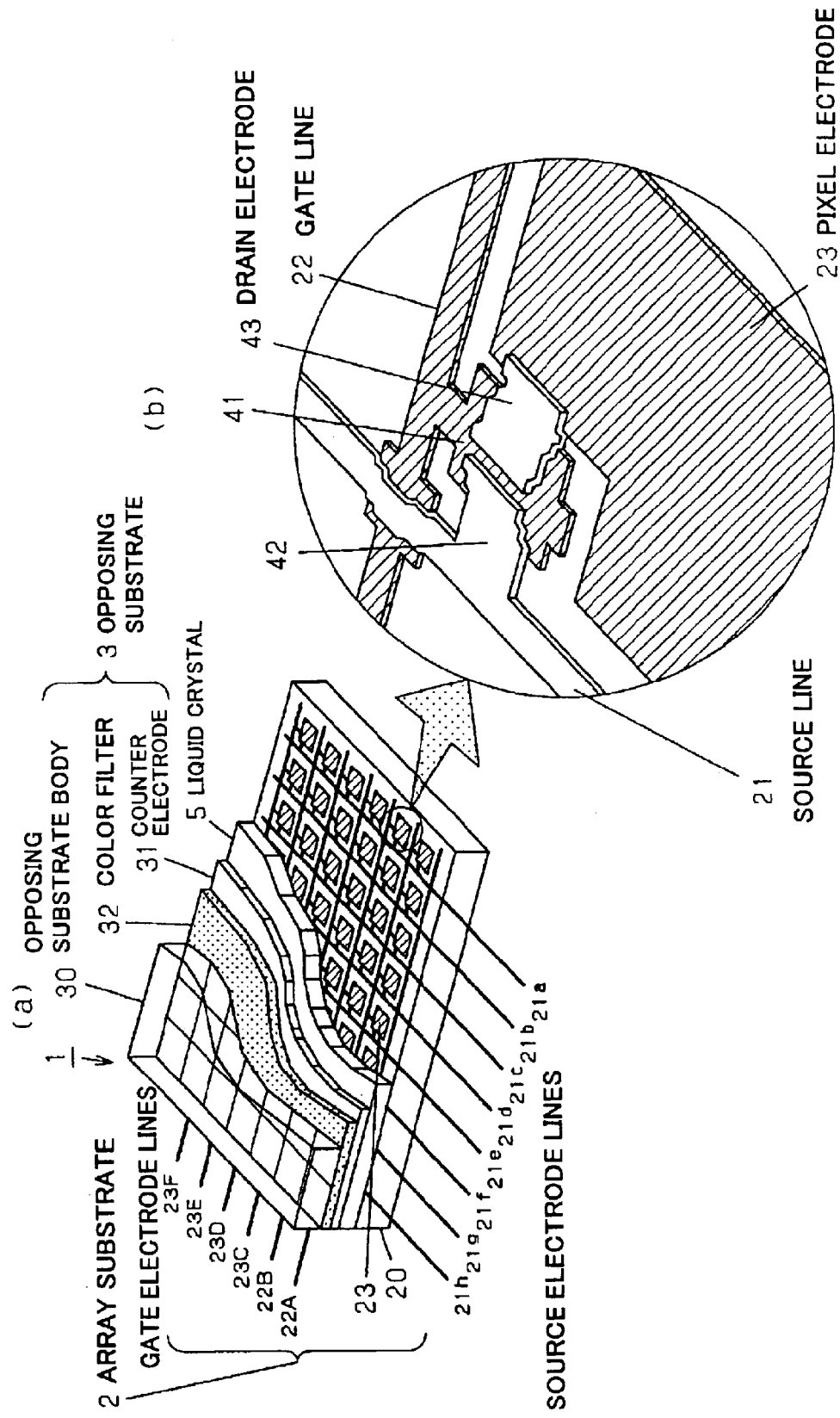
Figure 19:
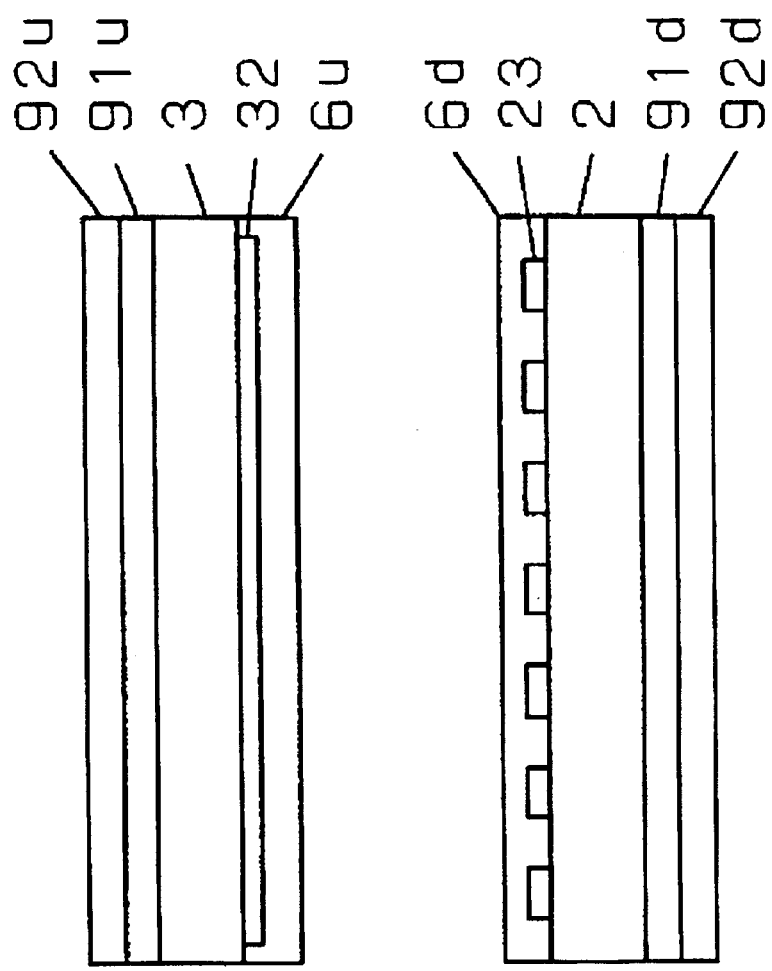
FIG. 19 shows a general cross-sectional structure of the OCB-type liquid crystal display.
Figure 20:
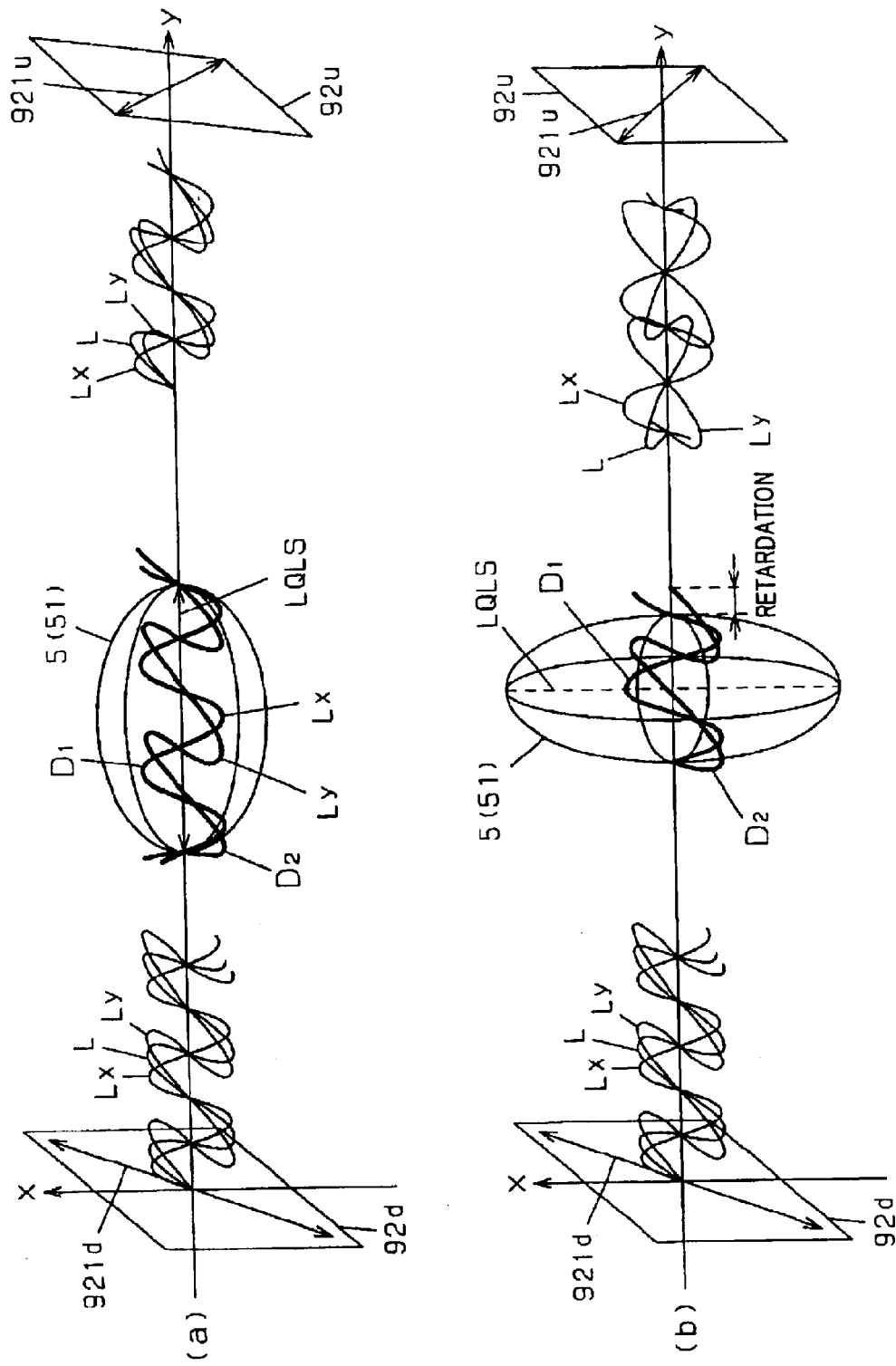
FIG. 20 is a conceptual view of retardation.
Figure 21:
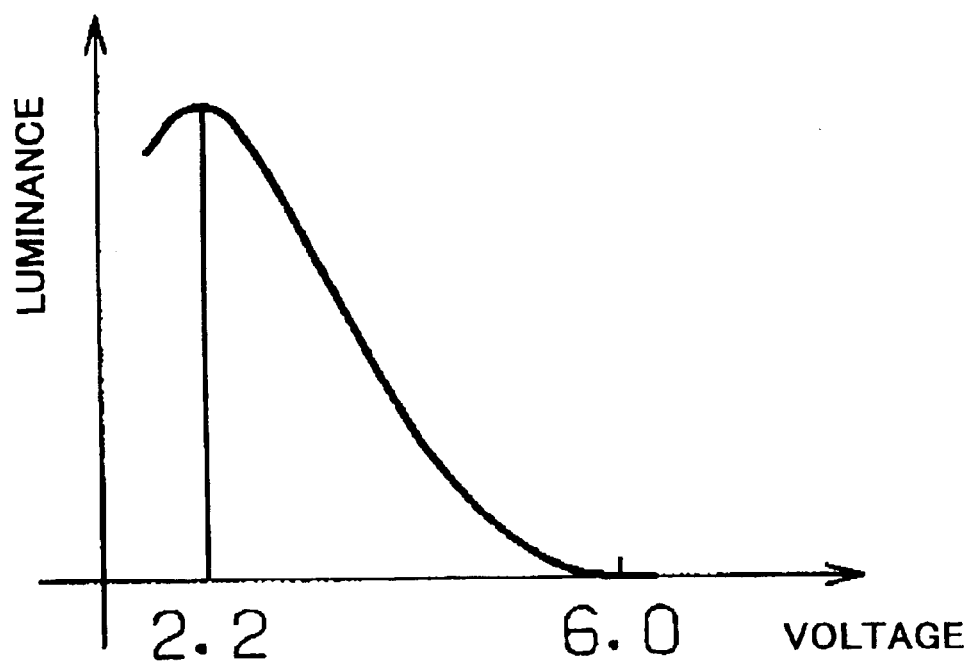
FIG. 21 is a graph showing luminance-voltage characteristic of general OCB-mode liquid crystal.
Figure 22:
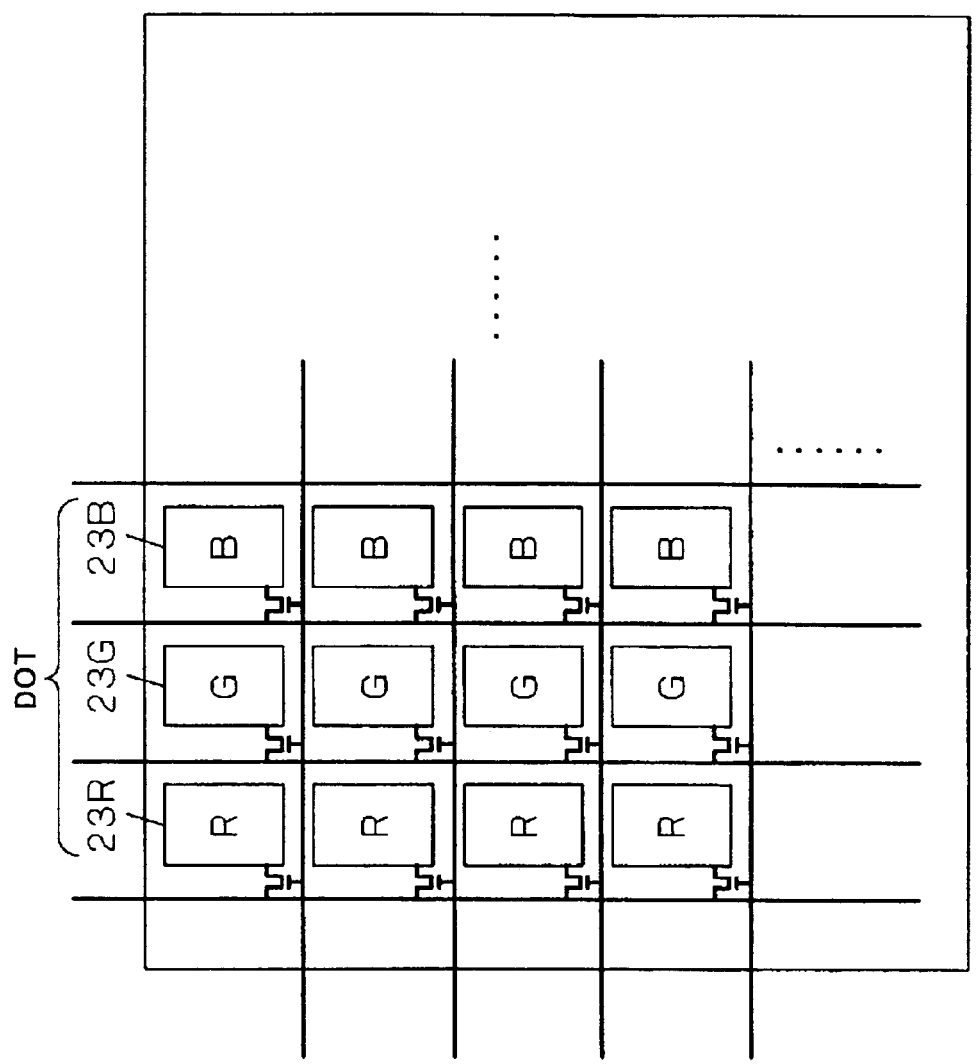
FIG. 22 is a general plan view of the OCB-type liquid crystal display comprising color filters.
Figure 24:
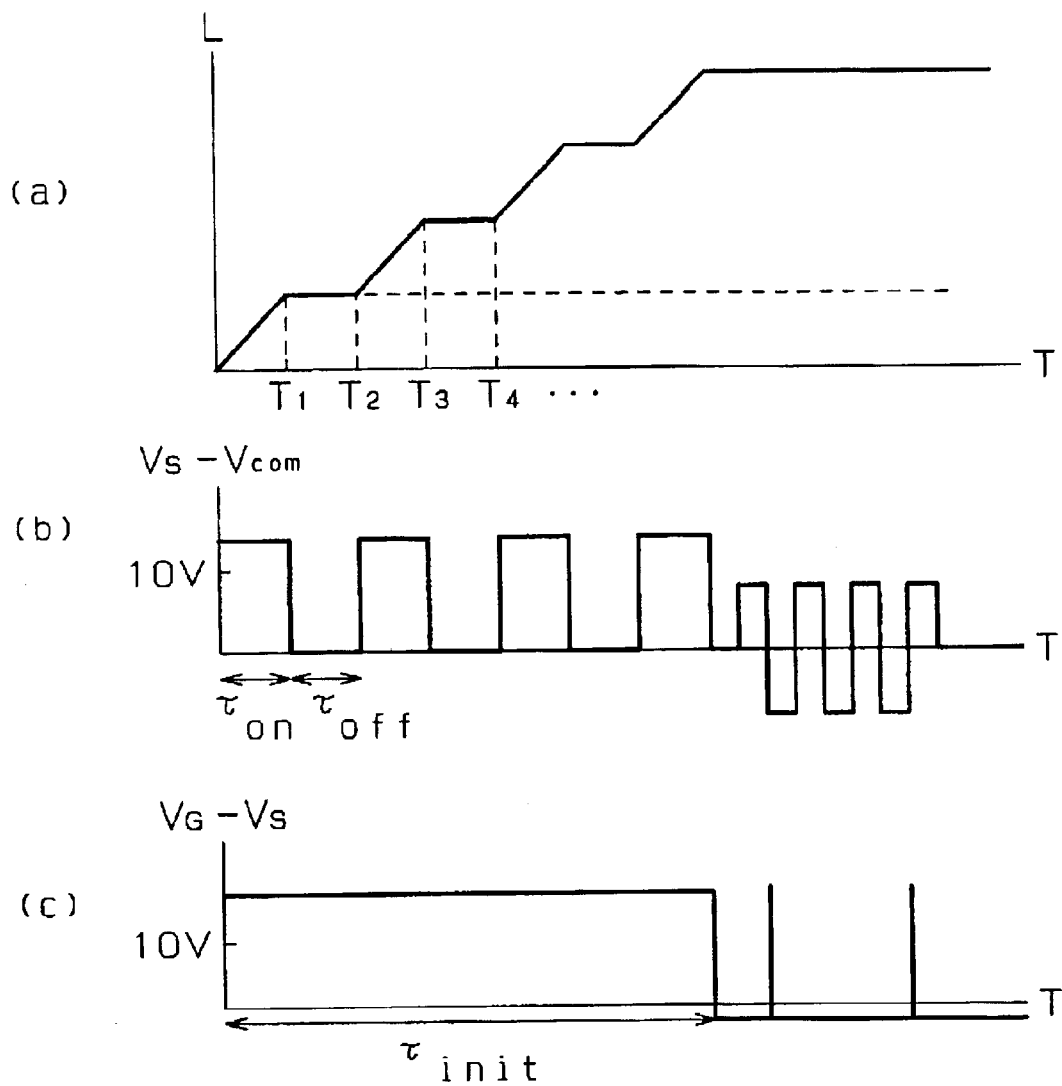
FIG. 24 is a view showing drive voltage in initialization described in Publication of Unexamined Patent Application No. Hei. 10-206822.

An embodiment 1-6 is obtained by combination of the embodiment 1-4 and the embodiment 1-5. Specifically, as shown in FIG. 17, the first protrusion 232 is provided at a front side edge of the pixel electrode 23, the second protrusion 234 is provided at a back side edge of the pixel electrode 23, the third protrusion 235 is provided at a right side edge of the pixel electrode 23, and the fourth protrusion 236 is provided at a left side edge of the pixel electrode 23. The protrusions 232–236 cause the generation of the transverse electric field 81 in front and back direction and the transverse electric field 82 in right and left direction between them and the protrusions 232–236 provided in the same manner in the pixel electrodes 23 adjacent in front and back direction and right and left direction.

In the embodiment 1-6, the transverse electric field 81 in front and back direction and the transverse electric field 82 in right and left direction are generated between the pixel electrodes 23 in front and back direction and between the pixel electrodes 23 in right and left direction, respectively. For this purpose, it is preferable that the voltages respectively applied to the two pixel electrodes 23 adjacent in front and back direction are made different in polarity and the voltages respectively applied to the two pixel electrodes 23 adjacent in right and left direction are made different in polarity. Further, the first protrusion 232 and the second protrusion 234 of FIG. 14 and FIG. 15 may be converted into the third protrusion 238 and the fourth protrusion 239 of FIG. 16.

It should be appreciated that those skilled in the art who know laminating technique and photolithography, or etching technique are capable of creating the liquid crystal display according to the embodiment 1 in an appropriate manner.
(Embodiment 2)

Subsequently, preferable embodiments of liquid crystal displays according to the inventions of a second group will be described in embodiment 2 described below.
(Embodiment 2-1)

Figure 26:
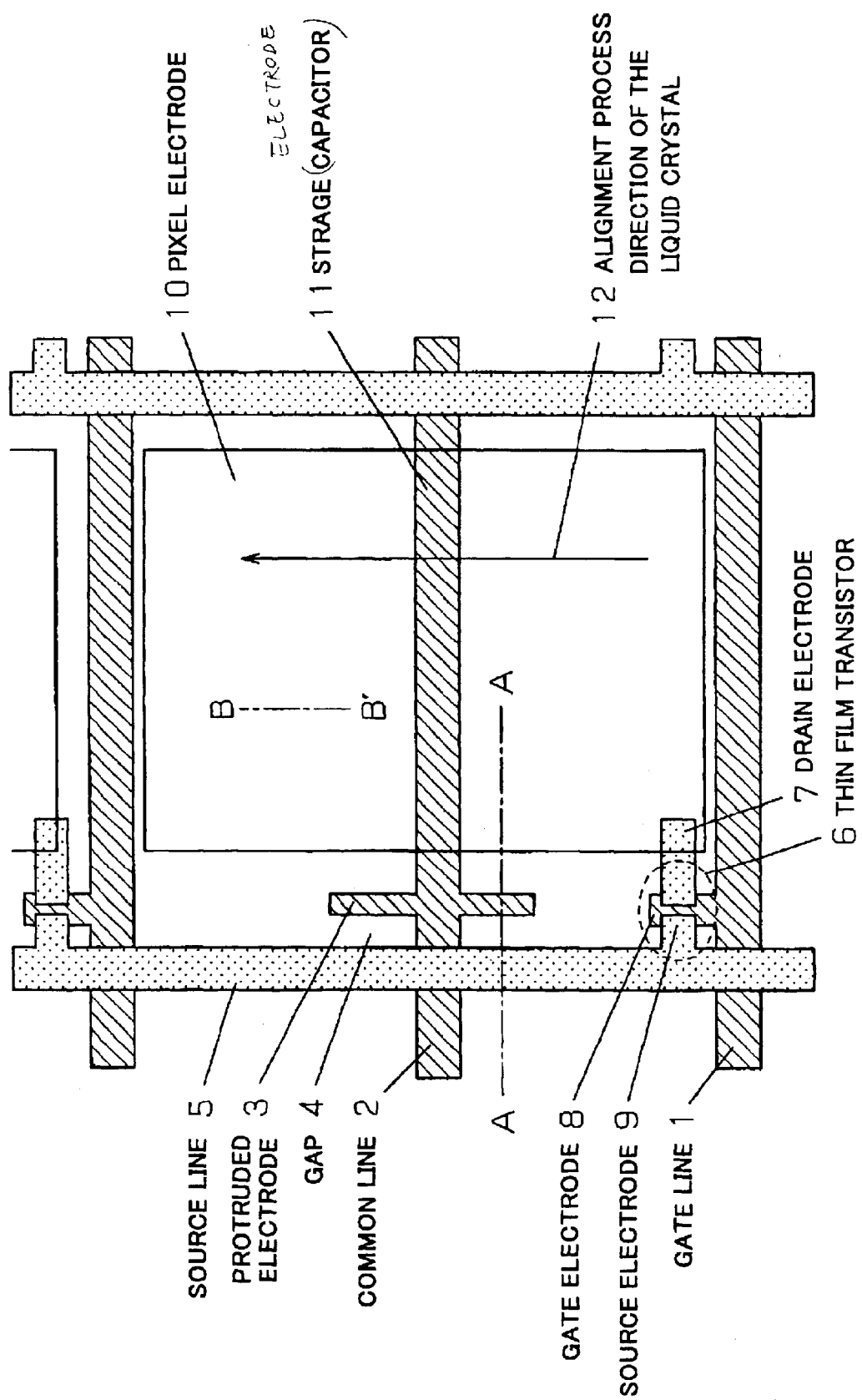
FIG. 26 is a plan view showing a constitution of a liquid crystal display according to an embodiment 2-1.
Figure 27:
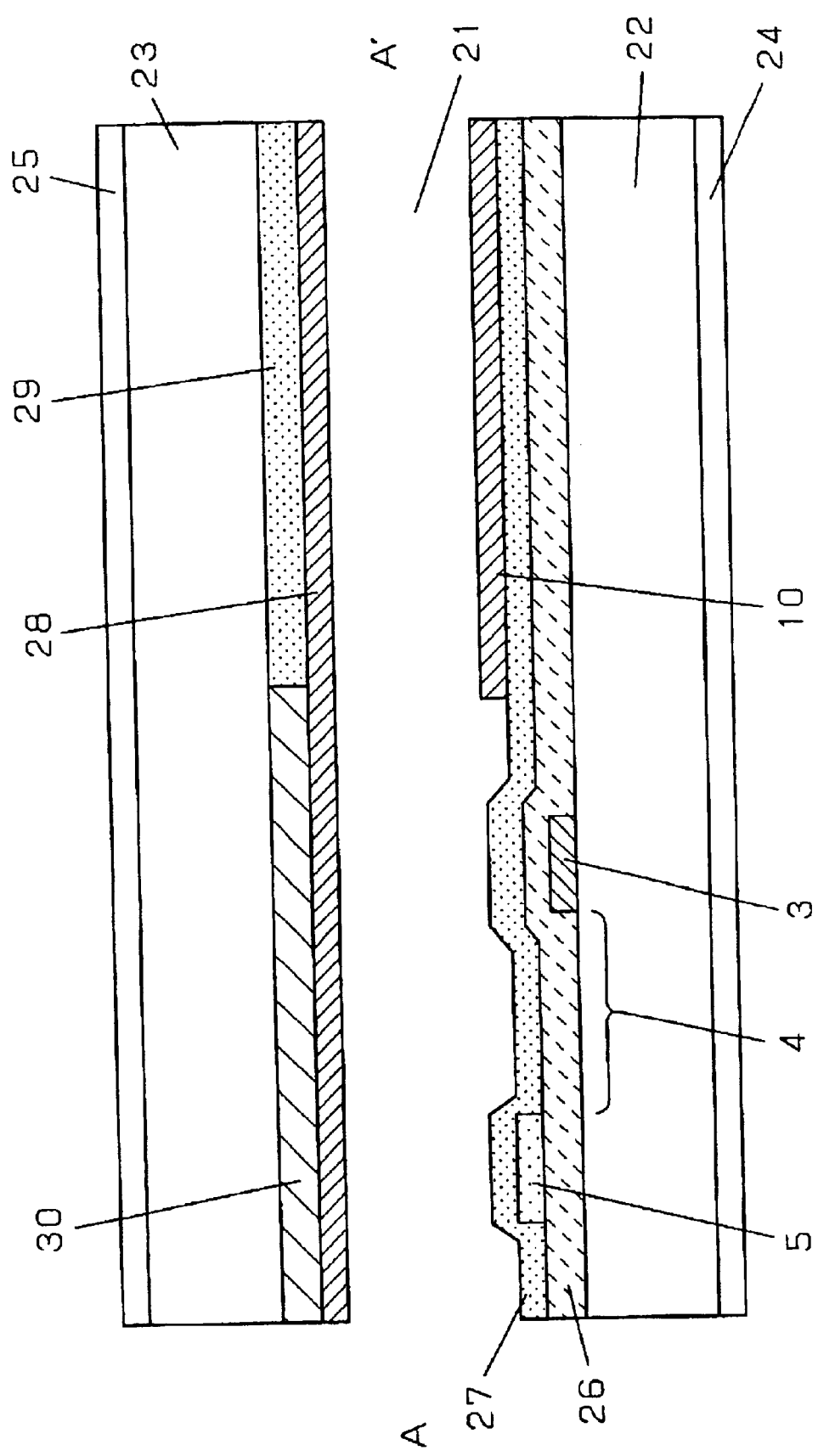
FIG. 27 is a cross-sectional view showing the constitution of the liquid crystal display according to the embodiment 2-1.

FIG. 26 is a plan view showing a constitution of one pixel of a liquid crystal display according to an embodiment 2-1, and FIG. 27 is a cross-sectional view along line A–A' of FIG. 27.

In the Figures, 10 denotes a pixel electrode and voltage is applied to the pixel electrode and a counter electrode 28 to cause a liquid crystal layer 21 to operate, thereby conducting display. A thin film transistor (TFT; Thin Film Transistor) 6 for switching is connected to the pixel electrode through a drain electrode 7. 1 denotes a gate line through which ON/OFF of the thin film transistor is scanned. 5 denotes source line through which voltage is supplied to the pixel electrode. 2 denotes a common line and a portion thereof which overlaps with the pixel electrode forms a storage capacitor 11. The storage capacitor functions as a parallel capacitor with respect to a liquid crystal capacitor which is formed on the pixel electrode for preventing reduction of a pixel potential due to a leak current of the TFT. 12 denotes alignment process direction of the liquid crystal by rubbing or the like.

22 and 23 denote substrates, between which liquid crystal 21 is interposed. 24, 25 denote polarizers for polarized light display. Retardation film is bonded to a substrate-side surface of the polarizer as necessary for the purpose of regulating phase of polarized light to improve contrast or viewing angle characteristic. 26 denotes a first insulating film between a gate electrode 8 and a source electrode 5 and 27 denotes a second insulating film for protecting the TFT. Backlight for display is placed below the polarizer 24, although this is not shown, and light from the backlight is blocked or transmitted, thereby conducting display. 29 denotes a color filter for color display and 30 denotes a black matrix for blocking light leakage around the pixel. This constitution is substantially the same as that of the conventional liquid crystal display.

In the liquid crystal display of the present invention, the common line 2 is branched to be formed into a protruded electrode 3. This generates an electric field in substrate in-plane direction in a gap 4 between the source line 5 and the protruded electrode 3, thereby facilitating transition from splay alignment to bend alignment. Hereinbelow, this effect will be described.

In the liquid crystal display of this embodiment, in a preparation step for initialization (transition), on-potential of about 15–20V is applied to the gate electrode, thereby turning ON the TFT, while keeping the potential of the source electrode at 0 V. As a result, 0V potential is written onto the pixel electrode. The liquid crystal display has a plurality of gate electrodes, which may be scanned for writing of potential for every line, or otherwise, the on-voltage may be applied to the electrodes all at once, thereby writing potential to all the pixels.

At this time, if the potential of the common electrode and the protruded electrode are set to 0 V, then the protruded electrode, the source line, and the pixel electrode are at equipotential (0 V) and therefore, the electric field is not applied to the liquid crystal layer around the pixel portion and the source line portion. By setting the gate electrode to 0V after writing 0 V potential to all the pixels, the electric field applied to the liquid crystal layer is completely eliminated, and therefore more desired state is attained. However, if the next step is conducted in the state in which voltage is being applied to the gate electrode, there is no change in description below.

Figure 28:
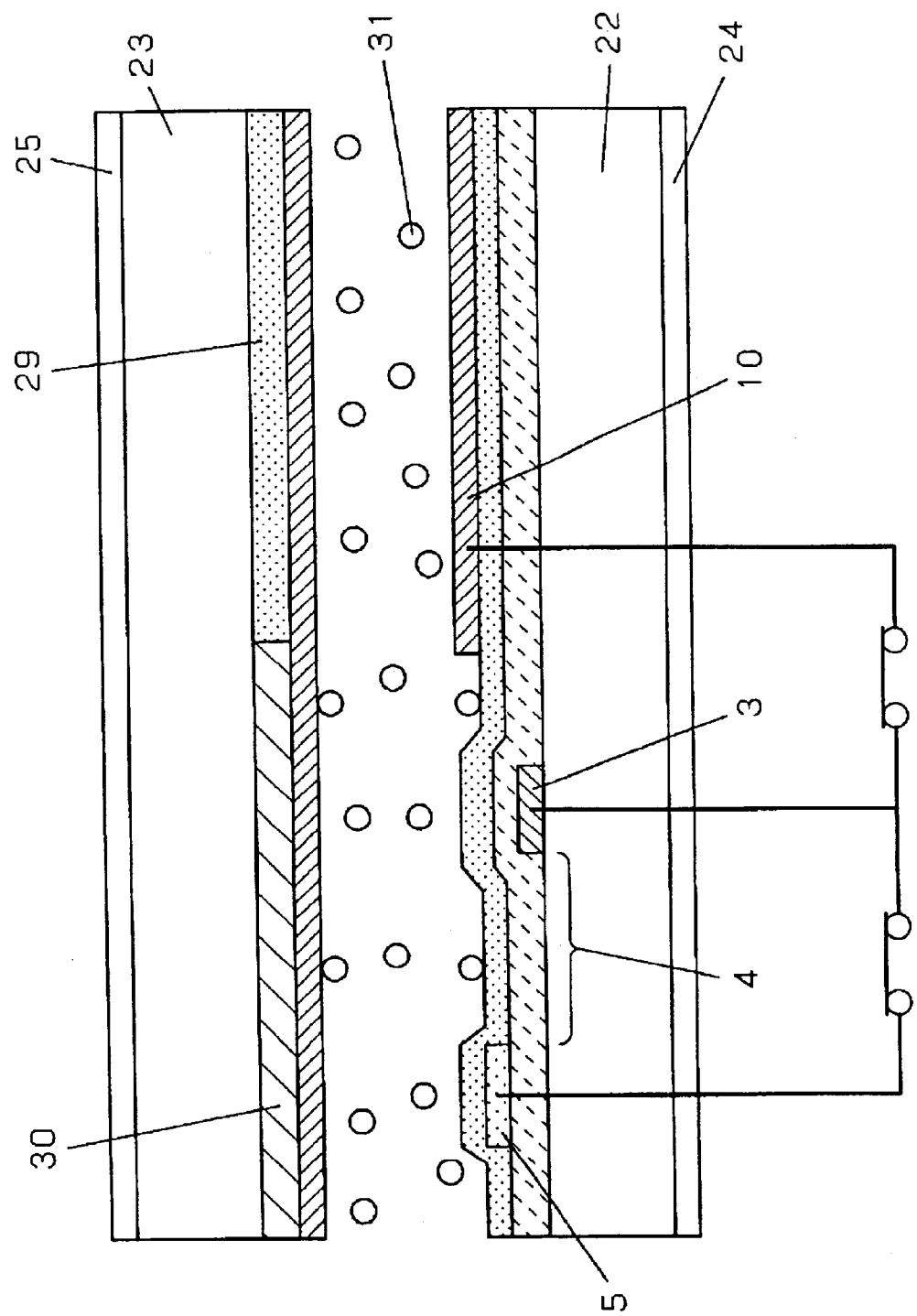
FIG. 28 is a cross-sectional view for explaining an arrangement state of liquid crystal molecules according to the embodiment 2-1.

After the preparation step, the liquid crystal display of this embodiment enters an initial state shown in cross-sectional view of FIG. 28. In the Figure, 31 denotes liquid crystal molecules. Since there is no electric field applied to the liquid crystal layer, the liquid crystal molecules are arranged with their longitudinal axes oriented along the direction of the alignment process by rubbing. This Figure is a cross-sectional view along the direction orthogonal to the alignment process direction, and therefore, the longitudinal axes of the liquid crystal molecules are arranged toward substantially the depth direction of the Figure. In actuality, the liquid crystal molecules have pretilt angles in the range from several degrees to several tens degrees along in the depth direction of Figure, but these are not illustrated in the Figure.

Figure 45:
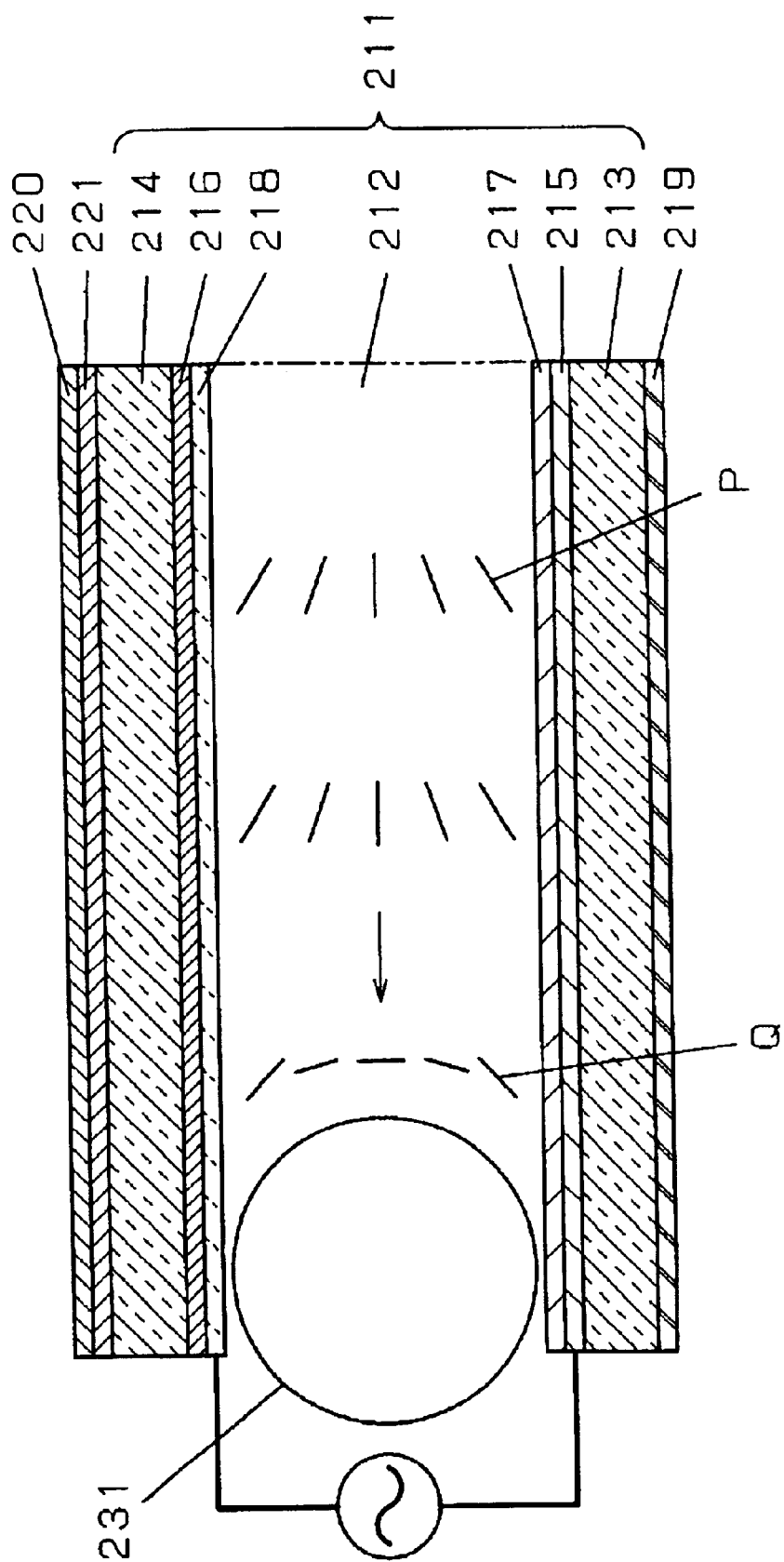
FIG. 45 is across-sectional view for explaining alignment state of liquid crystal molecules.

In this state, the liquid crystal has splay alignment, and therefore, in the cross-section in the rubbing direction (direction along line b–b' of FIG. 26), the liquid crystal molecules are arranged as indicated by p in FIG. 45.

Figure 29:
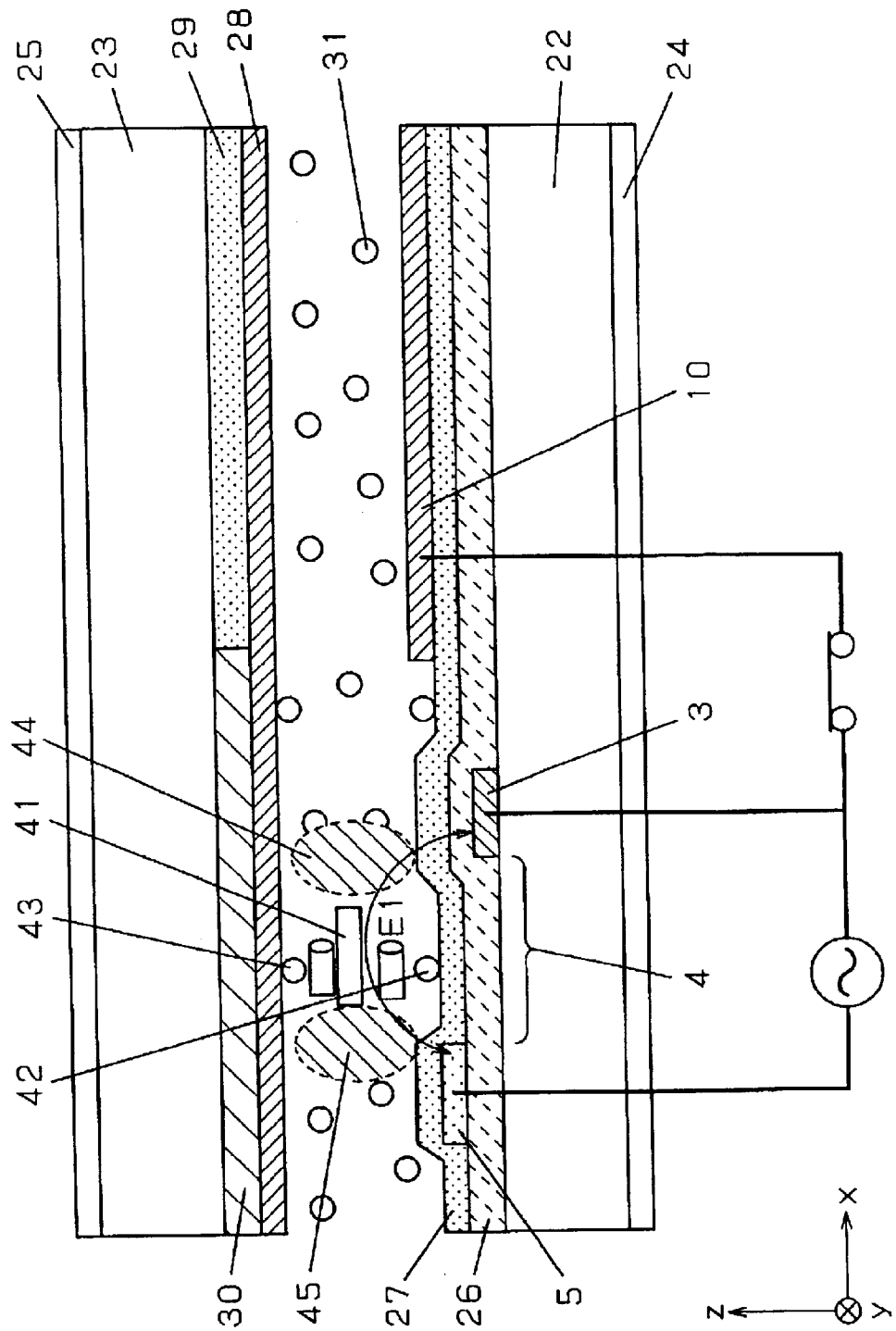
FIG. 29 is a cross-sectional view for explaining an arrangement state of liquid crystal molecules according to the embodiment 2-1.

FIG. 29 is a cross-sectional view showing a first step of initialization (transition) in the liquid crystal display of this embodiment. By applying voltage to the source electrode while keeping the protruded electrode at 0 V, electric field E1 in the substrate in-plane direction is generated around the gap 4. This allows a liquid crystal molecule 41 located at the center of the liquid crystal layer around the gap to be oriented toward the direction of the electric field E1. Liquid crystal molecules 42, 43 located at interfaces of the gap remain immobilized by an anchoring effect of the alignment process regardless of application of the electric field. As a result, the liquid crystal molecules around the gap are arranged such that their axes are twisted in Z direction of the Figure. On the other hand, the liquid crystal molecules around region other than the gap are in arrangement state of FIG. 28. Therefore, regions 44, 45 where liquid crystal arrangement state is transitioning are formed at boundary portions.

The higher voltage applied to the source electrode facilitates formation of twisted structure, and voltage of 5 V or more is satisfactory in practice. Considering performance of a signal-side driver IC, it is desirable to set the voltage to about 5 V to 10 V. Also, it is desirable that the voltage applied to the source electrode should be AC voltage with several tens to several tens kHz. This is because, at extremely low frequency, ions are unevenly distributed in the vicinity of the line, which results in display unevenness, whereas at extremely high frequency, waveform is distorted by time constant of the source line, which results in insufficient voltage application. In case of a 15-type liquid crystal display having 1280×720 pixels, the lower limit is 10 Hz and the upper limit is 50 kHz.

To attain satisfactory twisted state, it is desirable to continue to apply the transverse electric field during time equal to or longer than response time of the liquid crystal. Considering that the response time of the liquid crystal is several milliseconds, it is desirable that after application for 1 millisecond, or more preferably 5 millisecond or more, the subsequent step should be conducted.

Figure 30:
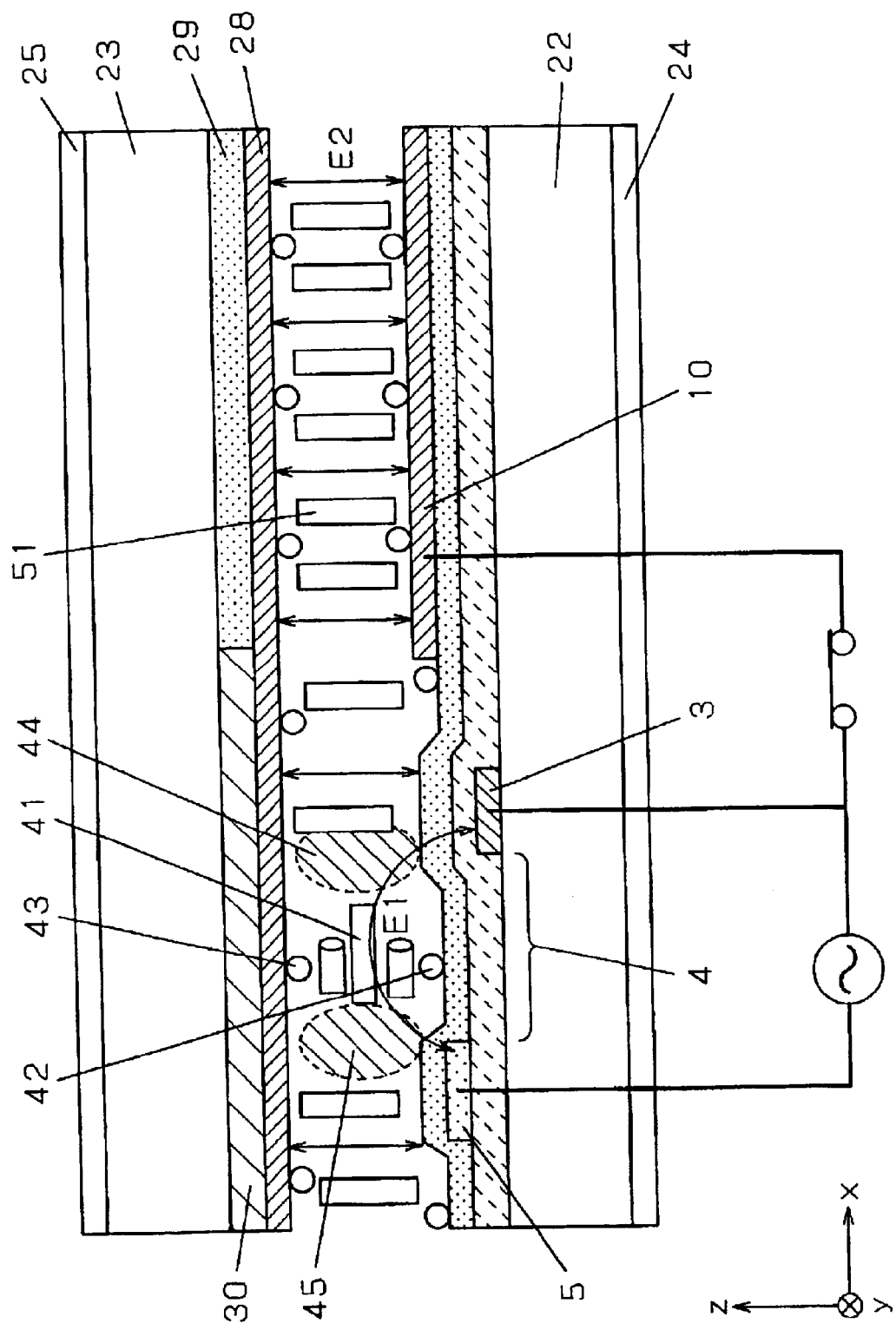
FIG. 30 is a cross-sectional view for explaining an arrangement state of liquid crystal molecules according to the embodiment 2-1.
Figure 31:
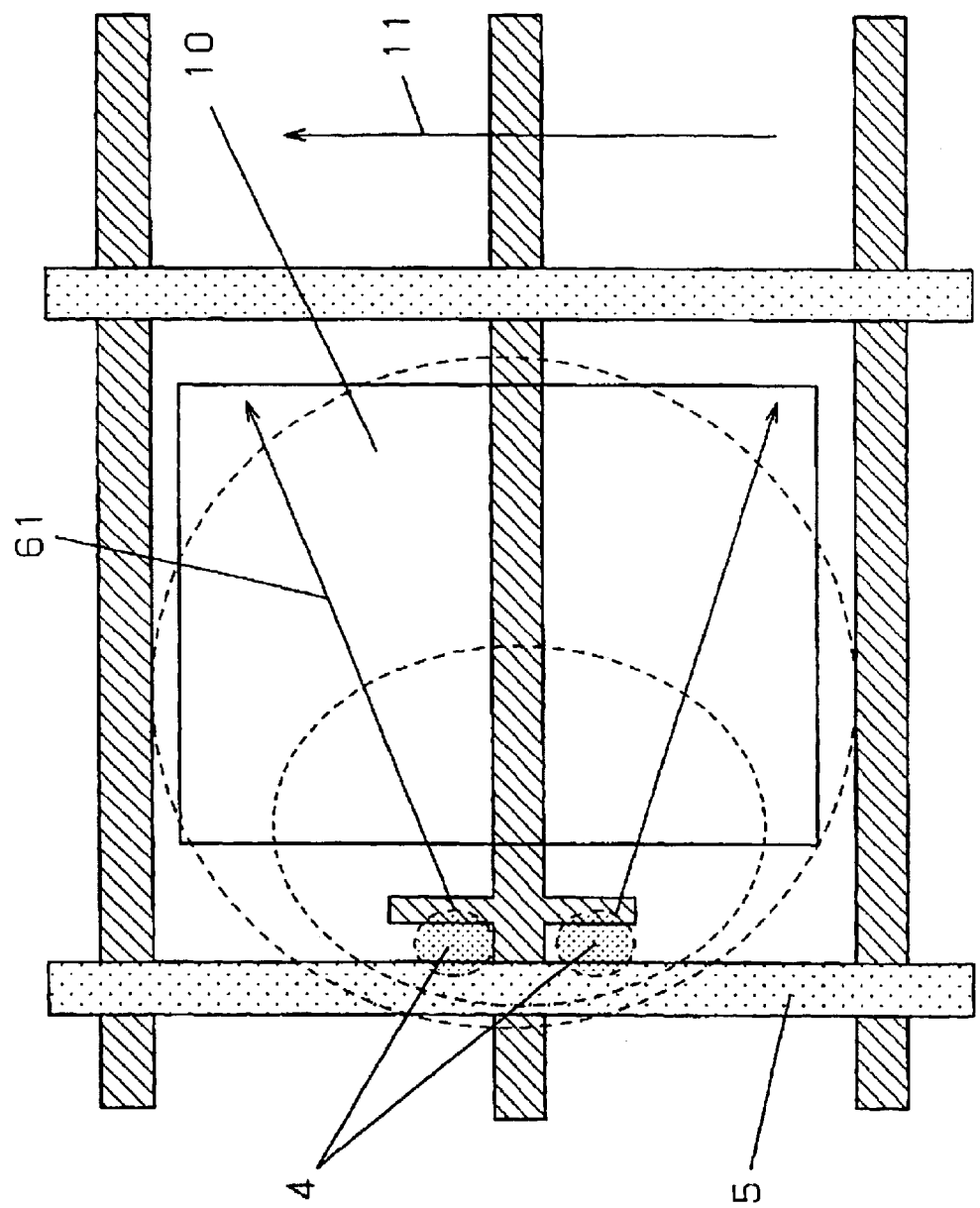
FIG. 31 is a plan view for explaining how transition spreads according to the embodiment 2-1.

FIG. 30 is a cross-sectional view illustrating a second step of initialization (transition). An electric field E2 vertical to the substrate plane is applied to the liquid crystal layer by applying voltage to the counter electrode 28, the liquid crystal molecule 51 is caused to rise up from the substrate plane. FIG. 31 is a plan view schematically showing how the bend alignment at this time spreads. First, in the vicinity of the gap 4 to which the transverse electric field is applied by application of the electric field E2, there is formed a bend alignment portion, which is spreading along the direction indicated by 61, and in time, the entire pixel has the bend alignment. In accordance with the liquid crystal display of this embodiment, the transition from splay alignment to bend alignment is conducted by far more easily and reliably than that of the conventional liquid crystal display.

The reason for this is considered to be as follows. In the transition regions 44, 45 in the liquid crystal arrangement state formed in the first step, the arrangement of the liquid crystal is unstable in contrast with the other portion. While it is necessary to go beyond energy-potential wall for transition between splay alignment and bend alignment because they are discontinuous two alignment states, in the above-identified transition regions, the arrangement of the liquid crystal involves unstable factor, and hence, the energy-potential wall is relatively low. Accordingly, by applying the second electric field E2 to these regions, the bend alignment state can be formed relatively easily.

The higher voltage applied to the counter electrode can reduce the transition time, but places a large burden on a power-supply circuit. To meet both of these, it is desirable that the voltage should be between 10 V and 30 V in practice. It is also desirable that its frequency should be between 0.1 Hz and 50 Hz. Since the counter electrode has a large electric capacity because it is formed over the entire screen, frequency as high as not less than several hundreds Hz is unwanted because this increases power or burden placed on polarity switching in the drive circuit.

In the above description, in the preparation step for initialization (transition), on-potential is applied to the gate electrode, thereby turning ON the TFT, while keeping the potential of the source electrode at 0 V. The effect of the preparation step is that stable transition performance is obtained by the same arrangement state at every starting, but the preparation step may be sometimes omitted. The reason for this is that the first and second steps can carry out transition operation.

Figure 46:
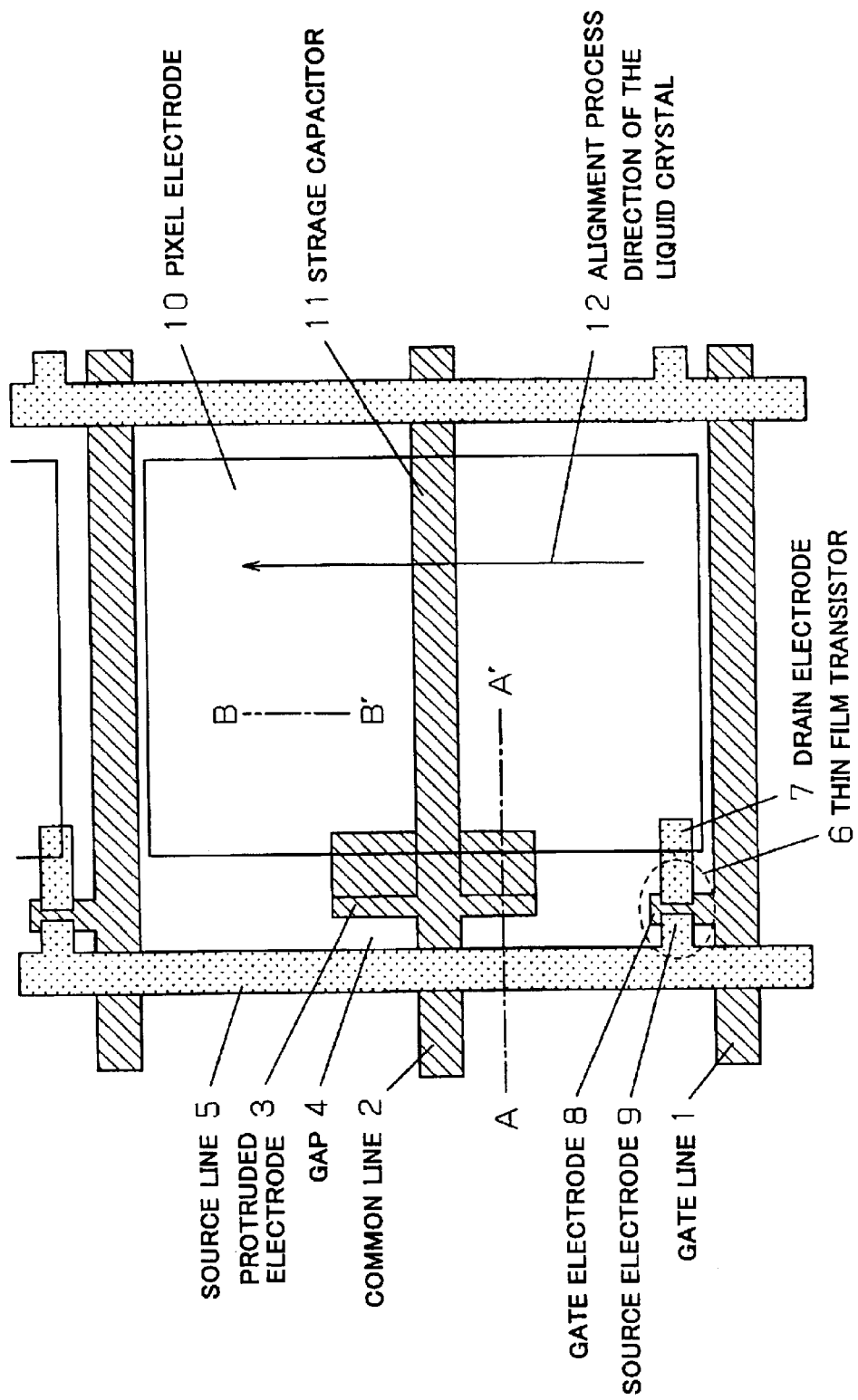
FIG. 46 is a view showing a modification of the embodiment 2-1.

In FIG. 26, the protruded electrode 3 does not overlap with the pixel electrode 10 at all. Alternatively, as shown in FIG. 46, part of the protruded electrode 3 may overlap with the pixel electrode 10, because the liquid crystal molecules can be twisted because of the presence of the gap 4.

(Embodiment 2-2)

Figure 32:
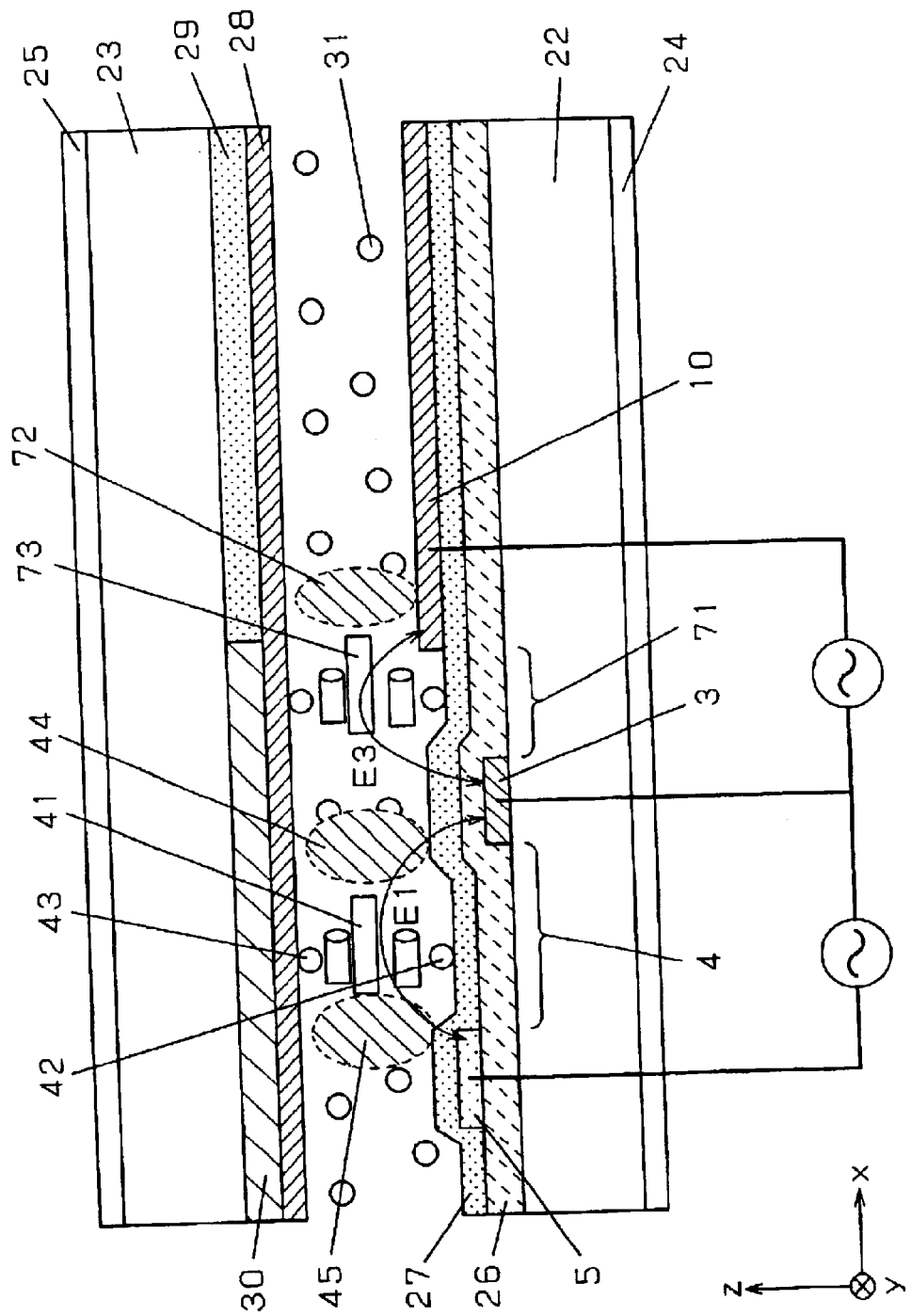
FIG. 32 is a cross-sectional view showing a constitution of a liquid crystal display according to an embodiment 2-2.

FIG. 32 Is a cross-sectional view for explaining operation of a liquid crystal display according to an embodiment 2-2. This Figure corresponds to FIG. 30 in the description of the embodiment 1.

In this embodiment, an electric field E3 in substrate in-plane direction is also generated in a second gap 71 between the protruded electrode 3 and the pixel electrode 10 by applying potential to the pixel electrode in the embodiment 1. This generates a new transition region 72 in addition to the transition regions 44, 45 in the conventional alignment state of the liquid crystal.

Compared to the embodiment 1, the effects of this embodiment are as follows. First, the probability of occurrence of transition is increased with an increase in the number of transition regions, thereby allowing transition to take place more reliably. The second effect is that since the new transition region 72 is located closer to the pixel electrode 10, the transition around a pixel region in which display is actually conducted completes earlier, thereby reducing starting time of equipment. Since a pixel electrode portion is formed such that the electrode is provided without clearance on the side of the substrate 22, a vertical electric field is generated stably if voltage is applied to the counter electrode, and third advantage is that since the new transition region 72 is provided in the vicinity of this pixel electrode portion, the transition can be conducted stably.

Also, in this embodiment, similarly to the embodiment 1, in the preparation step for initialization (transition), on-potential of about 15–20V is applied to the gate electrode while keeping the potential of the source electrode at 0 V, thereby turning ON the TFT. At this time, the potential of the common electrode and the potential of the protruded electrode are set to 0 V and the protruded electrode, the source line, and the pixel electrode are set at equipotential (0V), for preventing the electric field from being applied to the liquid crystal layer around the pixel portion and the source line portion. This step can be omitted as necessary as already described in the embodiment 1.

In a first step, positive voltage (e.g., +5 V) is supplied to the source line while applying on-voltage to the gate electrode, thereby charging the pixel electrode by positive voltage +5 V.

In a second step, negative voltage (e.g., +5 V) is supplied to the source line while applying on-voltage to the gate electrode, thereby charging the pixel electrode by positive voltage −5 V.

By setting the potential of the common line and the potential of the protruded electrode to 0 V through these steps, as shown in FIG. 32, an electric field E1 is generated between the protruded electrode 3 and the source line 5 and an electric field E3 is generated between the protruded electrode 3 and the pixel electrode 10. These electric fields are both substantially parallel to the substrate plane and causes liquid crystal molecules 41, 73 at the central portion of the liquid crystal layer around the gaps 4. 71 to be rotated toward the in-plane direction and twisted state to be generated around these two gaps.

In a third step, the first step and the second steps are alternately repeated, thereby converting voltage being applied to the gap into AC.

In a fourth step, by applying voltage to the counter electrode the electric field vertical to the substrate plane is applied to the liquid crystal layer, to cause the liquid crystal molecules to rise up from the substrate plane. As the result of application of the vertical electric field, similarly to the embodiment 1, the bend alignment portions are formed in the vicinity of the gaps 4, 71 to which the transverse electric field is applied, by application of the vertical electric field, and extend mainly toward the direction of the pixel electrodes, and in time the entire pixel has bend alignment. In accordance the display of this embodiment, the transition from splay alignment to bend alignment can be conducted by far more easily and reliably than the conventional display.
(Embodiment 2-3)

Figure 33:
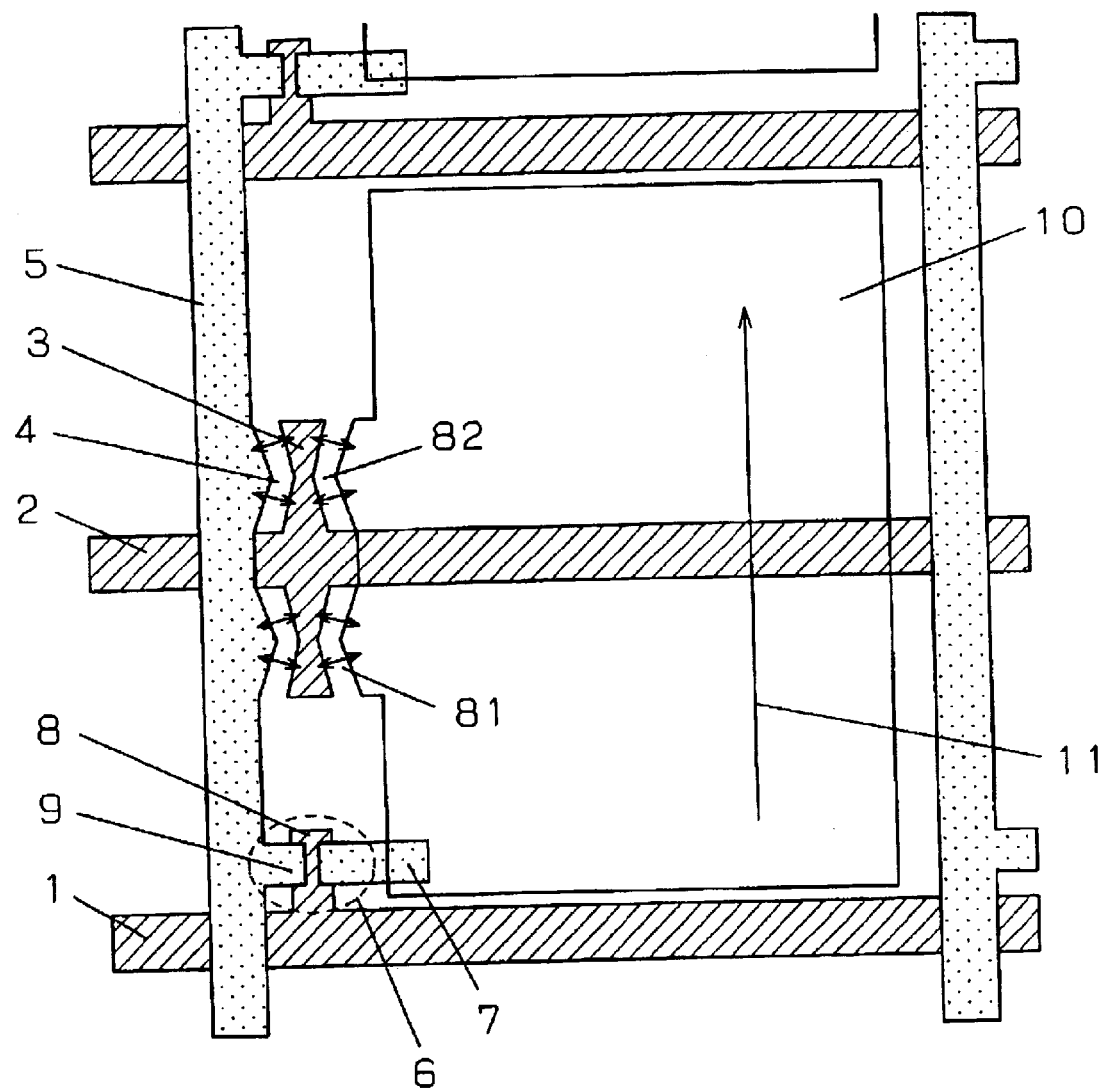
FIG. 33 is a plan view showing a constitution of a liquid crystal display according to an embodiment 2-3.

FIG. 33 is a plan view showing a constitution of one pixel for explaining operation of a liquid crystal display according to an embodiment 2-3. This Figure correspond to FIG.26 in the description of the embodiment 1.

In the embodiment 1 or 2, the protruded electrode is straight-line shaped and the direction of the electric field applied to a gap around the protruded electrode is vertical to the liquid crystal alignment direction. In the liquid crystal display of this embodiment, as shown in FIG. 33, edge portions of the protruded electrode 3, the source line 5, and the pixel electrode 10 are bent, and a region where the electric field direction 81 indicated by arrow rotates clockwise from the direction vertical to the liquid crystal alignment direction and a region where the electric field direction 81 rotates counterclockwise are formed in the gaps 4, 82.

Compared to the embodiment 1 or 2, the effect of this embodiment is that the transition can be carried out stably by reliably forming the region where the liquid crystal around the gap rotates clockwise and the region where the liquid crystal around the gap rotates counter clock wise.

The effect of forming the region where the liquid crystal around the gap rotates clockwise and rotates counterclockwise will be described below.

First, problem associated with transition operation in the case where the liquid crystal molecules do not rotate in the substrate plane and do not have twisted structure, will be described.

Figure 34:
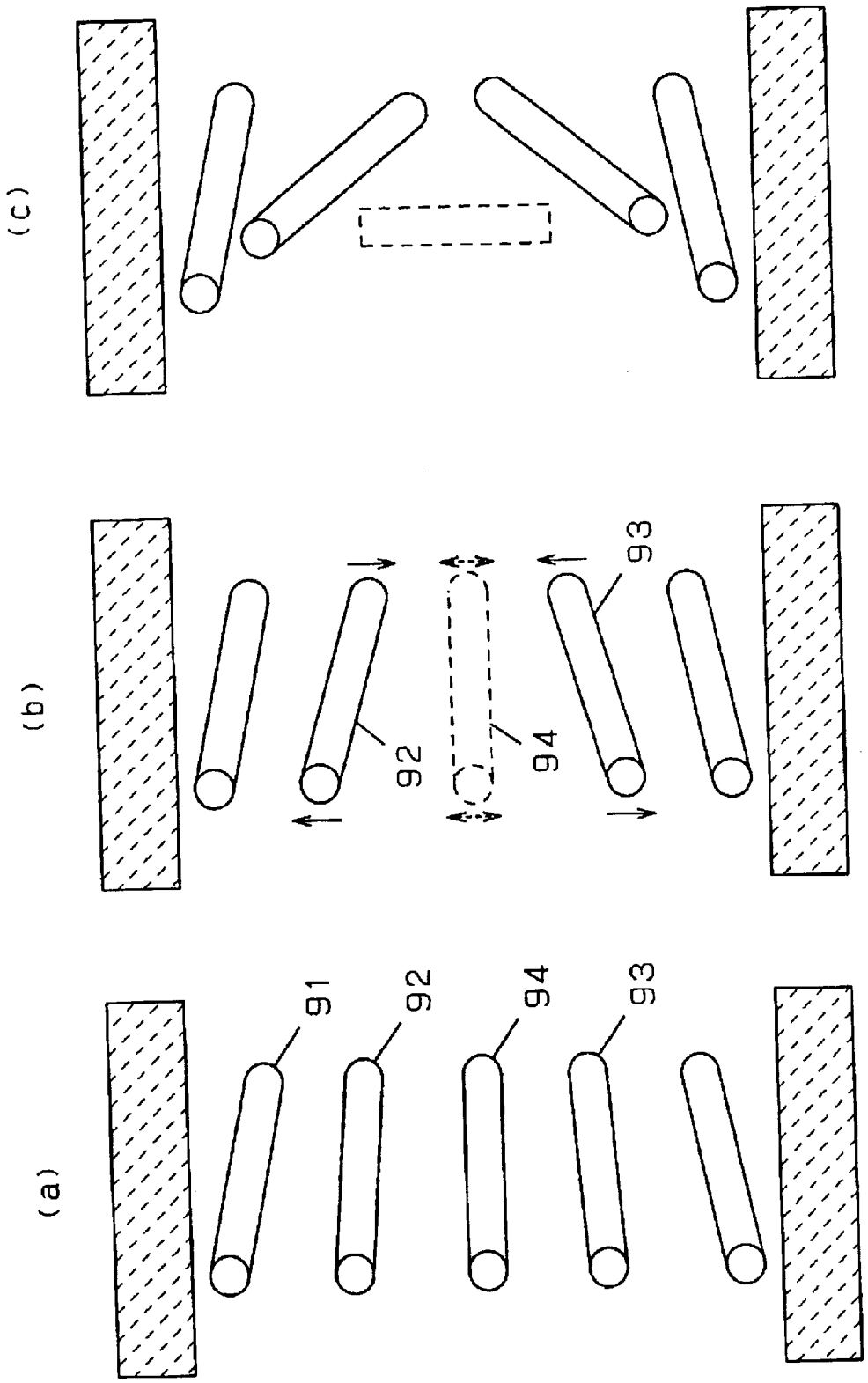
FIG. 34 is a cross-sectional view for explaining transition state in the conventional example in-the embodiment 2-3.

FIG. 34 is a cross-sectional view schematically showing of alignment of the liquid crystal molecules in transition operation in that case. A liquid crystal molecule 91 has splay alignment of FIG. 34(*a*) in its initial state. Upon application of voltages to electrodes of the upper and lower substrates, the liquid crystal molecules are going to be oriented in parallel with the electric field, and therefore, the respective liquid crystal molecules are subjected to rotational torque shown in FIG. 34(*b*). The direction of the torque depends on the direction of the tilt angle of the liquid crystal molecule at the point when no voltage is applied. The clockwise rotational torque is exerted on a liquid crystal molecule 92 located in an upper half portion and the counterclockwise rotational torque is exerted on the liquid crystal molecule 93 located in a lower portion. The initial state of a liquid crystal molecule 94 located just at the center between the upper and lower substrates is parallel to the substrate, and therefore its rotational direction is impossible to specify. Finally, the liquid crystal is in bend alignment state of FIG. 34(*c*), and there are formed a region where the liquid crystal molecule 94 at the center of the liquid crystal layer rotates clockwise and a region where the molecule 94 rotates counterclockwise. For this reason, the occurrence of transition is unstable and the transition takes long time, or discrimination line between these two regions is left even in a display period, which would results in reduced contrast.

Figure 35:
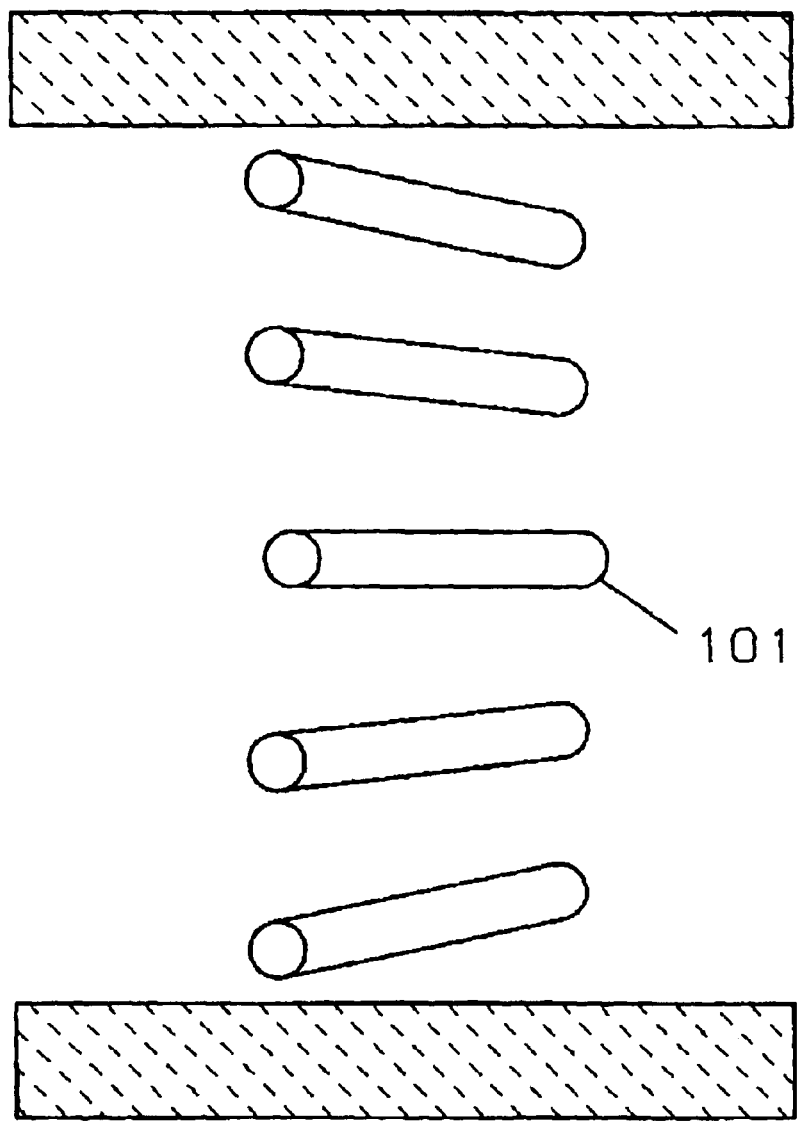
FIG. 35 is a cross-sectional view showing a splay alignment state according to the embodiment 2-3.
Figure 36:
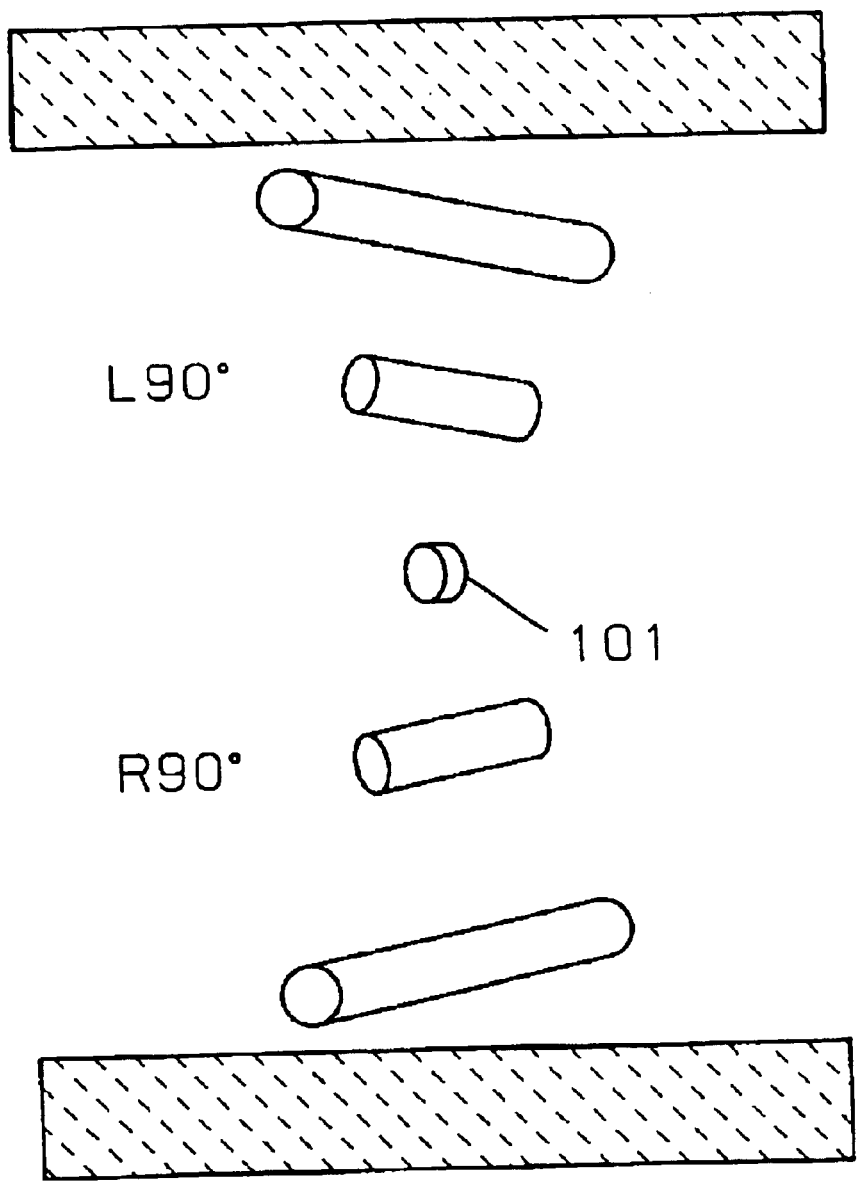
FIG. 36 is a cross-sectional view showing alignment of twisted state in application of transverse electric field according to the embodiment 2-3.

In the embodiment 1 or 2, the transverse electric field is applied to the liquid crystal in splay alignment state of FIG. 35, thereby obtaining twisted alignment of FIG. 36, to which an electric field in substrate normal direction is applied, thereby performing transition operation. As shown in the cross-sectional view of FIG. 36, torque is applied so that left-side of the liquid crystal molecule located at the center of the liquid crystal layer is rotated toward front side and right-side thereof is rotated toward back side by application of the transverse electric field. When the rotational direction of the liquid crystal molecules is seen from bottom to top in the Figure, the liquid crystal molecule in a lower half portion in the cross-sectional view is twisted 90 degrees clockwise (hereinafter expressed as R 90°), while the liquid crystal molecule is twisted 90 degrees counter clock wise in the upper portion (L 90°) In this case, tilt angles of the liquid crystal molecules at upper and lower interfaces of the substrate are cancelled, and therefore, a liquid crystal molecule 101 located at the center of the liquid crystal layer hardly rises up with respect to the substrate and its tilt angle is nearly 0 degree. Therefore, when the electric field in the substrate normal direction is applied, the direction toward which this liquid crystal molecule rises up is not uniquely determined, which would result in unstable occurrence of transition.

Figure 37:
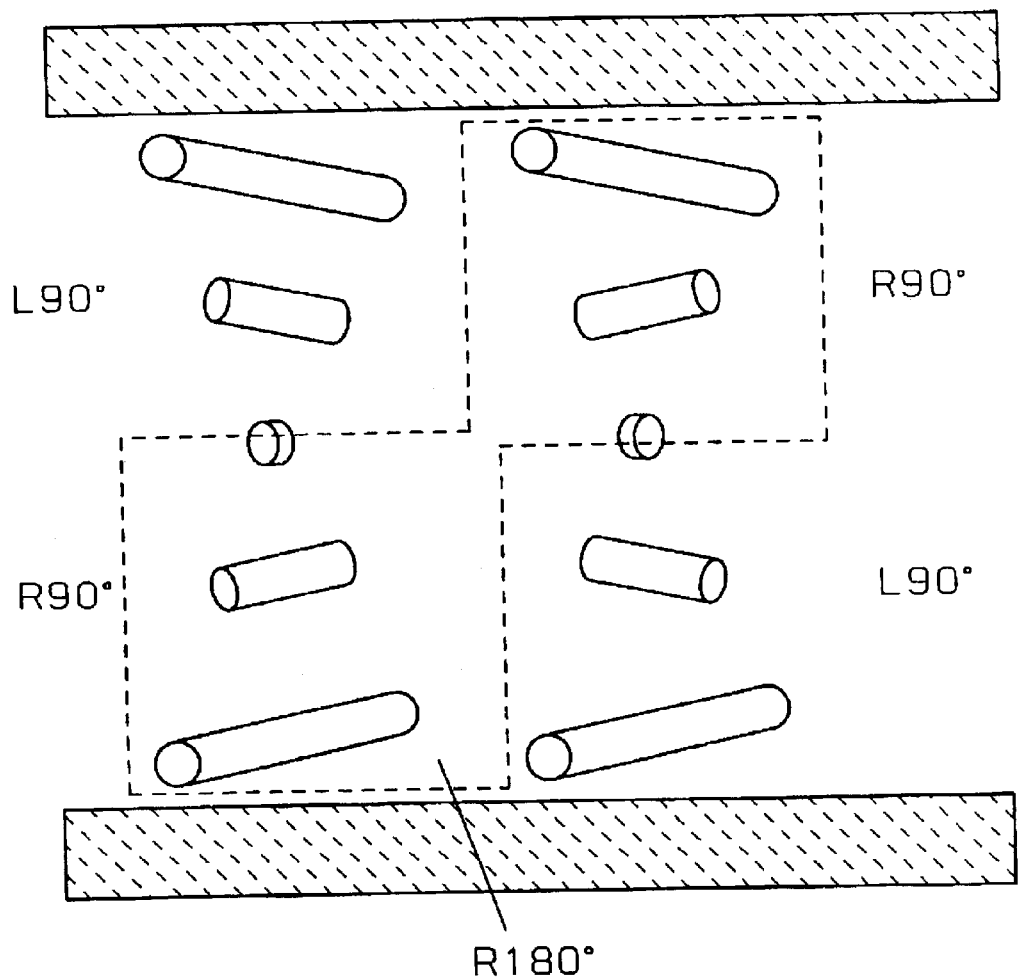
FIG. 37 is across-sectional view showing alignment of adjacent two regions with different twisted states according to the embodiment 2-3.

FIG. 37 is a cross-sectional view showing arrangement of the liquid crystal molecules in the case where the transverse electric field is applied in the liquid crystal display in this embodiment. In this embodiment, two regions where the liquid crystal molecules located at the center of the liquid crystal layer rotate in different directions are adjacent to each other. In the Figure, such adjacent regions are illustrated. On the left side of the Figure, the torque is applied so that the left side of the liquid crystal molecule located at the center of the liquid crystal layer is rotated toward the front side and the right side thereof is rotated toward the back side, and the lower half portion is in the state of R 90° and the upper half portion is in the state of L 90°. On the other hand, on the right side of the Figure, the torque is applied so that the left side of the liquid crystal molecule located at the center of the liquid crystal layer is rotated toward the back side and the right side thereof is rotated toward the front side, and the lower half portion is in the state of L 90° and the upper half portion is in the state of R 90°.

Since these regions are adjacent to each other, the lower half portion of R 90° on the left side and the upper half portion of R 90° on the right side, tend to be sometimes coupled because of thermal fluctuation phenomenon of liquid crystal molecules or shaking of the liquid crystal molecules caused by switching of AC electric field. In such region, the liquid crystal molecules are continuously twisted 180 degrees (R 180°) to the right from the lower substrate toward the upper substrate. In this case, the liquid crystal molecule 101 located at the center of the liquid crystal layer has a tilt angle under the influence of the tilt angles at the upper and lower interfaces.

Figure 38:
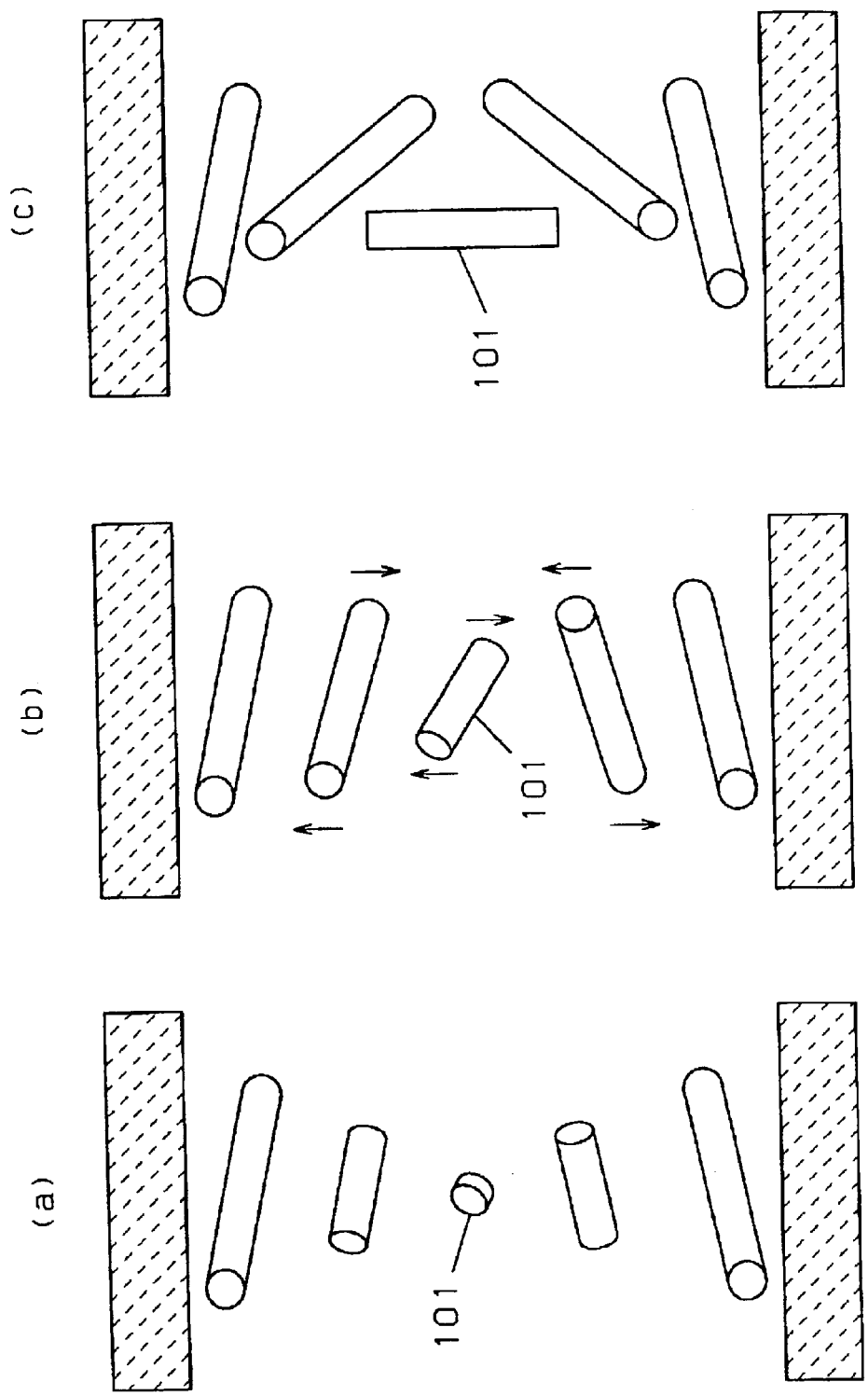
FIG. 38 is a cross-sectional view for explaining transition action according to the embodiment 2-3.

The formation of such regions facilitates occurrence of the transition. FIG. 38 shows such state. By applying voltage to the liquid crystal layer in which the liquid crystal molecule 101 at the center is tilted and twisted 180 degrees as shown in FIG. 38, the liquid crystal molecule 101 at the center can rise up toward stable direction as shown in FIG. 38(*b*). As a result, the bend state of FIG. 38(*c*) is easily formed.

In the liquid crystal display of this embodiment, 180-degree twisted state is formed as the start of transition. However, since chiral agent is not added for formation of the twisted state, the twisted structure is hardly left in the alignment of the liquid crystal after transitioned and satisfactory bend alignment is maintained even under the low applied voltage. Therefore, the problems such as reduction of the viewing angle characteristic, coloring of white display, and reduction of response speed do not arise.

While in the above description, the twist angles in the upper half portion and the lower half portion are respectively 90 degrees, the angles are not limited to this. The twist angle of the liquid crystal in the coupled regions is determined by alignment direction of the liquid crystal at the upper and lower interfaces, and when this liquid crystal has been subjected to parallel alignment process, the twist angle is 180 degrees regardless of the initial twist angles in the upper and lower portions. Therefore, if the liquid crystal molecules located at the center are subjected to torques in opposite directions in the two regions during application of the transverse electric field, then satisfactory bend state can be formed regardless of the twist angles in the upper and lower portions.

The liquid crystal display of this embodiment is driven in the same manner as described in the embodiment 2. Thereby, regions where twisted electric fields are oriented toward opposite directions can be formed around gaps 4, 82, and satisfactory transition characteristic is obtained.

(Embodiment 2-4)

Figure 39:
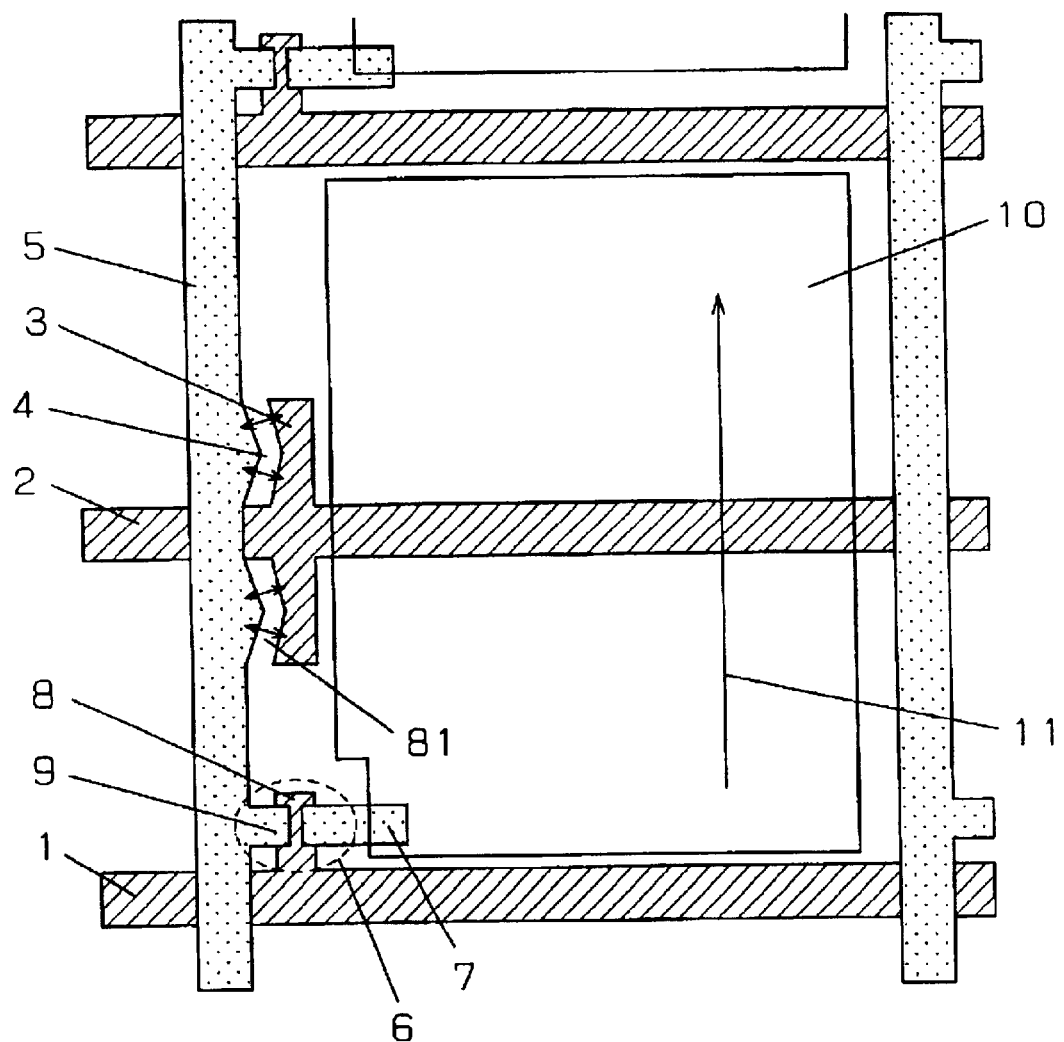
FIG. 39 is a plan view showing a constitution of a liquid crystal display according to an embodiment 2-4.

FIG. 39 is a plan view showing a constitution of one pixel for explaining operation of a liquid crystal display according to an embodiment 2-4.

In this embodiment, similarly to the embodiment 3, a region where the electric field direction 81 indicated by arrow rotates clockwise from the direction vertical to the liquid crystal alignment direction and a region where the electric field direction 81 rotates counterclockwise are formed in the gap 4.

In the embodiment 3, gap portions on both sides of the protruded electrode 3 are bent to form such regions, while in this embodiment, the gap is bent only between the protruded electrode 3 and the source line 5. This can extend the pixel electrode 10 and in crease an aperture ratio for brighter display. The liquid crystal display of this embodiment is driven in the same manner as described in the embodiment 1.

As in the case of the embodiment 3, the liquid crystal display of this embodiment Is adapted to induce twisted structure without addition of the chiral agent, and employs this as transition nucleus. Therefore, the twisted structure is hardly left in the alignment of the liquid crystal after transitioned, and satisfactory bend alignment is maintained even under the low applied voltage. Therefore, the problems such as reduction of the viewing angle characteristic, coloring of white display, and reduction of response speed do not arise.

In this embodiment, similarly to the embodiment 3, the twist angles in the upper half portion and the lower half portion are not limited to 90 degrees. If the liquid crystal molecules located at the center are subjected to torques in opposite directions in the two regions during application of the transverse electric field, then satisfactory bend state can be formed regardless of the twist angles in the upper and lower portions.

(Embodiment 2-5)

Figure 40:
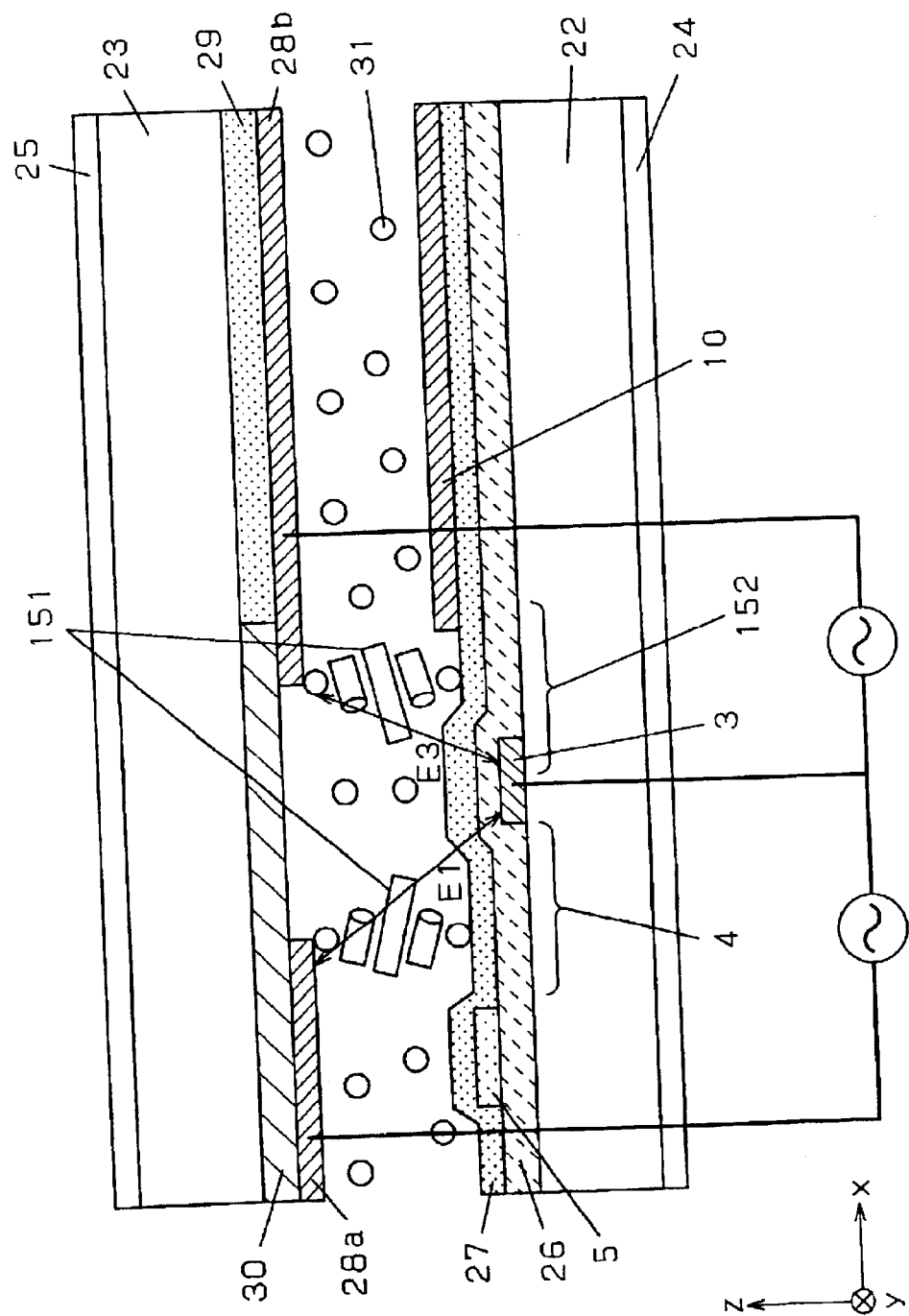
FIG. 40 is a cross-sectional view showing a constitution of a liquid crystal display according to an embodiment 2-5.

FIG. 40 is a cross-sectional view for explaining operation of a liquid crystal display according to an embodiment 2-5. While the counter electrode 28 is disposed over nearly the entire region, in this embodiment, portions of the counter electrode 28 in the vicinity of gaps 4, 152 are eliminated therefrom and transformed into the counter electrodes 28a, 28b in the cross section in FIG. 40.

In this Figure, when voltage is applied to the counter electrodes 28a, 28b and the protruded electrode 3, oblique components are generated in the electric fields E1, E3, thereby causing the liquid crystal molecules 151 located at the center of the liquid crystal layer are twist-oriented as inclined toward inclination direction of the electric fields. Thereafter, potential is applied to the pixel electrode 10 through the thin film transistor 6 and vertical electric field is applied to the pixel electrode 10 and the counter electrode 28b, thereby conducting transition.

In this embodiment, the electric field in oblique direction is applied in the gaps, which allows the liquid crystal molecules located at the center of the liquid crystal layer to rise up in the same direction during application of the vertical electric field. So, as described with reference to FIG. 34 of the embodiment 3, the problem that the transition of the liquid crystal becomes unstable and takes long time is avoided.

It should be appreciated that while the counter electrode is partially eliminated to cause the oblique electric field component to be generated, the same effect is obtained when there is difference in vertical level between the protruded electrode and the pixel electrode or the protruded electrode and the signal line. The level difference is preferably 1 micrometer or greater and when 1 micrometer or greater, more satisfactory result is obtained. This constitution is obtained by using insulating resin as the second insulating film disposed on the signal line.

(Embodiment 2-6)

In the embodiment 3 or 4, as shown in FIG. 33 or 39, the region where the electric field direction rotates clock wise from the direction vertical to the liquid crystal alignment direction and the region where the electric field direction rotates counterclockwise from the same direction are formed in the gaps seen in a plan view. This allows right twist 90 degree (R 90°) portions, or left twist 90 degree (L 90°) portions, which are located on a diagonal line in cross section, are coupled, thereby forming 180-degree twisted state, which facilitates transition. However, selectivity of which of the right twisted portions and the left twisted portions are coupled is not definitely determined and a little unstable state might occur.

In this embodiment, the constitution of the embodiment, i.e., the constitution for generating the component in the oblique direction in cross-section in application of the transverse electric field shown in FIG. 40 is combined in to the constitution described in the embodiment 3 or 4. Since the existence of the oblique electric field allows one of the right twist 180 degrees (R 180°) and the left twist 180 degree(L 180°))to become energetically stable,in each of the regions, one of the twisted states is selected, thereby conducting transition more stable than that in the embodiment 3 or 4.

(Embodiment 2-7)

In each of the above embodiments, the transverse electric field is first applied and then the vertical electric field is applied, thereby conducting transition. In any of the embodiments, effectiveness is provided by first applying the vertical electric field and then applying transverse electric field to the pixel region. In this case, it is preferable that after an elapse of about several milliseconds to one second after application of the vertical electric field for the liquid crystal around the pixel region to have substantially risen up, the transverse electric field is applied to the vicinity of the protruded electrode to cause the liquid crystal to be rotated.

Specific example will be described with reference to FIGS. 26, 27. First of all,in a preparation step of initialization (transition), on-potential of approximately 15–20 V is given to the gate electrode for turning on the TFT while keeping the potential of the source electrode at 0 V. At this time, the common electrode and the protruded electrode are set at potential of 0 V and the protruded electrode, the source line, and the pixel electrode are set at equipotential (0 V), for preventing the electric field from being applied to the liquid crystal layer around the pixel portion and the source line portion. This step can be omitted as necessary.

In a first step, +25V is applied to the counter voltage 28, thereby applying the vertical electric field over nearly the entire region of screen.

In a second step, +25V is applied to the common line 2, to cause the protruded electrode 3 to become equal to +25 V. As a result, in the vicinity of this region, the vertical electric field nearly vanishes and the transverse electric field is applied to the protruded electrode 3 and the source line 5 and to the protruded electrode 3 and the pixel electrode 10.

In a third step, voltage is supplied to the source line 5 while keeping the thin film transistor 6 in ON state, thereby causing fluctuation of the potential of the pixel electrode 10, and allowing the transverse electric field component to be converted into alternating current. This step can be omitted as necessary.

It should be appreciated that in the third step, by setting the potential of the pixel electrode so as to cross the potential of the counter electrode (+25 V), ideal AC voltage can be applied mainly at the potential of the counter electrode, which requires a large output voltage in source-side drive IC. To avoid this, the potential of the pixel electrode could be AC between, e.g., +5 V and −5V. In that case, the AC component serves as the transverse electric field and the electric field between the counter electrode (+25 V) and an average voltage of 0V serves as the vertical electric field.

Also, the counter electrode 28 and the common line 2 may be set at equipotential and may be AC driven between +25V and −25V.

In the liquid crystal display of this embodiment, the transition from splay to bend alignment can be carried out by far more easily and reliably than the conventional example.

In any of the embodiments, the region to which the transverse electric field is limited to the vicinity of the protruded electrode, and therefore, it is possible to prevent the event that the transverse electric field extends to the inner side of the pixel region and optical performance such as contrast is thereby reduced. On the other hand, the region to which the vertical electric field is applied extends over nearly the entire surface, which includes the region of the transverse electric field or transition region around it. Therefore, advantageously, the transition smoothly starts.

(Embodiment 2-8)

In any of the above-described embodiments, once the bend alignment portion has been generated around the transition portion or in the vicinity of the portion where the transverse electric field is generated, the transverse electric field becomes unnecessary. In this embodiment, after the transition has spread to some extent, the supply voltage to the source line is regulated, thereby stopping the transverse electric field or reducing the strength of the transverse electric field. Thereby, the event that the bend alignment is disturbed under the influence of the transverse electric field and thereby abnormal display occurs, or contrast is reduced, can be avoided, or otherwise power for generating the transverse electric field can be reduced. More specifically, in the embodiments 1-6, it is advantageous that the application of the source voltage is stopped after an elapse of several milliseconds to several tens milliseconds from when the vertical electric field starts to be applied. In the embodiment 7, it is advantageous that the application of the source voltage is stopped after an elapse of several milliseconds to several tens milliseconds from when the vertical electric field starts to be applied.

(Embodiment 2-9)

In the liquid crystal displays of the embodiments 1-8, a light-blocking portion comprised of black matrix is formed for masking the region where alignment of the liquid crystal varies by the transverse electric field. Specifically, a black matrix 30 is formed so as to cover the gap 4 in FIG. 27, the gaps 4, 71 in FIG. 32, and the gaps 4, 152 in FIG. 40.

When the liquid crystal display is actually conducting display, the source line, the common line, and the pixel electrode have various potentials according to display pattern, thereby generating the transverse electric field in the gaps of these portions. This portion is masked by the black matrix to allow light leakage caused by response of the liquid crystal to the transverse electric field to be blocked, thereby conducting display with high contrast.

In FIG. 26, it is more advantageous to also mask portion between the protruded electrode 3 and the pixel electrode 10.

(Embodiment 2-10)

In each of the above embodiments, when a small amount of chiral agent is added to the liquid crystal to make twist in specific direction energetically predominant, more satisfactory transition performance is obtained.

In the conventional liquid crystal display, chiral agent in amount sufficient for stabilizing 180-degree twist is added to the liquid crystal under the condition without applied electric field, whereas, the added amount of the chiral agent is reduced to permit the splay alignment without twist to be stabilized under the condition without applied electric field.

In the conventional constitution, a large amount of chiral agent are added, which leaves the twisted structure in alignment of the liquid crystal after occurrence of transition, in which state, the bend alignment is damaged under low applied voltage. This results in reduction of the viewing angle characteristic, the coloring of white display, and reduction of the response speed. On the other hand, in this embodiment, since the added amount of the chiral agent is small, the twisted structure is hardly left in the alignment of the liquid crystal after transitioned. Therefore, the problem such as reduction of the viewing angle characteristic, the coloring of white display, and reduction of the response speed do not arise.

Hereinafter, transition performance of this embodiment will be described. As described in the embodiment 3 with reference to FIGS. 37, 38, if the specific twist direction becomes predominant when applying the transverse electric field, or the transverse electric field and the vertical electric field, then the transition performance is improved. In this embodiment, right or left twist becomes energetically stable due to the chiral agent during application of the electric field, so that the predominant twisted structure is easy to induce, thereby obtaining satisfactory transition performance.

Subsequently, the added amount of the chiral agent will be described. When spontaneous pitch of a liquid crystal material with added chiral agent is represented by Ps, and cell thickness is represented by d, natural twist angle of the liquid crystal is given by:

$$\ddot{o} = \pm 360 \times \text{(degree), where } \pm \text{indicates the direction of twist.}$$

On the other hand, in the OCB-type liquid crystal display, the alignment process is conducted in parallel direction. Hence, the twist angle in the state without applied voltage is limited to 0 degree, 180 degrees, ±360 degrees, . . . , When ö is within ±90 degrees, the actual twist angle is 0 degree and when ö is greater than 90 degrees, the 180-degree twist angle is stable. Accordingly, when Ps is 4 times larger than the cell thickness, the splay alignment with twist angle of 0 degree is stable. The added amount of the chiral agent satisfying this condition may be predetermined by using the relationship between the added chiral agent and Ps, which is approximately inversely proportional, or from measurements of chiral pitches.

It should be noted that even the added amount of chiral agent within the above range, causes the twisted structure to be left in operation if added to excess, which sometimes leads to somewhat degraded display performance. So, the added amount of chiral agent is preferable as least as possible. Through experimentation, it was found that the added amount of chiral agent is preferable set to allow Ps to be 30 degrees or less, and higher image quality is attained with Ps set to 10 degrees or less.

(Embodiment 2-11)

In each of the above embodiments, when applied frequencies are made to differ from each other for the vertical electric field and the transverse electric field, stability of transition performance is improved. When the applied frequencies are equal in the vertical electric field and in the transverse electric field, these electric fields interfere with each other, and therefore, satisfactory transition performance is sometimes unattainable owing to phase difference between these electric fields. In accordance with a method of this embodiment, such interference is avoided and stable transition performance is obtained.

When difference is made between frequencies of the two electric fields, it is desirable to set the frequency of the transverse electric field higher and the frequency of the vertical electric field lower. The first reason for this is that the vertical electric field is generated over a wide area in the counter electrode on one side, and therefore capacitive load is large, which places large burden on a power supply with increasing frequency. On the other hand, the transverse electric field is applied to a limited portion and therefore capacitive load is small. The second reason for this is that the transverse electric field is sometimes applied for a short time and DC component is thereby left at low frequency, which leads to display unevenness.

Experimentation shows that satisfactory result is obtained when the transverse electric field is greater than 10 Hz and more preferably when greater than 30 Hz. The vertical electric field is preferably between approximately 0.1 Hz and 50 Hz, and more preferably between 0.1 Hz and 10 Hz, which are greater than the frequency of the transverse electric field.

(Embodiment 2-12)

Figure 41:
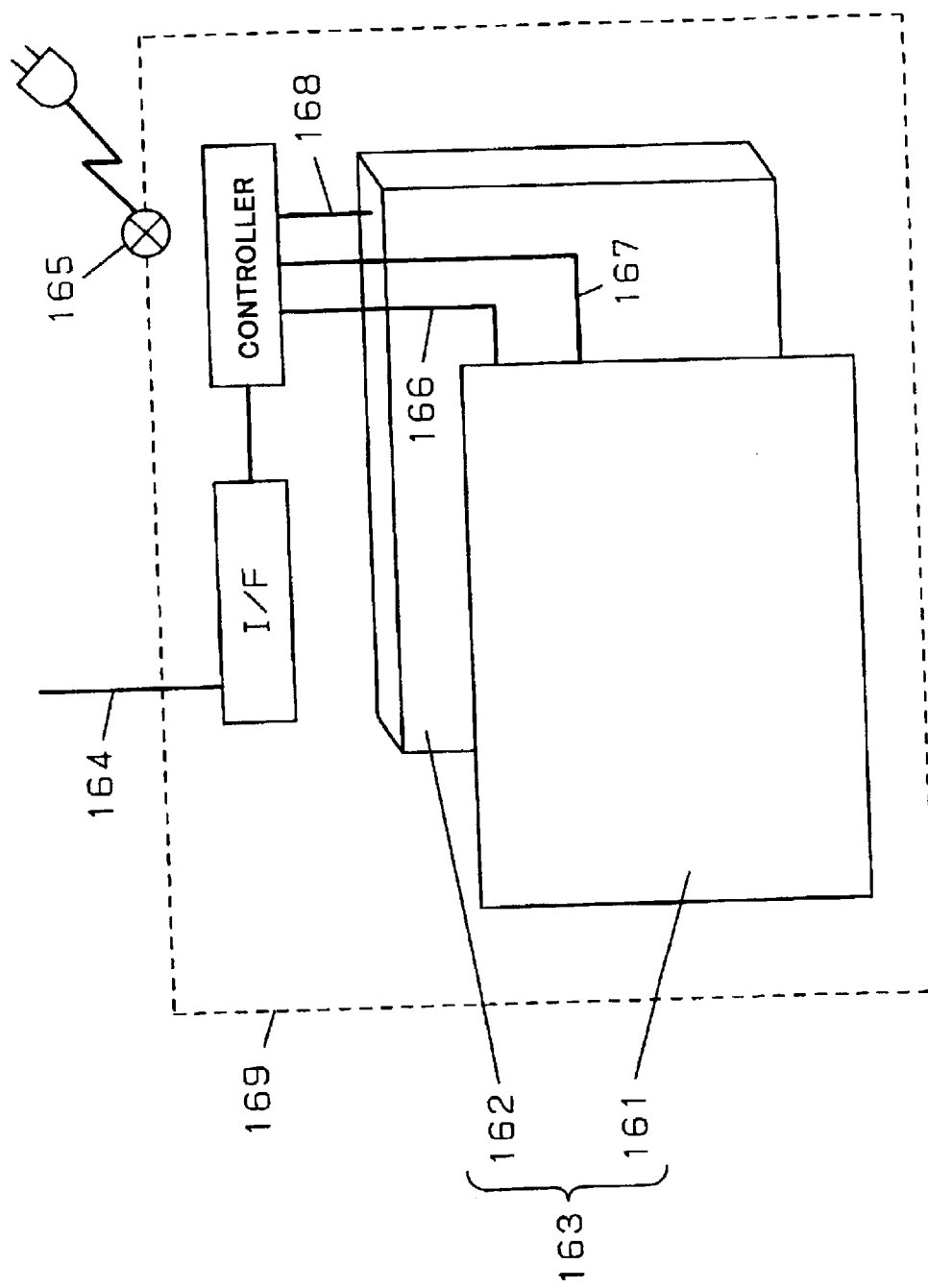
FIG. 41 is a block diagram showing a configuration of a liquid crystal monitor according to an embodiment 2-12.

FIG. 41 illustrates that any of the liquid crystal displays 163 described in the embodiments is provided with a controller portion and an interface (I/F) portion, thereby constituting a liquid crystal monitor 169. The liquid crystal display includes a panel portion 161 and a backlight portion 162. 165 denotes a power supply switch. The interface portion receives an image signal 164 and sends it to a controller. The controller portion sends a display control signal 166 for image display to the panel portion and a backlight control signal 168 to the backlight portion.

In the liquid crystal monitor of this embodiment, an initialization control signal 167 is supplied to the panel portion, which thereby performs initialization. The liquid crystal display and its transition operation can employ methods described in the embodiments 1-10. When the power supply switch 165 is ON, or in starting after resume, the initialization control signal is sent to the panel portion, which performs transition operation. In these cases, lighting of the backlight is somewhat delayed with respect to the transition operation, thereby enabling transition operation which does not cause unevenness in a screen due to transition which might be perceived by a user. Also, in resume, with the backlight being in OFF state, no image signal is sent, but by supplying the initialization signal to cause regular transition operation, thereby reducing starting time when its use is resumed.

(Embodiment 2-13)

Figure 42:
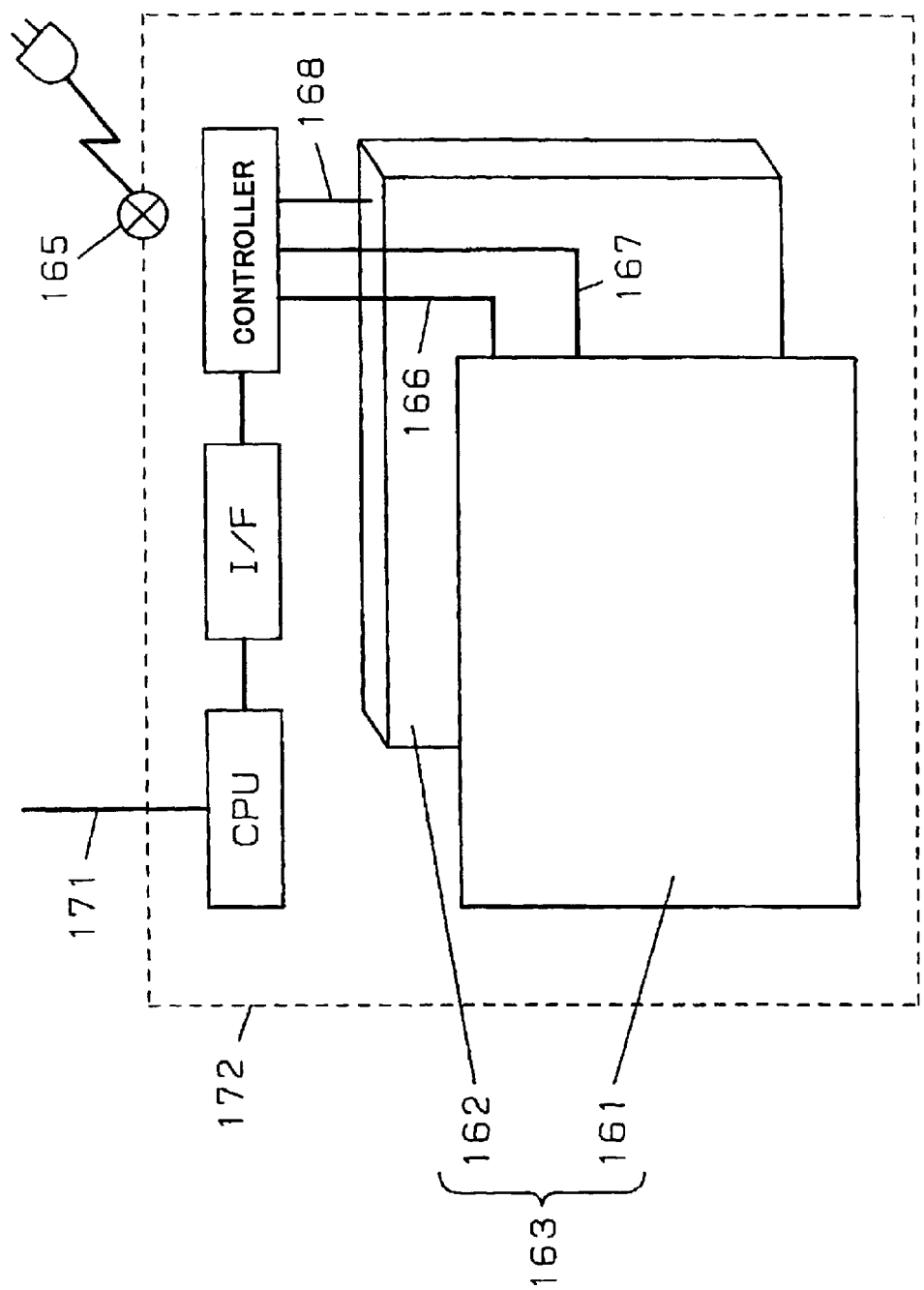
FIG. 42 is a block diagram showing a configuration of a computer with liquid crystal display according to an embodiment 2-12.

FIG. 42 illustrates that any of the liquid crystal displays 163 described in the embodiments is combined with a CPU for providing a processing portion of an input signal 171 from a key board, a mouse, a touch panel, or the like, thereby constituting a computer 172 with liquid crystal display. The other portions are adapted to operate in the same manner as those of the embodiment 12.

As described in the embodiment 12, in the computer with liquid crystal display of this embodiment, the initialization control signal 167 is supplied to the panel portion, which thereby performs transition. The liquid crystal display and its transition operation can employ the methods described in the embodiment 1-10. Also, as described above, lighting of the backlight is somewhat delayed with respect to the transition operation, thereby enabling transition operation which does not cause unevenness in a screen due to transition which might be perceived by a user, or in resume, with the backlight being in OFF state, by supplying the initialization signal to cause regular transition operation, thereby reducing starting time when its use is resumed.

With a configuration of similar block diagram, a mobile terminal with liquid crystal display is obtained. In this case, in battery driving, a power supply code in the Figure is dispensed with.

(Embodiment 2-14)

Figure 43:
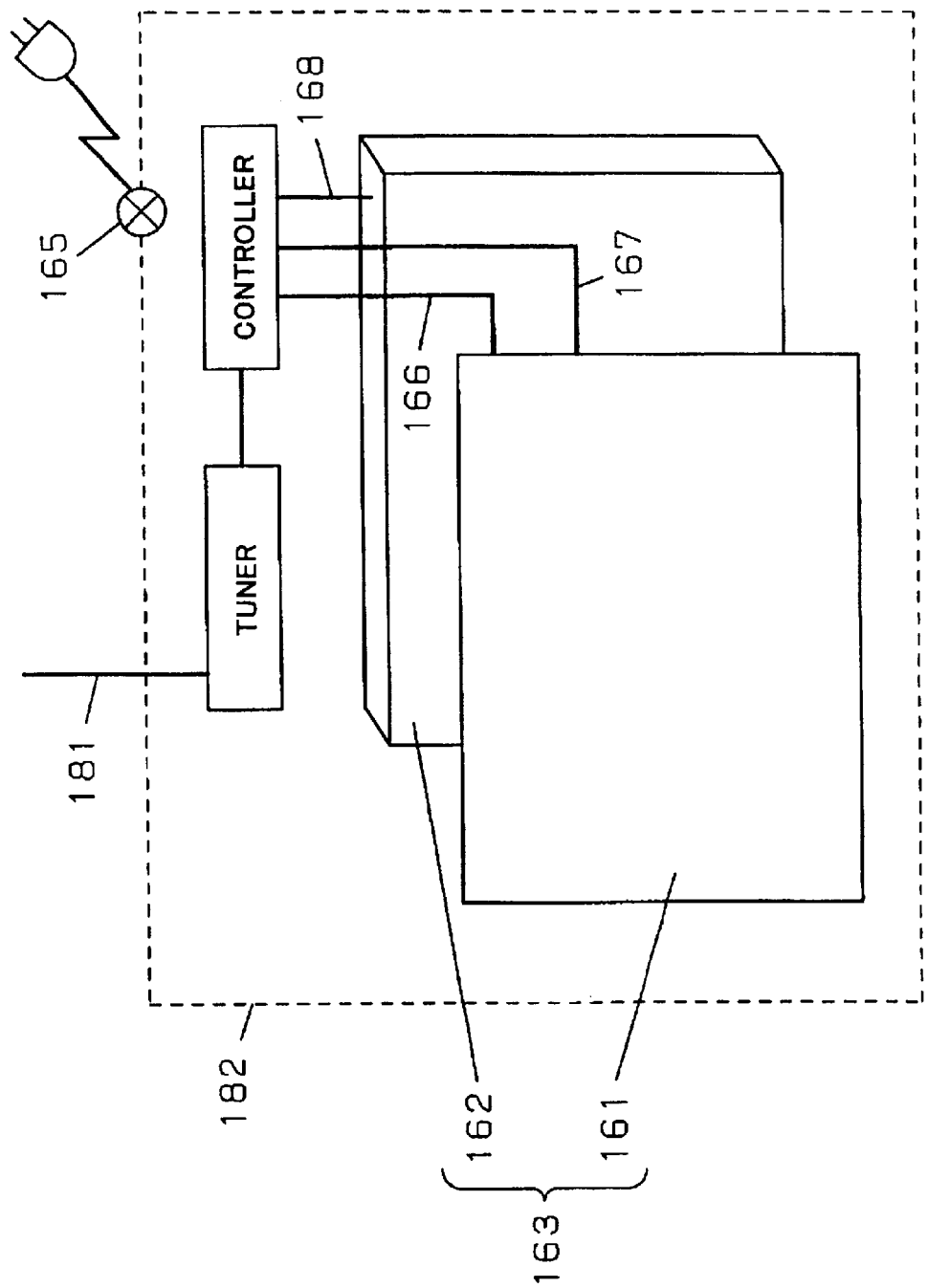
FIG. 43 is a block diagram showing a configuration of a liquid crystal television according to an embodiment 2-13.
Figure 44:
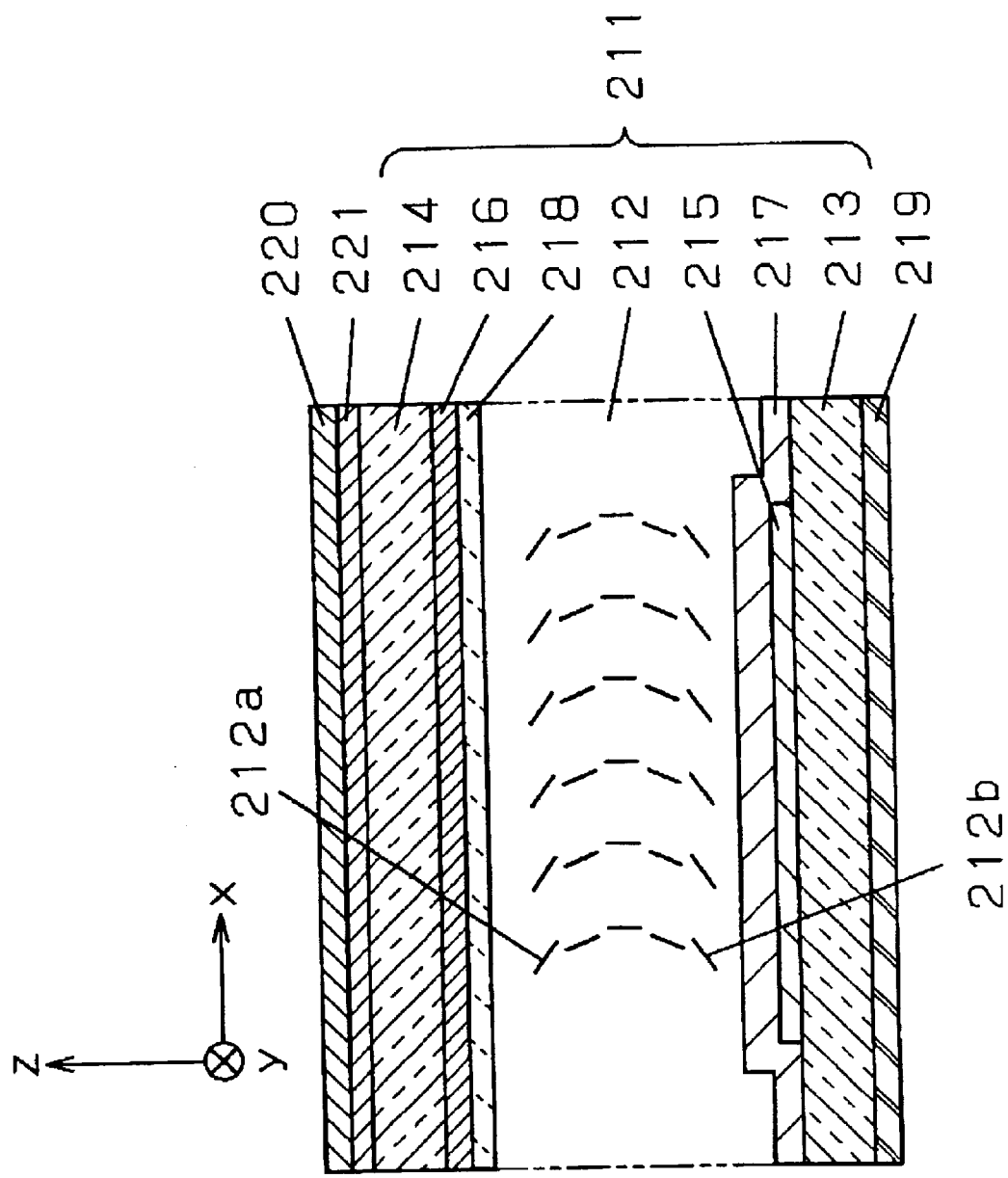
FIG. 44 is a cross-sectional view showing a constitution of a liquid crystal display according to the conventional example in contrast with the embodiment 2.

FIG. 43 illustrates that that any of the liquid crystal displays 163 described in the embodiments is provided with a tuner portion and an interface (I/F) portion, thereby constituting image display equipment 182 such as a liquid crystal television. The liquid crystal display includes the panel portion 161 and the backlight portion 162, similarly to the embodiment 11. 165 denotes a power supply switch. The tuner portion receives a video signal 181 and sends it to the controller. The controller portion sends a display control signal 166 for image display to the panel portion and the backlight control signal 168 to the backlight portion.

In the liquid crystal television of this embodiment, the initialization control signal 167 is supplied to the panel portion, which performs transition. Also, in this liquid crystal television, the liquid crystal display and its transition operation can employ the methods described in the embodiments 1-10. When a main power supply switch 165 is turned ON, or display starts with the use of a remote control switch, the initialization control signal is sent to the panel portion, which thereby performs transition operation. In these cases, lighting of the backlight is somewhat delayed with respect to the transition operation, thereby enabling transition operation which does not cause unevenness in a screen due to transition which might be perceived by a user. Also, when display is turned OFF with the use of the remote control switch, the backlight is placed in OFF state, and no image signal is sent, but by supplying the initialization signal to cause regular transition operation, thereby reducing starting time when display is resumed with the use of the remote control switch.

As thus far described, the display of the present invention comprises first electric field generating means for generating a first electric field causing liquid crystal molecules to be rotated toward direction including twist component in a substrate plane and second electric field generating means for generating electric field causing the liquid crystal molecules to rise up from the substrate plane, in the liquid crystal display adapted to operate during display in the state different from the state in which no voltage is applied. By applying the electric field including the twist component to the liquid crystal, the twist alignment or the alignment near the twist state is created, thereby facilitating transition to alignment state during display.

The method for driving the liquid crystal display comprises a first step for rotating the liquid crystal molecules toward the direction including the twist component by the first electric field and a second step for causing the liquid crystal molecules to rise up toward direction substantially vertical to the substrate plane by the second electric field, which are conducted in this order. In the first step, the electric field including the twist component is applied to the liquid crystal to create the twist alignment or the alignment near the twist alignment, which functions as the transition state to the alignment state during display. In the second step, from the vicinity of this region, the transition starts by the vertical electric field and is grown and spreads to the entire display region. In these steps, the transition to the alignment state during display is facilitated.

Another method for driving the liquid crystal display comprises a first step for causing the liquid crystal molecules to rise up toward direction substantially vertical to the substrate plane by the first electric field, and a second step for rotating the liquid crystal molecules toward the direction including the twist component by the second electric field, which are conducted in this order. Thereby, in the first step, the vertical electric field is applied to set the liquid crystal molecules in the vertical electric field application region to rising state. In the second step, the electric field including the twist component is applied to create the twist alignment or the alignment near the twist state, thereby creating the transition state to the alignment state during display, which functions as 6Z transition nucleus. In these steps, the transition to the alignment state during display is facilitated.

In the foregoing description, the OCB-mode liquid crystal is illustrated as the liquid crystal 5. The present invention is not intended to be exclusively applied to the OCB-mode liquid crystal but may be applied to liquid crystals which have different alignment states in a display state and in a non-display state and requires initialization from the alignment state in the non-display state to the alignment state in the display state before an image is displayed.

Numerous modifications and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

[Industrial Applicability]

A liquid crystal display and a method for driving the same according to the present invention are useful in a liquid crystal television with wide viewing angle and fast response, a liquid crystal monitor, a liquid crystal display for a portable telephone, and the like.

What is claimed is:

1. A liquid crystal display comprising:
an array substrate including a plurality of pixel electrodes arranged in front and back direction and in right and left direction and disposed in matrix; a plurality of source lines and a plurality of gate lines arranged so as to cross each other; and switching devices provided as corresponding to the respective pixel electrodes and having gate electrodes connected to the gate lines, source electrodes connected to the source lines, and drain electrodes connected to the pixel electrodes, for switching between the source electrodes and the drain electrodes in accordance with a drive signal input to the gate electrodes through the gate lines;

an opposing substrate provided with a counter electrode opposite to the array substrate;

liquid crystal filled between the array substrate and the opposing substrate and having different alignment states in a display state and in a non-display state, the liquid crystal being subjected to initialization from the alignment state in the non-display state to the alignment state in the display state before an image is displayed; and drive means for performing the initialization by inputting voltages with different polarities to two pixel electrodes adjacent in front and back direction, respectively.

2. The liquid crystal display according to claim 1, wherein the drive means is adapted to apply voltages with different polarities to two pixel electrodes adjacent in right and left direction, respectively.

3. The liquid crystal display according to claim 1, wherein the drive means is adapted to apply voltages with the same polarity to two pixel electrodes adjacent in right and left direction, respectively.

4. The liquid crystal display according to claim 1, wherein the drive means is adapted to apply a constant voltage the counter electrode while applying the voltages to the pixel electrodes.

5. The liquid crystal display according to claim 4, wherein the drive means is adapted to start applying the constant voltage to the counter electrode after start of application of the voltages to the pixel electrodes.

6. The liquid crystal display according to claim 5, wherein the drive means is adapted to start applying the constant voltage to the counter electrode before an elapse of 50 milliseconds after start of application of the voltages to the pixel electrodes.

7. The liquid crystal display according to claim 1, wherein, in the two pixel electrodes adjacent in front and back direction, a pixel electrode located on back side is provided with a first protrusion at a front side edge thereof and a pixel electrode located on front side is provided with a second protrusion at a back side edge thereof.

8. The liquid crystal display according to claim 7, wherein a tip end of the first protrusion is located closer to front than a tip end of the second protrusion.

9. The liquid crystal display according to claim 7, wherein two first protrusions are provided and the second protrusion is located between the two first protrusions.

10. The liquid crystal display according to claim 7, wherein a plurality of first protrusions and a plurality of second protrusions are provided and one of the second protrusions is interposed between adjacent two first protrusions.

11. The liquid crystal display according to claim 1, wherein the liquid crystal is OCB-mode liquid crystal.

12. A liquid crystal display comprising:
an array substrate including a plurality of pixel electrodes arranged in front and back direction and in right and left direction and disposed in matrix; a plurality of source lines and a plurality of gate lines arranged so as to cross each other; and switching devices provided as corresponding to the respective pixel electrodes and having gate electrodes connected to the gate lines, source electrodes connected to the source lines, and drain electrodes connected to the pixel electrodes, for switching between the source electrodes and the drain electrodes in accordance with a drive signal input to the gate electrodes through the gate lines;

an opposing substrate provided with a counter electrode opposite to the array substrate;

liquid crystal filled between the array substrate and the opposing substrate and having different alignment states in a display state and in a non-display state, the liquid crystal being subjected to initialization from the alignment state in the non-display state to the alignment state in the display state before an image is displayed; and drive means for performing the initialization by inputting voltages with different polarities to two pixel electrodes adjacent in right and left direction, respectively.

13. The liquid crystal display according to claim 12, wherein the drive means is adapted to apply voltages with different polarities to two pixel electrodes adjacent in front and back direction, respectively.

14. The liquid crystal display according to claim 12, wherein the drive means is adapted to apply voltages with the same polarity to two pixel electrodes adjacent in front and back direction, respectively.

15. The liquid crystal display according to claim 12, wherein the drive means is adapted to apply a constant voltage to the counter electrode while applying the voltages to the pixel electrodes.

16. The liquid crystal display according to claim 15, wherein the drive means is adapted to start applying the constant voltage to the counter electrode after start of application of the voltages to the pixel electrodes.

17. The liquid crystal display according to claim 16, wherein the drive means is adapted to start applying the constant voltage to the counter electrode before an elapse of 50 milliseconds after start of application of the voltages to the pixel electrodes.

18. The liquid crystal display according to claim 12, wherein, in two pixel electrodes adjacent in right and left direction, a pixel electrode located on left side is provided with a third protrusion at a right side edge thereof and a pixel electrode located on right side is provided with a fourth protrusion at a left side edge thereof.

19. The liquid crystal display according to claim 18, wherein a tip end of the third protrusion is located closer to right side than a tip end of the fourth protrusion.

20. The liquid crystal display according to claim 18, wherein two third protrusions are provided and the fourth protrusion is located between the two third protrusions.

21. The liquid crystal display according to claim 18, wherein a plurality of third protrusions and a plurality of fourth protrusions are provided and one of the fourth protrusions is interposed between adjacent two third protrusions.

22. The liquid crystal display according to claim 12, wherein the liquid crystal is OCB-mode liquid crystal.

23. A method for driving a liquid crystal display comprising:

an array substrate including a plurality of pixel electrodes arranged in front and back direction and in right and left direction and disposed in matrix; a plurality of source lines and a plurality of gate lines arranged so as to cross each other; and switching devices provided as corresponding to the respective pixel electrodes and having gate electrodes connected to the gate lines, source electrodes connected to the source lines, and drain electrodes connected to the pixel electrodes, for switching between the source electrodes and the drain electrodes in accordance with a drive signal input to the gate electrodes through the gate lines;

an opposing substrate provided with a counter electrode opposite to the array substrate; and liquid crystal filled between the array substrate and the opposing substrate and having different alignment states in a display state and in a non-display state, the liquid crystal being subjected to initialization from the alignment state in the non-display state to the alignment state in the display state before an image is displayed, wherein the initialization is performed by inputting voltages with different polarities to two pixel electrodes adjacent in front and back direction, respectively.

24. A method for driving a liquid crystal display comprising:

an array substrate including a plurality of pixel electrodes arranged in front and back direction and in right and left direction and disposed in matrix; a plurality of source lines and a plurality of gate lines arranged so as to cross each other; and switching devices provided as corresponding to the respective pixel electrodes and having gate electrodes connected to the gate lines, source electrodes connected to the source lines, and drain electrodes connected to the pixel electrodes, for switching between the source electrodes and the drain electrodes in accordance with a drive signal input to the gate electrodes through the gate lines;

an opposing substrate provided with a counter electrode opposite to the array substrate; and liquid crystal filled between the array substrate and the opposing substrate and having different alignment states in a display state and in a non-display state, the liquid crystal being subjected to initialization from alignment state in the non-display state to the alignment state in the display state before an image is displayed, wherein the initialization is performed by inputting voltages with different polarities to two pixel electrodes adjacent in right and left direction, respectively.

* * * * *

UNITED STATES PATENT AND TRADEMARK OFFICE
CERTIFICATE OF CORRECTION

PATENT NO. : 6,933,916 B2
DATED : August 23, 2005
INVENTOR(S) : Kenji Nakao et al.

It is certified that error appears in the above-identified patent and that said Letters Patent is hereby corrected as shown below:

Title page,
Item [30], Foreign Application Priority Data, fourth application, should read:
-- Mar. 30, 2001 (JP)……………....2001-98661 --.
Item [56], References Cited, FOREIGN PATENT DOCUMENTS,
"JP 11-582008" should read -- JP 11-282008 --.

Column 32,
Line 32, insert -- to -- after "voltage".

Signed and Sealed this

Fourteenth Day of February, 2006

JON W. DUDAS
*Director of the United States Patent and Trademark Office*